US008207887B2

(12) United States Patent
Goldman

(10) Patent No.: US 8,207,887 B2
(45) Date of Patent: Jun. 26, 2012

(54) COMPUTATIONALLY EFFICENT RADAR PROCESSING METHOD AND SYTEM FOR SAR AND GMTI ON A SLOW MOVING PLATFORM

(75) Inventor: Geoffrey Howard Goldman, Ellicott City, MD (US)

(73) Assignee: The United States of America as represented by the Secretary of the Army, Washington, DC (US)

(\*) Notice: Subject to any disclaimer, the term of this patent is extended or adjusted under 35 U.S.C. 154(b) by 293 days.

(21) Appl. No.: 12/490,109

(22) Filed: Jun. 23, 2009

(65) Prior Publication Data

US 2011/0006944 A1 Jan. 13, 2011

Related U.S. Application Data

(63) Continuation-in-part of application No. 12/488,516, filed on Jun. 19, 2009.

(51) Int. Cl.
*G01S 13/00* (2006.01)
(52) U.S. Cl. ........ 342/25 A; 342/159; 342/189; 342/195
(58) Field of Classification Search ................ 342/25 A, 342/159, 189, 195
See application file for complete search history.

(56) References Cited

U.S. PATENT DOCUMENTS

2002/0147544 A1\* 10/2002 Nicosia et al. ................ 701/207

OTHER PUBLICATIONS

Soumekh, M. "Synthetic Aperture Radar Signal Processing with MATLAB Algorithms," Wiley, John & Sons, 1999, pp. 47-136 and 465-485.
Ranney, K. I.; Soumekh, M. Signal subspace change detection in averaged multilook SAR imagery. IEEE Trans on Geoscience and Remote Sensing Jan. 2006, 44, 201-213.

\* cited by examiner

*Primary Examiner* — Timothy A Brainard
(74) *Attorney, Agent, or Firm* — Lawrence E. Anderson

(57) ABSTRACT

A method and system for processing radar data from a movable platform comprising passing a radar signal through a low noise amplifier; down converting the signal to a lower frequency; filtering out harmonics; sampling using A/D converter at or above Nyquist frequency; determining a scene center; performing a two stage averaging scheme of the received signals with a variable window function based upon the velocity, acceleration of the platform and scene center; coherently averaging N pulses to create an average pulse; performing an inverse Fourier transform; compensating to the scene center by multiplying by a complex exponential based upon GPS and inertial navigational system; summing the average pulses using a low pass filter; repeating the determination of an average pulse for a time period that is less than the Nyquist sample time interval to generate second average pulses; and performing a 2D inverse Fourier transform to obtain SAR image.

20 Claims, 56 Drawing Sheets

(45 of 56 Drawing Sheet(s) Filed in Color)

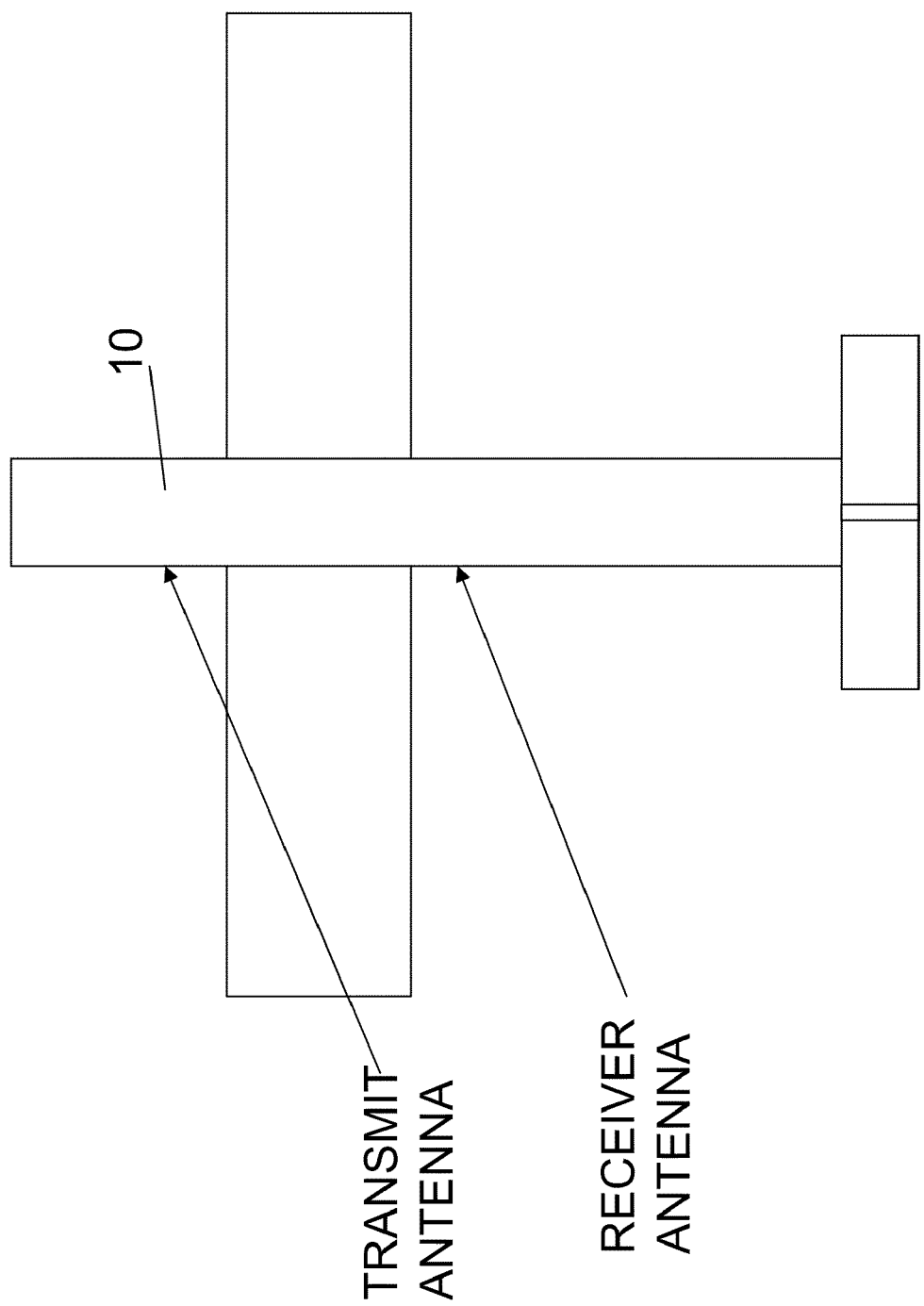

Schematic of ARL FMCW RADAR MOUNTED ON PICK UP TRUCK

Block diagram of an efficient SAR processing algorithm.

Figure 42 SAR image of stationary reflectors with 2 x 2.6 meter resolution.

COMPUTATIONALLY EFFICENT RADAR PROCESSING METHOD AND SYTEM FOR SAR AND GMTI ON A SLOW MOVING PLATFORM

GOVERNMENT INTEREST

The invention described herein may be manufactured, used, and licensed by or for the United States Government. The claimed invention was made as a result of activities undertaken within the scope of a joint research agreement between the U.S. Government and the University of Florida.

REFERENCE TO COLOR DRAWINGS

The patent or application file contains at least one drawing executed in color. Copies of this patent or patent application publication with color drawing(s) will be provided by the Office upon request and payment of the necessary fee.

FIELD OF THE INVENTION

The present invention relates in general to a process and apparatus for generating imagery, and in particular to generating imagery using electromagnetic waves.

BACKGROUND OF THE INVENTION

Current synthetic aperture radar (SAR) algorithms are implemented on platforms that are moving at a constant velocity and at a high speed, and require computationally intensive signal processing. Small platforms generally will not have constant velocity and cannot support computationally intensive signal processing. There exists a need for an algorithm which overcomes the problems associated with generating a SAR image or a GMTI image on a small unmanned aerial vehicle (UAV), robotic vehicle and/or manned vehicle. Previously, the problem encountered difficulties due to algorithm complexity, memory limitations, and DSP (computations per second) limitations. Small unmanned aerial vehicle (UAV) can provide soldiers at the platoon level with a "hover and stare" capability. Small unmanned air vehicle can be propelled using ducted fan technology and controlled using micro-electrical sensor technology. This can also provide robotic vehicles with a way of detecting and avoiding dismounts (personnel).

Aerial image radar and computer subsystems can gather and display broad and detailed information, as events occur; including position and tracking information on vehicles and personnel. The information is relayed in near-real time to ground stations via the secure links and to other ground nodes beyond line-of-sight via ultra high frequency satellite communications. The communications/datalink and operations and control subsystems comprise operator workstations displaying computer-processed data in graphic and tabular format on video screens; in order to perform surveillance, intelligence, communications and maintenance functions. Generally speaking, radar can operate in wide area surveillance, ground moving target indicator (GMTI), fixed target indicator (FTI) target classification, and synthetic aperture radar (SAR) modes, Ground moving target indicator (GMTI) is used to detect moving targets by essentially subtracting out images of stationary objects. Moving target are obtained using Doppler shift theory in GMTI modes. GMTI uses the frequency shift of the returned signal continuous surveillance from a long range. On an aircraft, the antenna can be tilted to either side in order to develop a 120 degree field of view covering hundreds of miles. The GMTI radar will detect any moving objects of sufficient size and density, such as vehicles; but will not pick up stationary objects. The system SAR mode is used produce images of stationary objects. Objects with many surface angles (for example, a the bed of a truck) will give a much better radar signature (referred to a specular returns).

SUMMARY OF THE INVENTION

In accordance with a preferred embodiment of the present invention, the SAR processing algorithm assumes that the platform is moving at a slow speed and has a constant acceleration along the flight path. The algorithm combines pulse averaging with and without motion compensations. Using the invention, one can average before motion compensation or one can motion compensate, and then average. The technique is adaptable for processing non-uniform samples. One concept of one embodiment of the invention comprises using a variable linear window function and variable sample size which are determined by the estimated velocity and acceleration of the platform to average the radar samples in time. Generally the platforms are slow moving. Data is segmented into different windows based upon the velocity and acceleration of the platform. The window function is constructed so that the phase center of the averaged data is uniformly sampled. The matlab code demonstrates how to generate the window function, as shown in Appendix 2.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

FIG. 2 shows a UAV with one proposed antenna mounted on the midsection.

DESCRIPTION OF THE PREFERRED EMBODIMENTS

Figure 1:
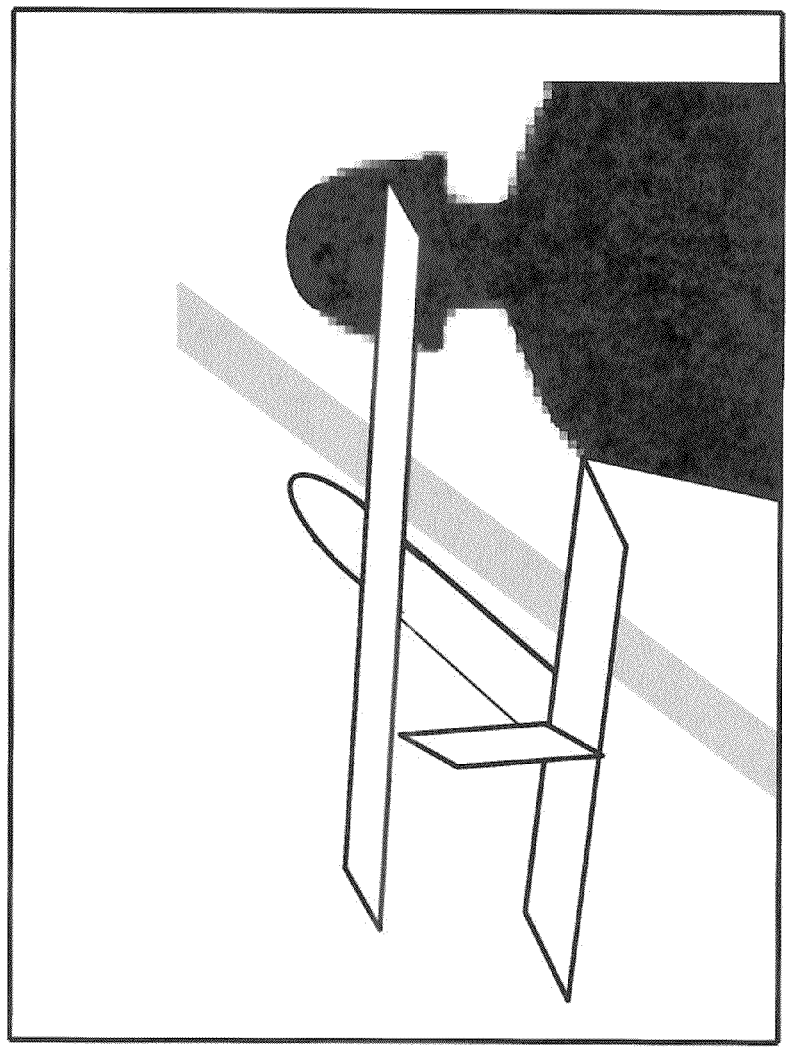
FIG. 1 is a picture of a UAV being handled by a person.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

FIG. 1 shows a picture of the UAV being tested by a soldier. There is no radar sensor integrated on the platform. The object is to develop a prototype radar design and signal processing, and test them using modeling, simulation, and measured data.

The simulation software modeled all the major factors that affect the performance the radar. The radar model included the effects of range, component noise, transmit power, antenna, and various noise sources. The noise in the simulation included the leakage signal, phase noise, thermal noise, and crystal vibration effects. The electromagnetic scattering from targets and clutter were modeled as isotropic point scatterers. The performance of Range/Doppler processing, SAR, and SAR-based GMTI algorithms developed for the proposed radar were simulated and examples of the results were presented to evaluate the feasibility. Prototypes of a prototype radar design and signal processing were tested using modeling, simulation, and measured data providing the system architecture, system analysis, radar simulation, and synthetic aperture radar (SAR) and ground moving target indicators (GMTI) signal processing algorithms. Computational efficient algorithms were developed and tested for generating SAR imagery and GMTI. FIG. 1 is an illustration of a UAV.

Software was written in matlab to model the performance of the radar on a UAV platform in both a hovering and moving mode. The software included models for the radar, target, clutter, UAV, and included algorithms for range/Doppler, SAR, and SAR-based GMTI processing.

Radar is used cue other sensors on the UAV. SAR is a requirement for the proposed radar, but space, weight, and power (SWAP) requirements and GMTI performance are higher priority items.

Radar simulation parameters for a linear frequency modulated continuous wave (FMCW) radar with homodyne demodulation and an interferometric capability in azimuth. Table 1 shows the major design specifications for the radar. The frequency response of signals output by the radar is between 125 KHz and 2.5 MHz. These signals are sampled at 10 MSPS with a 12-bit analog-to-digital converter (ADC).

TABLE 1

Proposed radar operational specifications.

| | |
|---|---|
| Transmit Power | 2 watts |
| Frequency | 5.2 GHz |
| Elevation Beamwidth | 70 degrees |
| Azimuth Beamwidth | 100 degrees |
| Transmit/Receive Antenna Gain | 6 dBi |
| Transmit/Receive Isolation | 43 dB |
| Transmit Leakage to LO mismatch | 2.5 cm |
| Receiver Noise Figure | 4 dB |
| FM Bandwidth | 75 MHz |
| Interferometer Baseline | 0.04 m |
| Radar Antenna Elevation Angle Tilt | −15 degrees |

Figure 2A:
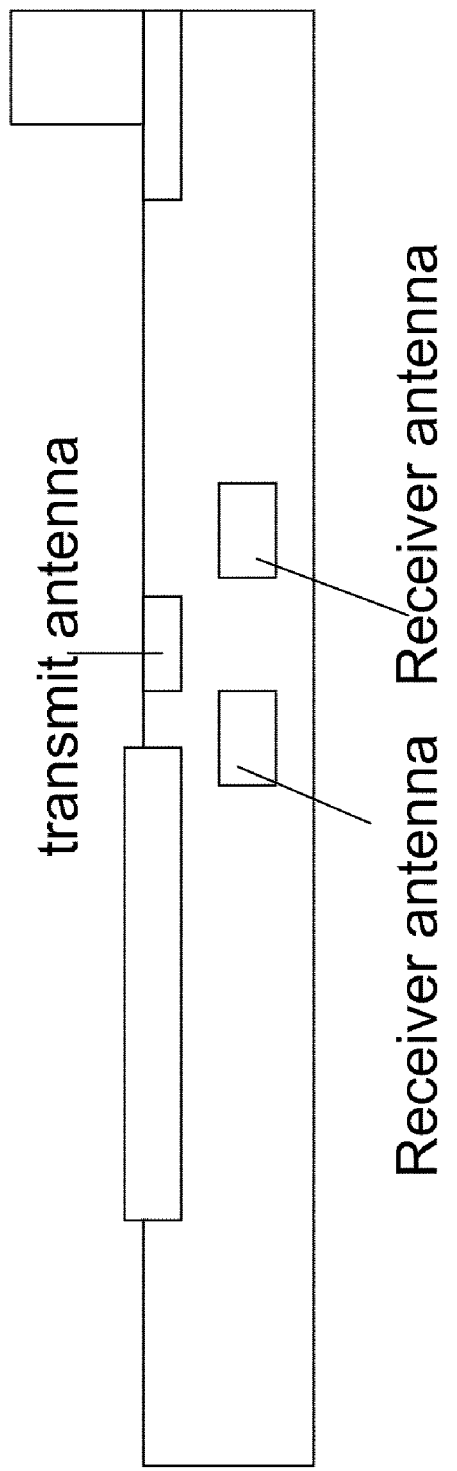
FIG. 2A is a side view of the UAV of FIG. 2.

FIG. 2A shows the proposed location of one of the antennas for the UAV radar system. The transmit antenna is mounted on the fuselage at the top and two receiver antennas are mounted below. To obtain 360 degree coverage, additional antennas may be mounted on the UAV fuselage. The ADC will be capable of simultaneously sampling the signal measured at both receive antennas. In general, SAR processing algorithms can be grouped according to the antenna beamwidth and waveform bandwidth (5). The most computationally efficient SAR processing algorithms assume narrow beamwidth and narrow bandwidth. For the proposed radar, the beamwidth is large and the bandwidth is narrow (1.5 percent). The large beamwidth will blur SAR imagery using conventional computationally efficient SAR processing techniques. Several variations were evaluated on conventional processing algorithms that improved computationally efficiency while reducing image distortion.

A signal processing algorithm with a two-stage averaging scheme digitally reduces the antenna beamwidth and then processes the data using conventional techniques. This technique will reduce the blur in the imagery, not eliminate it. Processing the data using wavefront reconstruction techniques will eliminate blurring due to approximations made in the signal processing, however, it is more computationally complex and was not evaluated.

Figure 3:
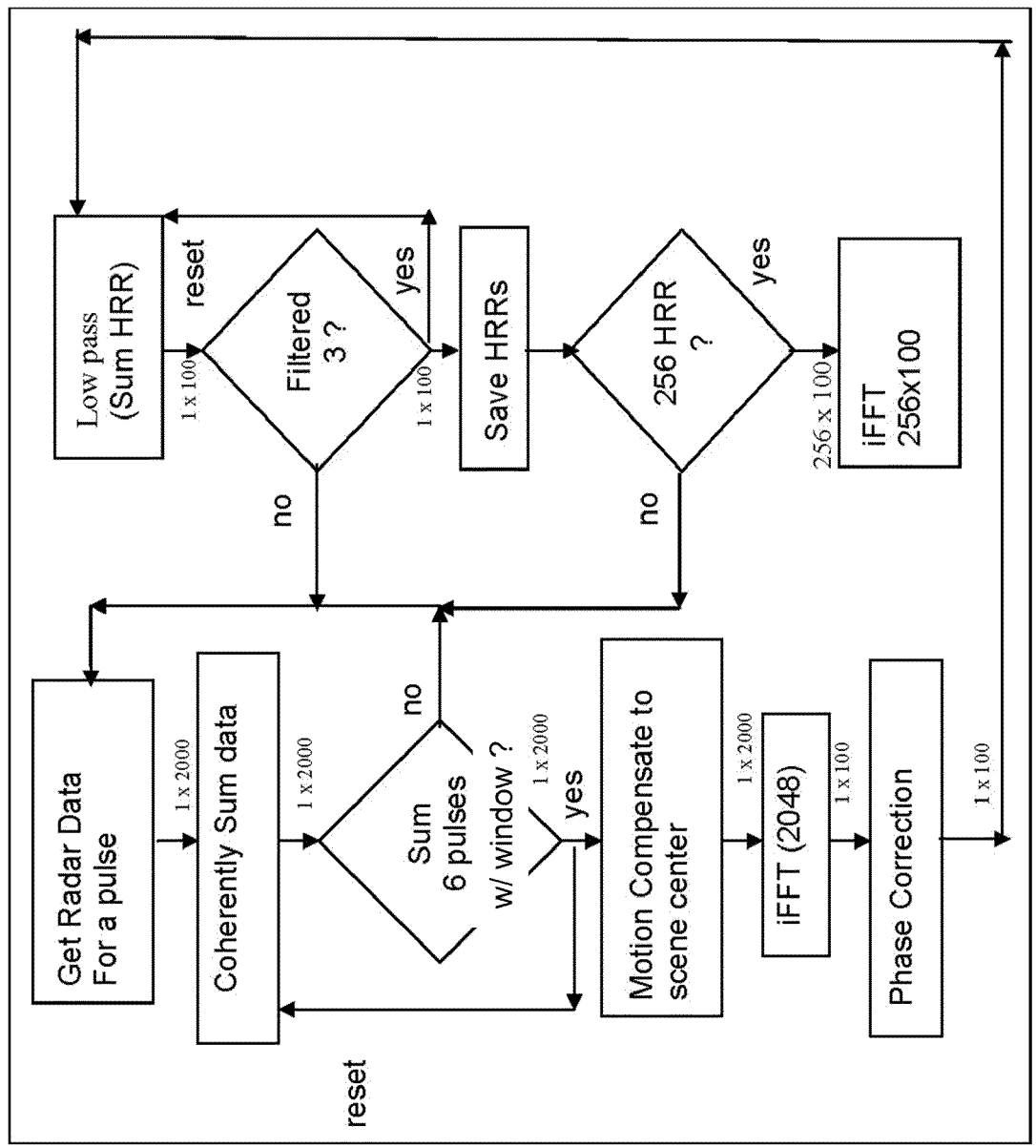
FIG. 3 shows a Block diagram of an efficient SAR processing algorithm.
Figure 4:
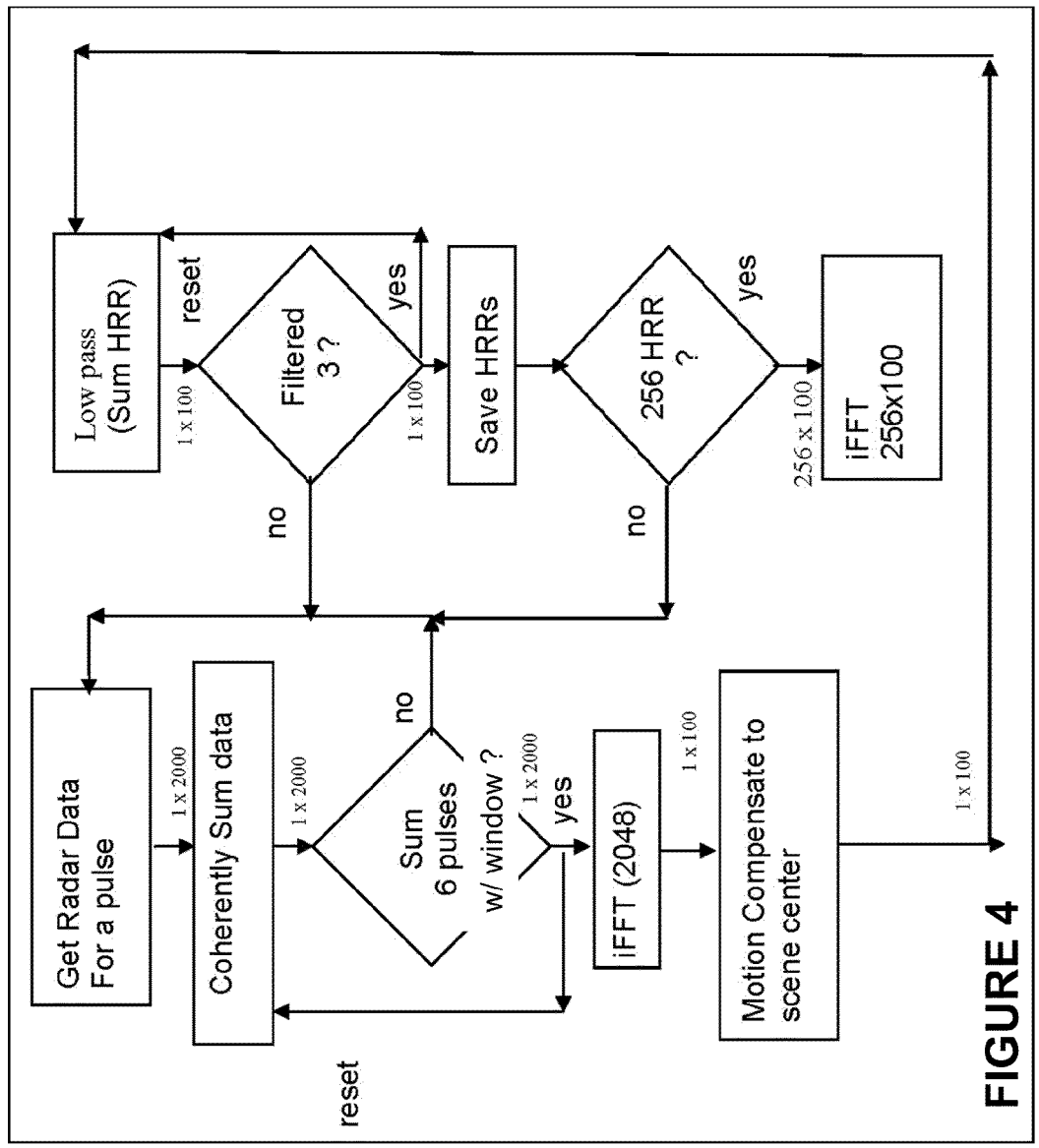
FIG. 4 shows a Block diagram of a very efficient SAR processing algorithm.

FIGS. 3 and 4 show block diagrams of two proposed signal processing schemes. The signal processing in FIG. 3 is less computationally efficient than that of FIG. 4, but it produces better SAR images. The processing in FIG. 4 has a more efficient motion compensation algorithm, which is easier to implement in real-time. The amount of averaging is determined by the speed of the UAV and the speed of the targets of interest. Slower velocities allow for more averaging. A quantitative analysis was not performed to determine the optimal averaging scheme. The size of the data at each step in the block diagram is shown in both figures. The figures show 2000 data points are sampled per pulse, of which 100 range bins are kept for further processing.

The first step in both FIGS. 3 and 4 diagrams is to coherently average together the returns for several pulses; six pulses were chosen. This results in a maximum phase error for a stationary point scatterer at an azimuth angle of 45 degrees of approximately eight degrees ((180/pi)*0.707*2*(6-1)* 3 m/s*400 e−6 s/0.0577 m). Next, the results are range compressed using a fast Fourier transform (FFT) and further averaged. This can be performed using either of the two techniques shown in FIGS. 3 and 4. For the technique shown in FIG. 3, the pulses are motion compensated to the scene center, range compressed using an FFT, then motion compensated at each range bin of interest. For the technique shown in FIG. 4, the pulses are immediately range compressed, then the bins of interest are selected and motion compensated. Next, the results for both techniques are lowpass filtered. The simplest filter to implement is an averager. This is equivalent to a rectangular window function, which results in sine-like spatial filter that effectively reduces the beamwidth of the antenna. The sidelobe levels can be reduced by applying other window functions such as a Hanning weighting. After the desired number of averaged range profiles is obtained, a SAR image is generated by performing FFTs across the range bins of interest.

FIG. 3 is a block diagram of an efficient SAR processing algorithm and FIG. 4 is a block diagram of a very efficient SAR processing algorithm. These algorithms were tested using measured and simulated data. ARL developed radar simulation software to test the algorithms.

Measurements were made with available assets configured to be close to the proposed radar specifications. A description of the measurements is given in the next section. In this section, results will only be presented for the simulated data.

TABLE 1X

Proposed radar operational specifications.

| Transmit Power | 2 | watts |
| Frequency | 5.2 | GHz |
| Elevation Beamwidth | 70 | degrees |
| Azimuth Beamwidth | 100 | degrees |
| Transmit/Receive Antenna Gain | 6 | dBi |
| Transmit/Receive Isolation | 43 | dB |
| Receiver Noise Figure | 4 | dB |

TABLE 1X-continued

Proposed radar operational specifications.

| FM Bandwidth | 75 | MHz |
| Interferometer Baseline | 0.04 | m |

TABLE 2X

Difference in antenna parameters for the GMTI simulation.

| | Right antenna | Left Antenna |
|---|---|---|
| Elevation Boresight angle | 15 deg | 17 deg |
| Azimuth Boresight angle | 45 deg | 42 deg |
| Gain | 8 dB | 7 dB |
| Azimuth Beamwidth | 100 | 97 |
| Elevation beamwidth | 70 | 75 |

In the radar simulation, the target and clutter were modeled as point scatterers. The noise in the radar simulation included the leakage signal, phase noise, thermal noise, and crystal vibration effects. The motion of the UAV was modeled as 3-dimensional vector with constant acceleration. The antenna beam pattern was also modeled. The motion of the targets was modeled as 2-dimensional vector with constant velocity. Table 3× shows the additional parameters used in the simulation.

TABLE 3X

Addition parameters for the SAR simulation. Table 3X. Moving targets for GMTI simulation with RCS = −6 dBsm.

| Target number | |V| (m/s) | Vx (m/s) | Vy (m/s) | Δrange (m) | Δθ (deg) |
|---|---|---|---|---|---|
| 1 | 1.0 | 0.7 | 0.7 | −10 | −5.0 |
| 2 | 1.0 | −0.7 | 0.7 | 10 | 7.5 |
| 3 | 1.0 | −0.7 | −0.7 | 0 | 2.5 |
| 4 | 0.5 | 0.5 | 0.0 | 15 | 2.5 |
| 5 | 0.5 | 0 | 0.5 | −15 | −7.5 |

Figure 5:
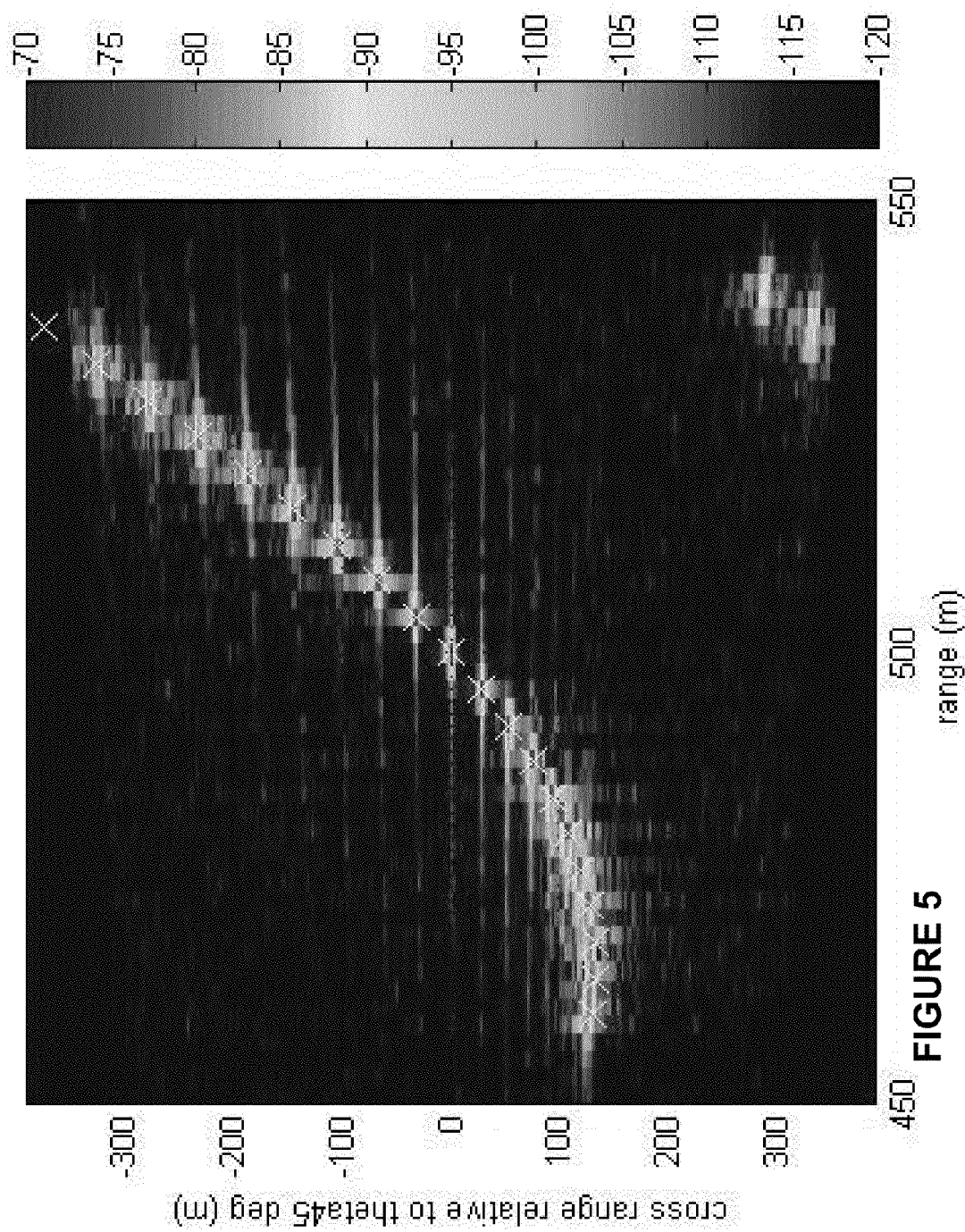
FIG. 5 illustrates SAR image of stationary reflectors with 2×2.6 meter resolution.
Figure 6:
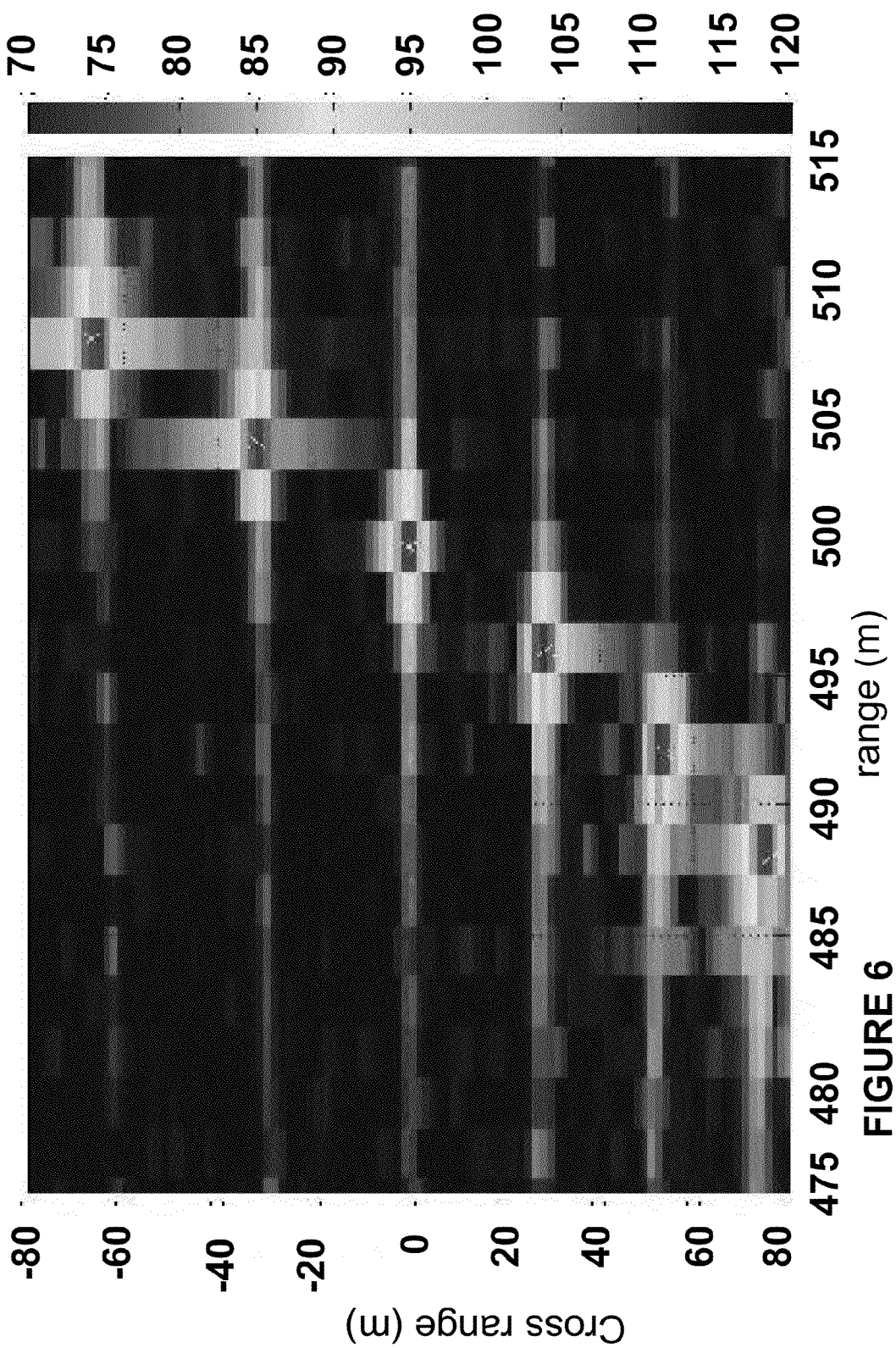
FIG. 6 shows a zoomed in region of a SAR image of stationary reflectors with 2×2.6 meter resolution.

Simulated SAR images were generated using the algorithm described in FIGS. 3 and 4 and the radar parameters described in tables 2× and 3×. SAR images generated with the signal processing described in FIG. 3 are denoted in the figure captions as "efficient processing" and processing described in FIG. 4 are denoted as "very efficient processing". The data were also filtered with a 2-dimension Kaiser window with a Beta of 2. Simulated data, consisting of the returns for 4608 chirps that were collected over a 5.5 meter interval, then processed. This results in SAR images with a resolution of approximately 2×2.6 meters in down range and cross range. The color scales are in dB. FIGS. 5 and 6 were processed using the algorithm shown in FIG. 3 and FIGS. 7 and 8 were processed using the algorithm shown in FIG. 4. FIGS. 6 and 8 show a zoomed in region in FIGS. 5 and 7, respectively. Targets near the center of antenna beam imaged in their correct location as shown by the in the figures. However, targets not near the center of the beam can be offset or even aliased to other locations. These images show that the image quality slightly decreases as the position of the targets move away from the center of the antenna beam. The image quality looks good within 50 meters of the center of the beam for the more computational complex algorithm. FIG. 5 illustrates SAR image of stationary reflectors with 2×2.6 meter resolution.

FIG. 6 shows a zoomed in region of a SAR image of stationary reflectors with 2×2.6 meter resolution.

Figure 7:
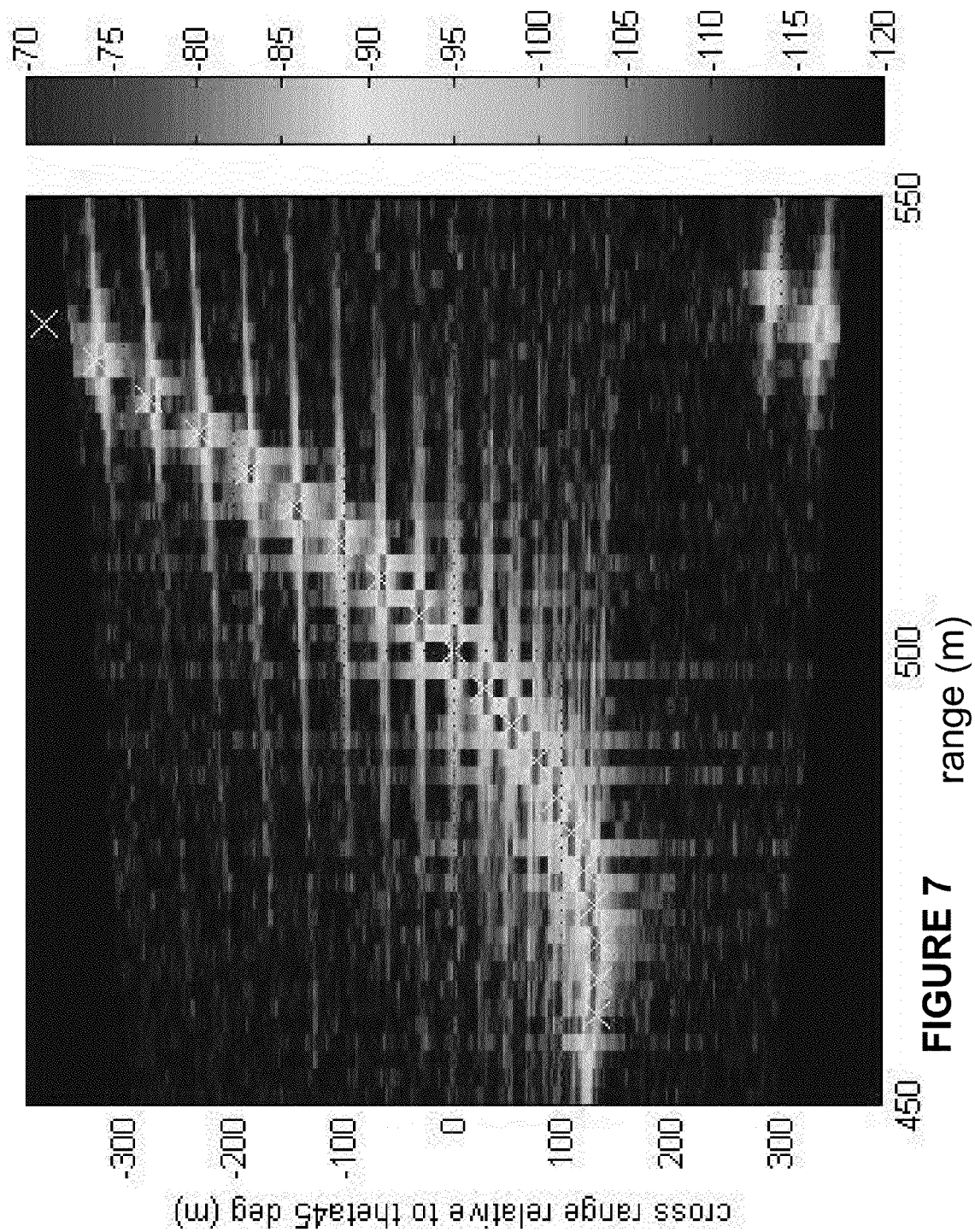
FIG. 7 shows SAR image of stationary reflectors with 2×2.6 meter resolution.
Figure 8:
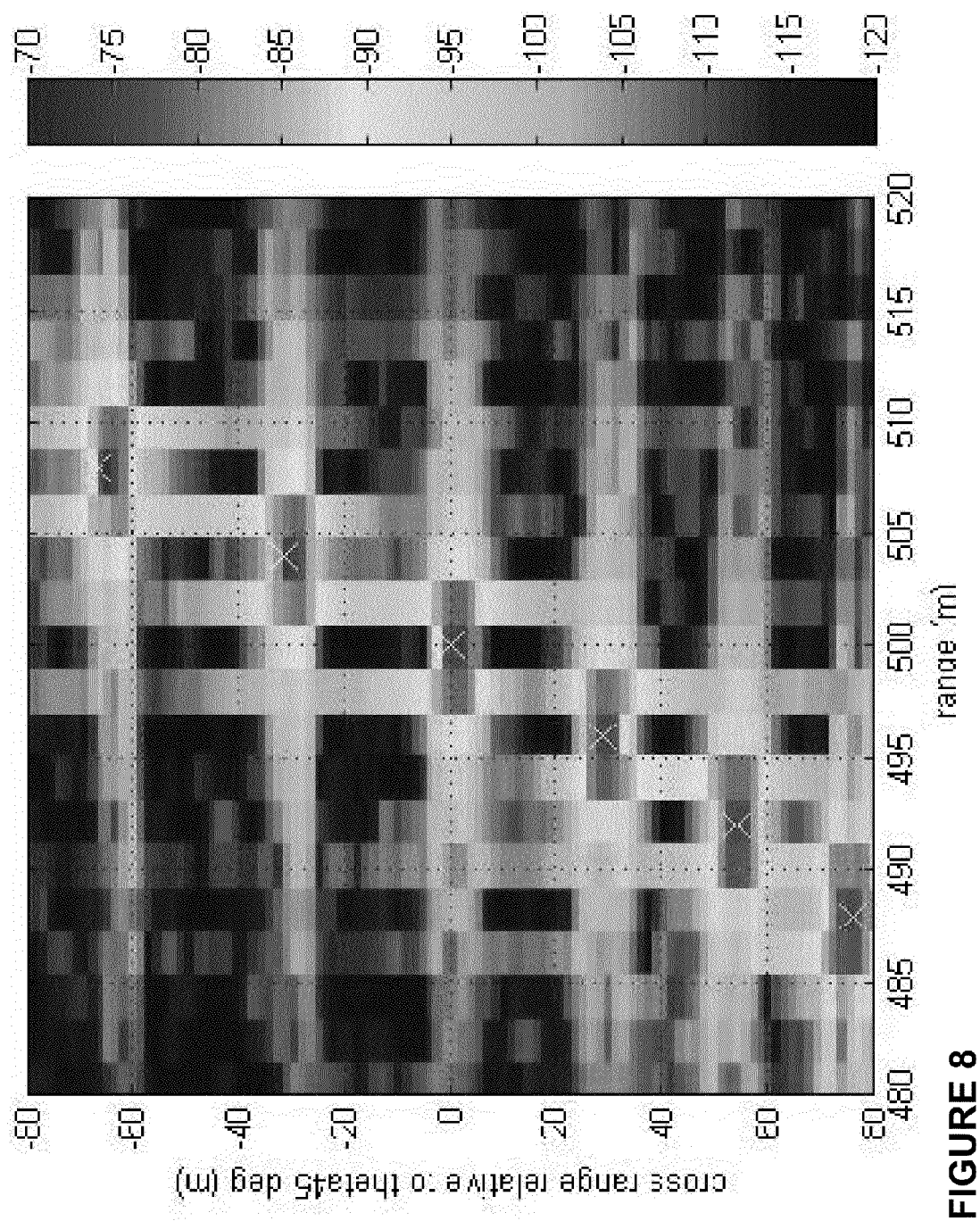
FIG. 8 illustrates a zoomed in region of a SAR image of stationary reflectors with 2×2.6 meter resolution.

FIG. 7 shows SAR image of stationary reflectors with 2×2.6 meter resolution.

Figure 9:
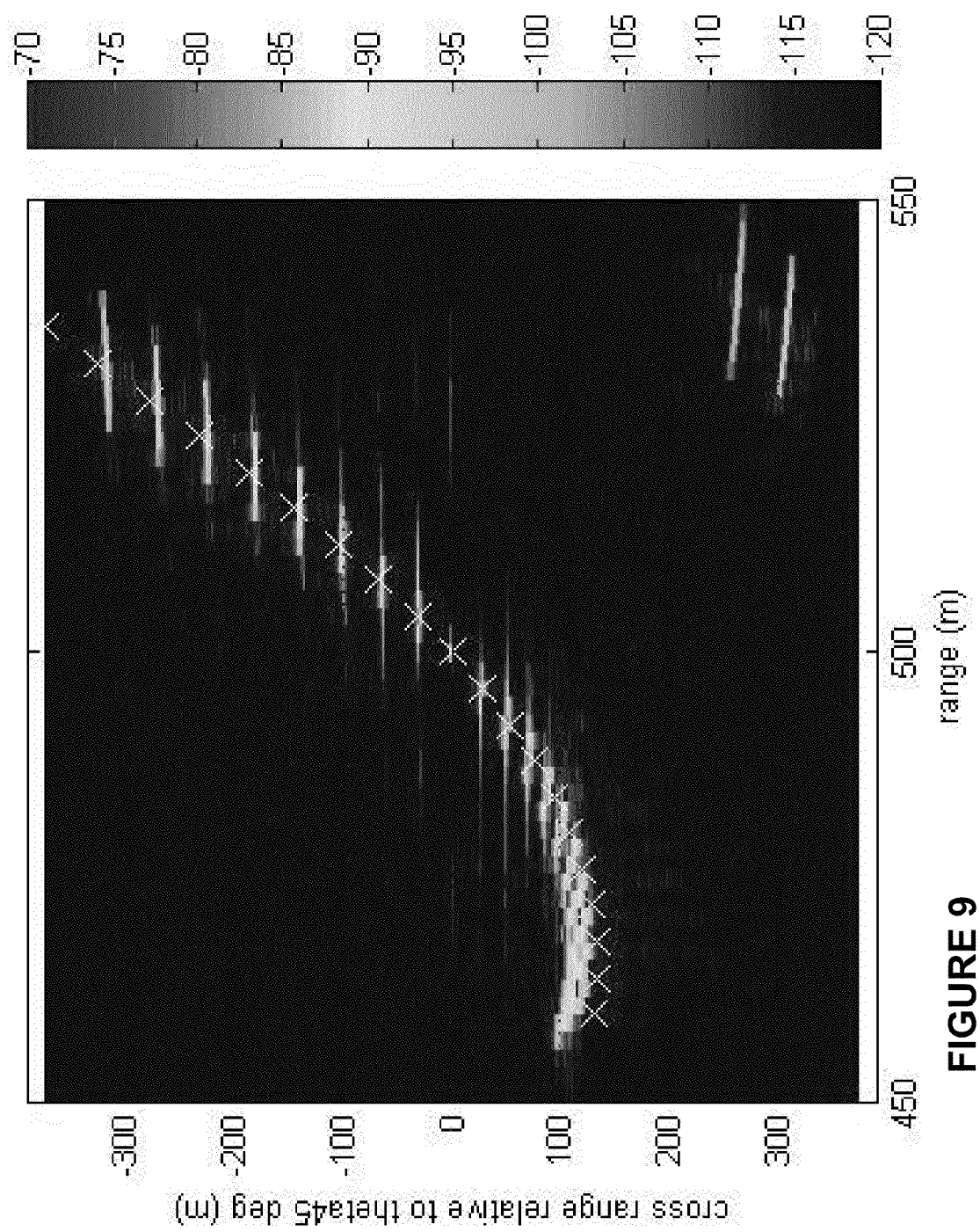
FIG. 9 shows a SAR image of stationary reflectors with 1×0.65 meter resolution.
Figure 10:
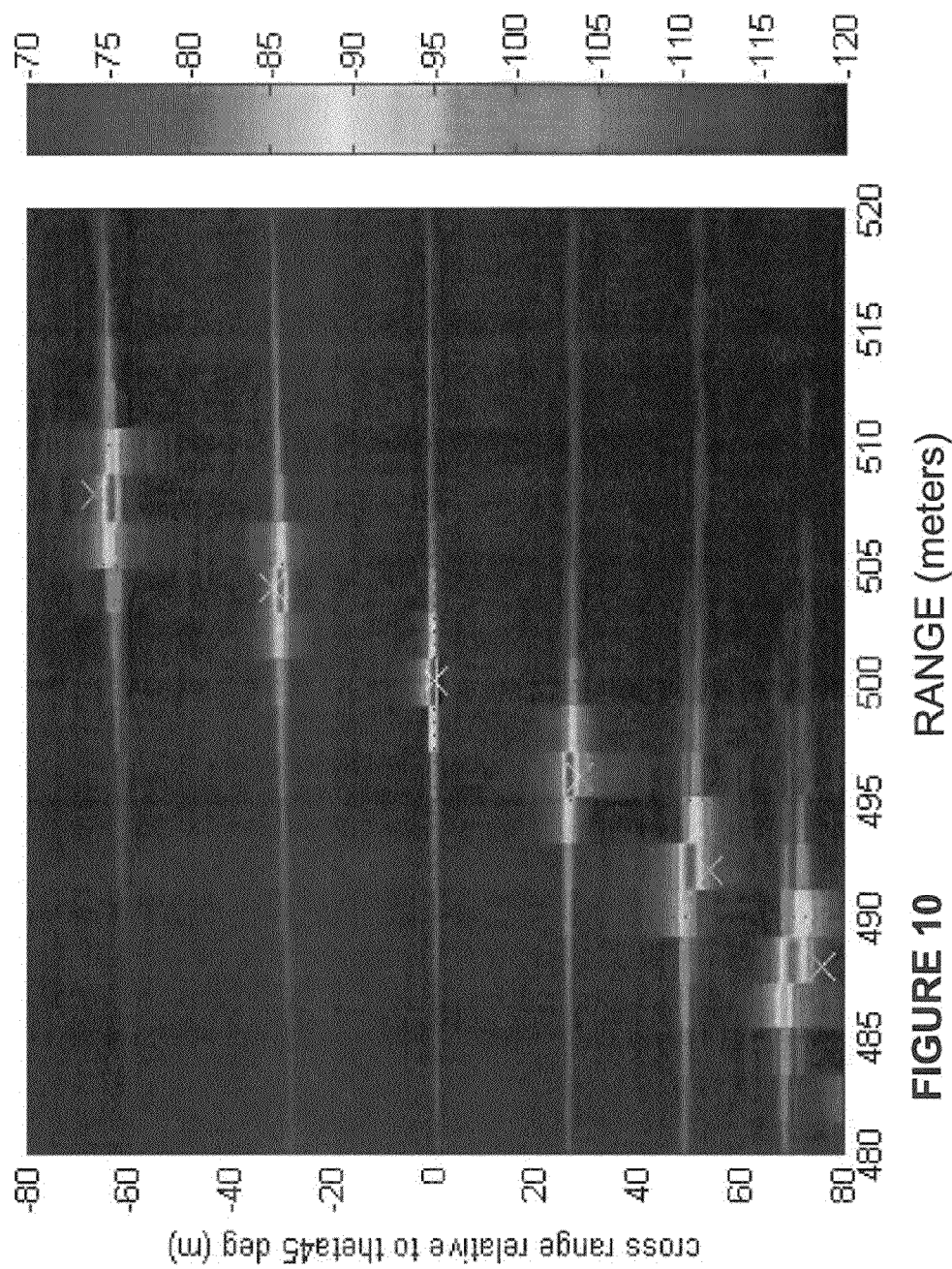
FIG. 10 shows a Zoomed in region of a SAR image of stationary reflectors with 1×0.65 meter resolution.

FIG. 8 illustrates a zoomed in region of a SAR image of stationary reflectors with 2×2.6 meter resolution. The SAR images also were generated with improved resolution to observe the affects on the approximations made in the signal processing on the image quality. The same processing scheme shown in FIG. 3 was used to process the data, but the bandwidth of the chirp was increased to 150 MHz and the data was collected over a 21-meter interval instead of 5.5-meter interval. This resulted in SAR imagery with resolution of approximately 1×0.65 m in down range and cross range as shown in FIGS. 9 and 10. For targets within 30 meters of the center of the image, the imagery is well focused. Range walk and defocusing become more significant as the target location moves away from the center of the image. These results indicate that if the proposed radar were modified to handle higher bandwidth signals, the SAR algorithms can generate higher resolution imagery over a small area of interest.

FIG. 9 shows a SAR image of stationary reflectors with 1×0.65 meter resolution.

FIG. 10 shows a zoomed in region of a SAR image of stationary reflectors with 1×0.65 meter resolution.

Figure 11:
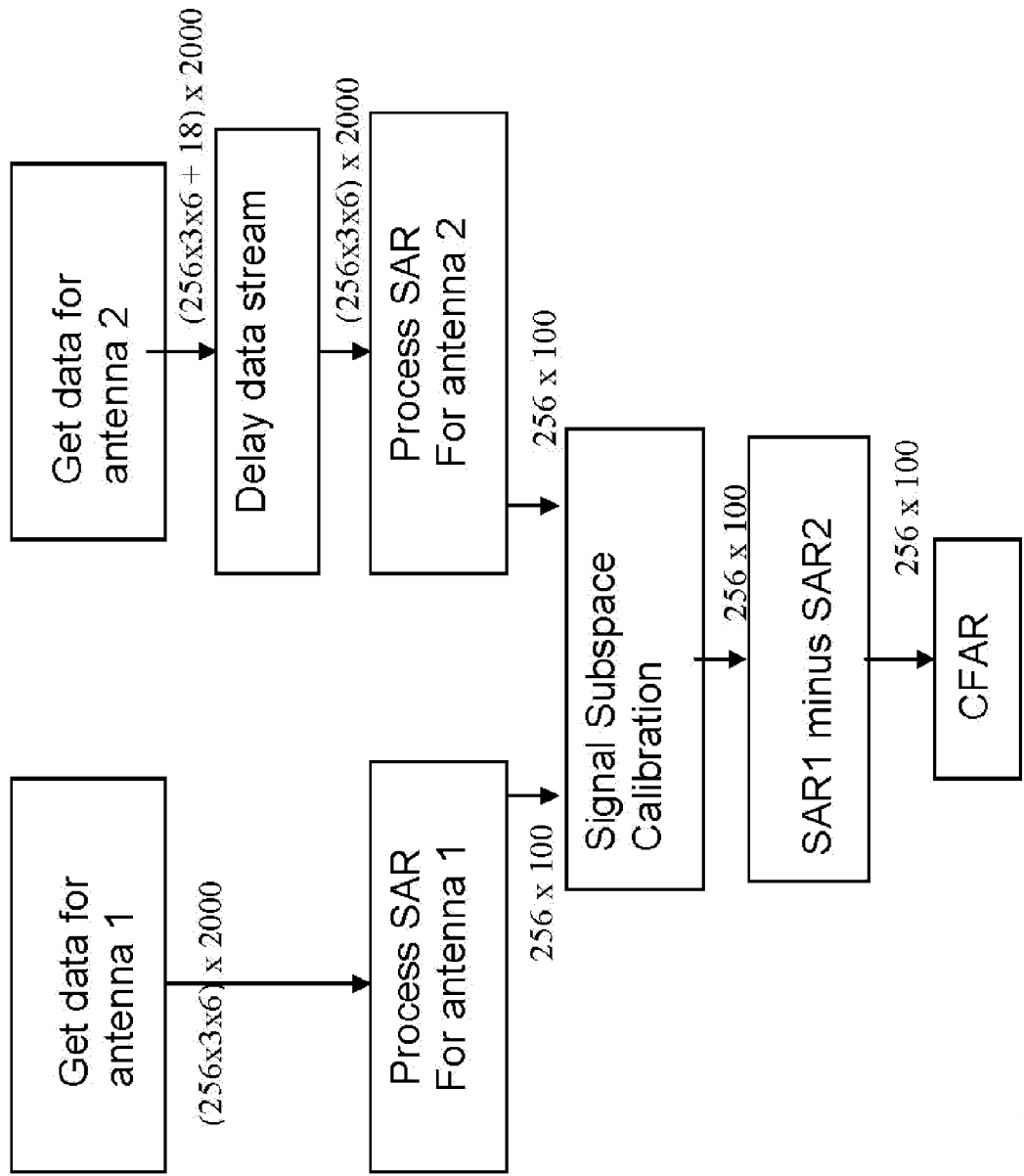
FIG. 11 shows a block diagram for GMTI based upon subtracting two SAR images.

SAR Based GMTI Algorithms. The algorithms developed for processing SAR imagery were leveraged to detect slow moving targets such as dismounts. Moving targets can be detected by subtracting the SAR images generated from the right and left receive antenna that are spatially aligned and calibrated. FIG. 11 shows a block diagram of the processing. First, the images from the two antennas are aligned by skipping data collected with the left antenna until the effective phase centers of the right and left antenna are approximately equal. Next, SAR images are generated using the algorithms described in either FIG. 3 or 4; then they are calibrated and subtracted from each other.

The SAR images were calibrated using a technique based upon signal subspace decomposition (SSD) (6). The technique assumes that the SAR images are related to each other through a linear transfer function. The simplest realization of this technique is a one-element finite impulse response (FIR) filter. To implement this filter, a gain and a phase correction factor between the two images was calculated using the ratio of the average powers and the amplitude weighted phase difference between the two images. A more complicated realization of this technique is to assume that the subimages from each antenna are related by a 2-dimensional FIR filter. This technique was implemented by minimizing the least squares error using the left matrix divide operation in MATLAB. Results will be shown for both techniques. Calibration based upon signal sub-space decomposition effectively cancels most of the clutter, however, some residue will still be present. To reduce the residue of large clutter discretes, a normalization procedure was developed. To normalize the image, the SAR image difference was divided by the square root of the minimum amplitude value for each pixel location in the two images plus a constant value representing the noise as shown below.

$$\text{Norm} = \text{Min}(|\text{SAR1}|, |\text{SAR2}|) + \text{Noise} \quad (1)$$

The performance of the GMTI algorithms based upon SAR processing techniques was simulated in MATLAB (4). The difference in the SAR images from each antenna was assumed to be only a function of the antennas, not the receiver. Table 4 shows the values of the simulated parameters for the two receive antennas. The horizontal separation between the phase centers of the two antennas in the simulations is 4 centimeters. The simulation was run with the parameters shown in tables 2 to 4.

Table 4. Difference in simulated antenna parameters for the GMTI [0001] simulation.

The simulation was run to test whether dismounts could be detected at a range of a kilometer using the proposed radar for the UAV and the described signal processing algorithms. The parameters for the radar and the signal processing are described in tables 1 and 2 with the number of chirps increased to Four variations of the GMTI algorithms were tested. The SAR images were generated using either the block diagrams in FIG. 3 or 4 and the SAR image calibration was performed using signal subspace decomposition using either a 1-element or 3×3-element FIR filter. The algorithm was tested using six moving targets described in table 5. One target was moving at 10 m/s, three targets were moving at 1 m/s, and two targets were moving at 0.5 m/s. All the moving targets had an RCS of −6 dBsm and were located at a range of approximately 1 km. The angular location of the targets was specified relative to the azimuth boresight angle of the right antenna, which was 45 degrees. The height of all these targets was fixed at zero meters. Table 5 shows the velocity and location of each target.

Table 5. Moving targets for GMTI simulation with RCS=−6 dBsm.

The clutter was modeled using either three or one scattering center for each range bin. Three scatterers were used for ranges between 900 and 1100 meters and one scatterer was used for ranges between 100 to 900 meters and 1100 to 1300 meters. $\sigma^0$ of the clutter varied linearly as a function of aspect angle. For depression angles between 5 and 70 degrees, $\sigma 0$ varied between −15 to −10 dBsm/sm. At a range of 1 km, this corresponded to a $\sigma^0$ of −15 dBsm/sm. The number of scatterers used to model the clutter was limited to reduce computation time. For more realistic results, the number of scattering centers per range bin should be set to the number of cross range bins.

Figure 12:
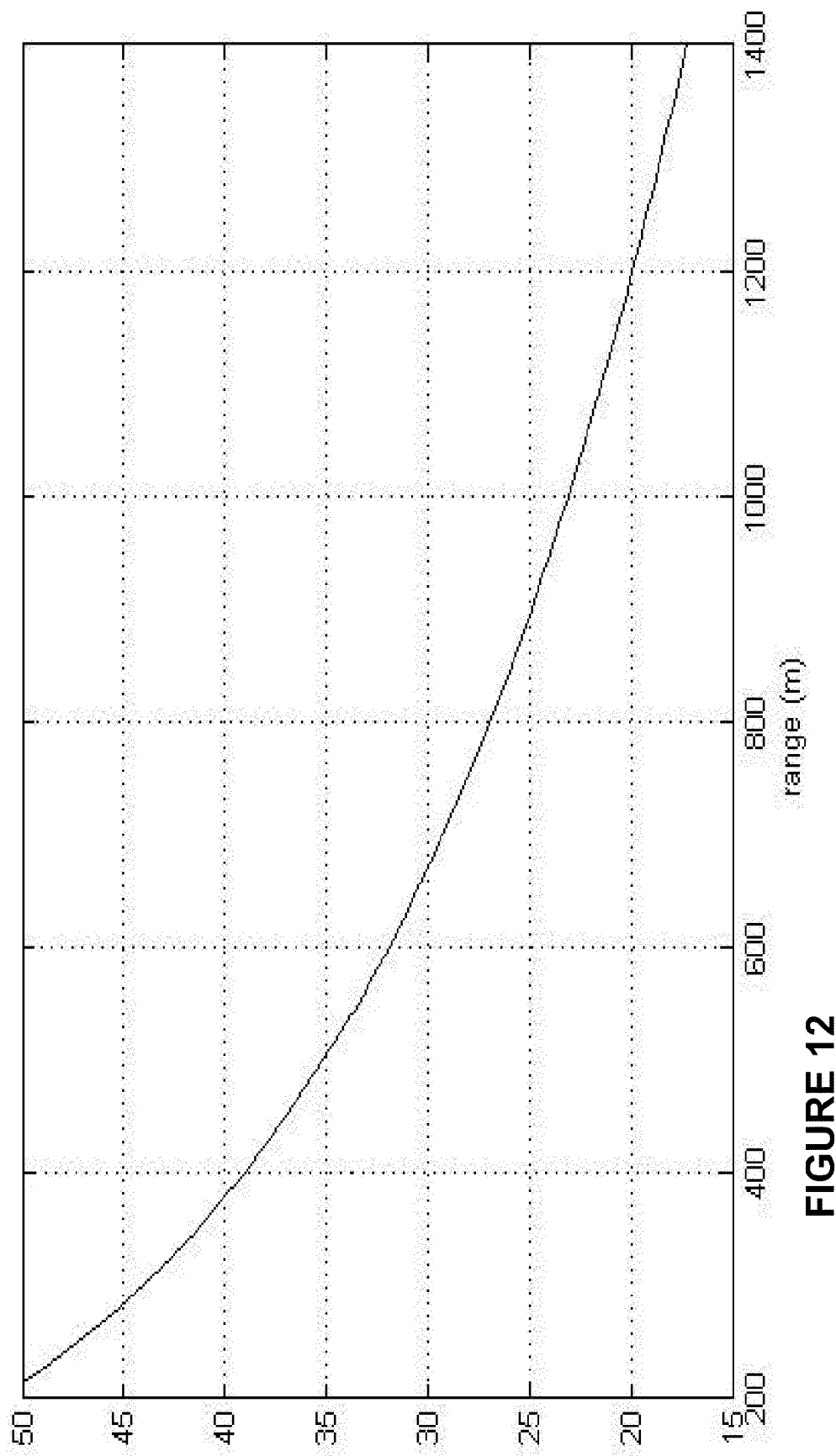
FIG. 12 shows theoretical SNR level for a dismount with a velocity of 0.5 m/s.

The predicted performance of the algorithm based upon complete clutter cancellation and most favorable target velocity is shown in FIG. 12. For slow moving targets, the relative phase shift between the two antennas is approximately $$\Delta\phi \cong 2k\langle a,v\rangle\tau \quad (2)$$

where k is the propagation number, a is a unit vector originating at the initial target position and pointing at the location of the UAV, v is the velocity of the target, and $\tau$ is a time delay. For a small UAV with constant velocity, $\tau$ is calculated by dividing the distance between the phase centers of the two antennas by the velocity. These results indicate that the algorithm performance is not thermal noise limited at 1 km for most target velocity vectors.

FIG. 12 shows the theoretical SNR level for a dismount with a velocity of 0.5 m/s.

FIGS. 13 to 24 show simulated results for SAR-based GMTI processing using two imaging algorithms and using two calibration algorithms. GMTI results based upon the imaging algorithm shown in FIG. 3 are denoted "efficient processing" and results based upon the imaging algorithm shown in FIG. 4 are denoted "very efficient processing".

Figure 13:
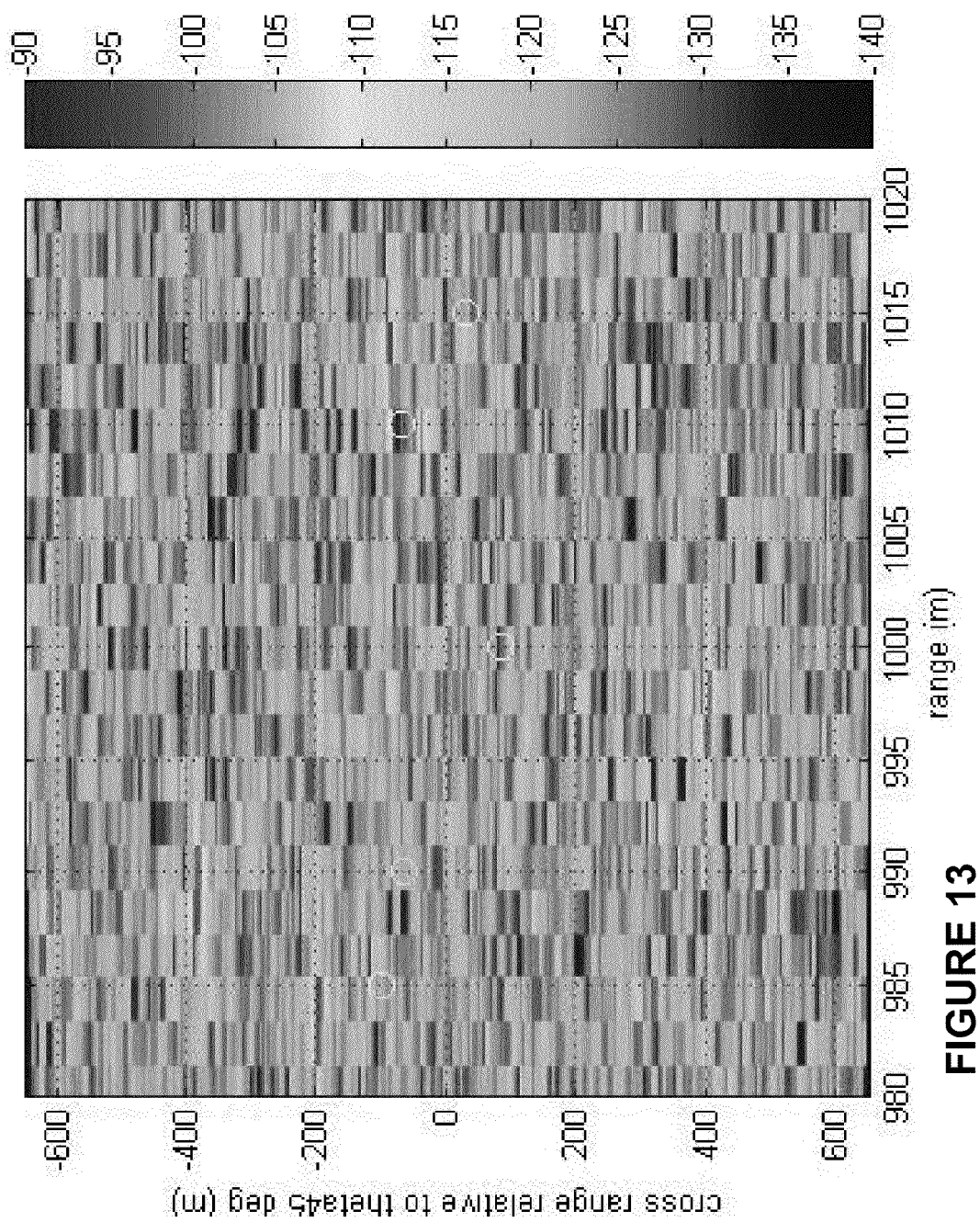
FIG. 13 shows a SAR image of six moving targets generated using efficient processing.

FIG. 13. SAR image of six moving targets generated using efficient processing.

Figure 14:
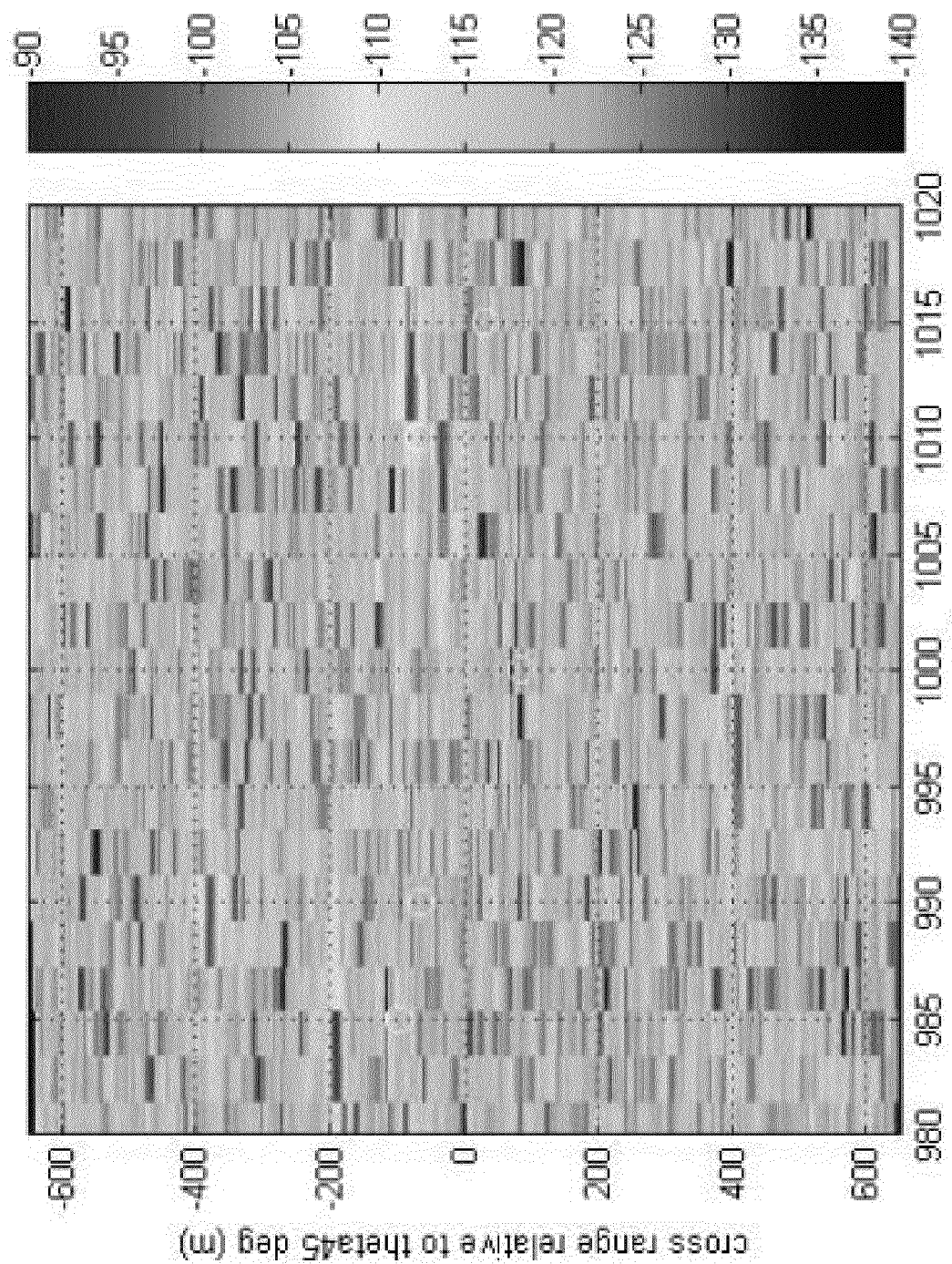
FIG. 14 shows a SAR image of six moving targets generated using very efficient processing.

FIG. 14. SAR image of six moving targets generated using very efficient processing.

Figure 15:
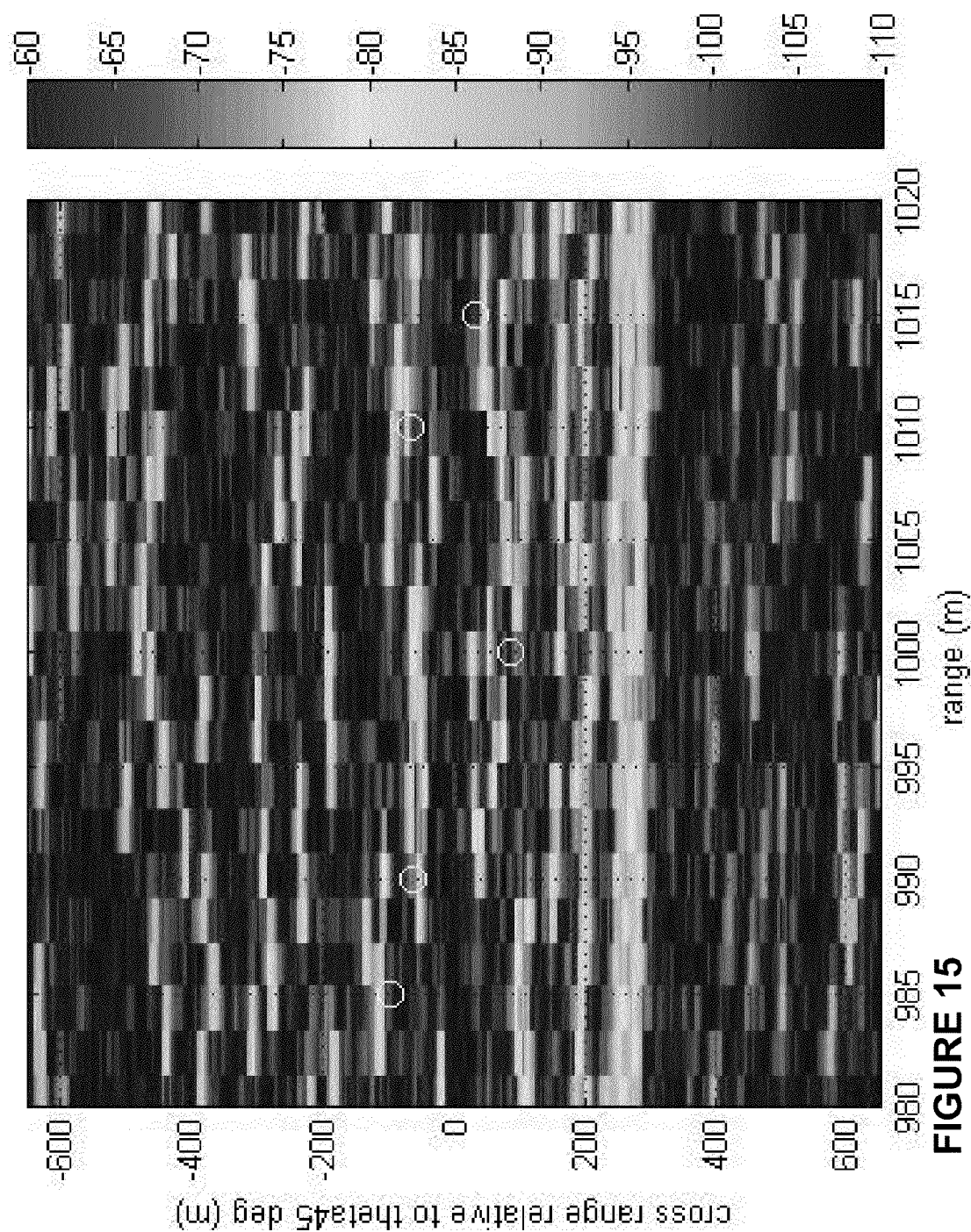
FIG. 15 shows a SAR image from the right antenna calculated with efficient processing.

FIG. 15 shows SAR image from the right antenna calculated with efficient processing.

Figure 16:
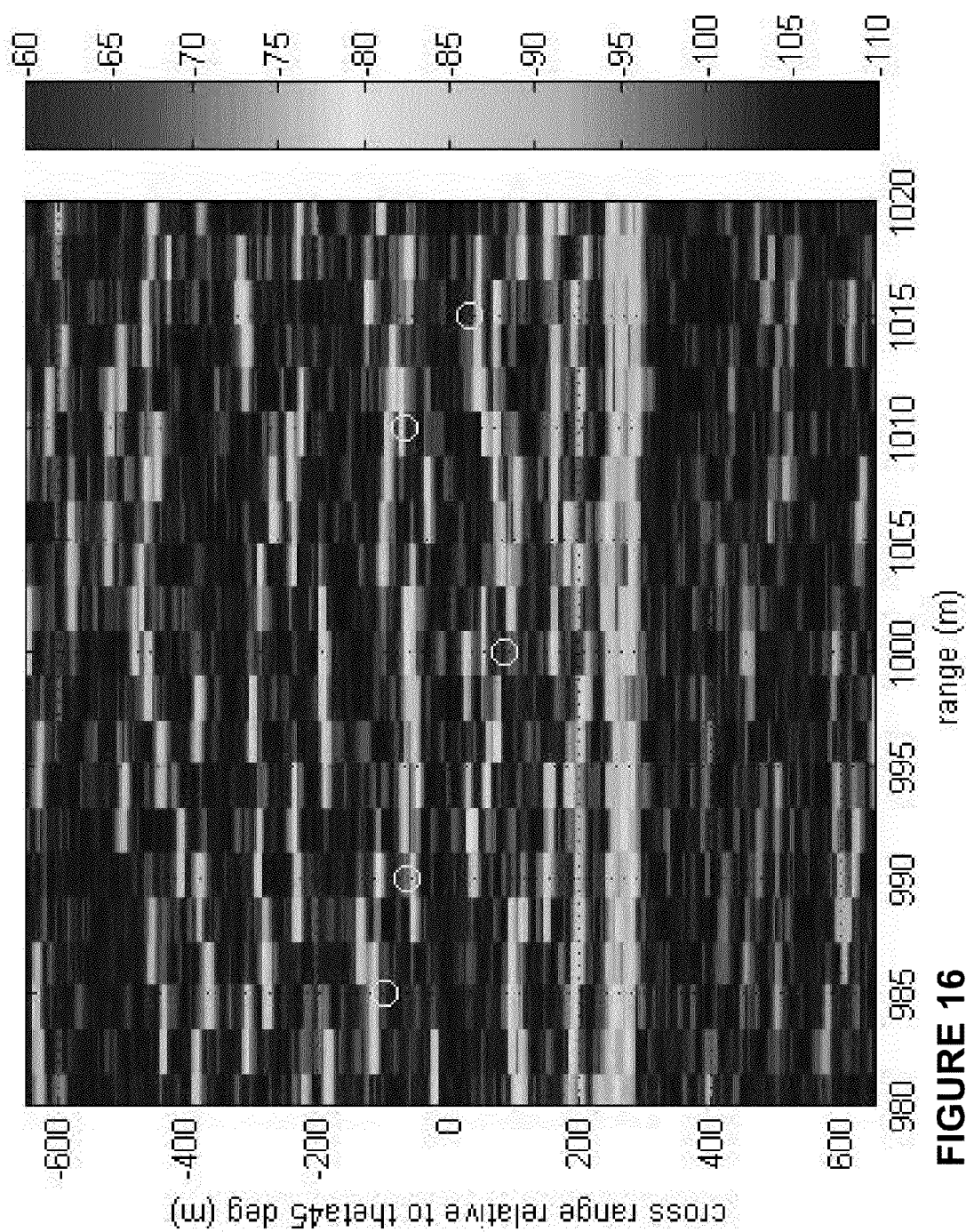
FIG. 16 shows a SAR image from the left antenna calculated with efficient processing.

FIG. 16. SAR image from the left antenna calculated with efficient processing.

Figure 17:
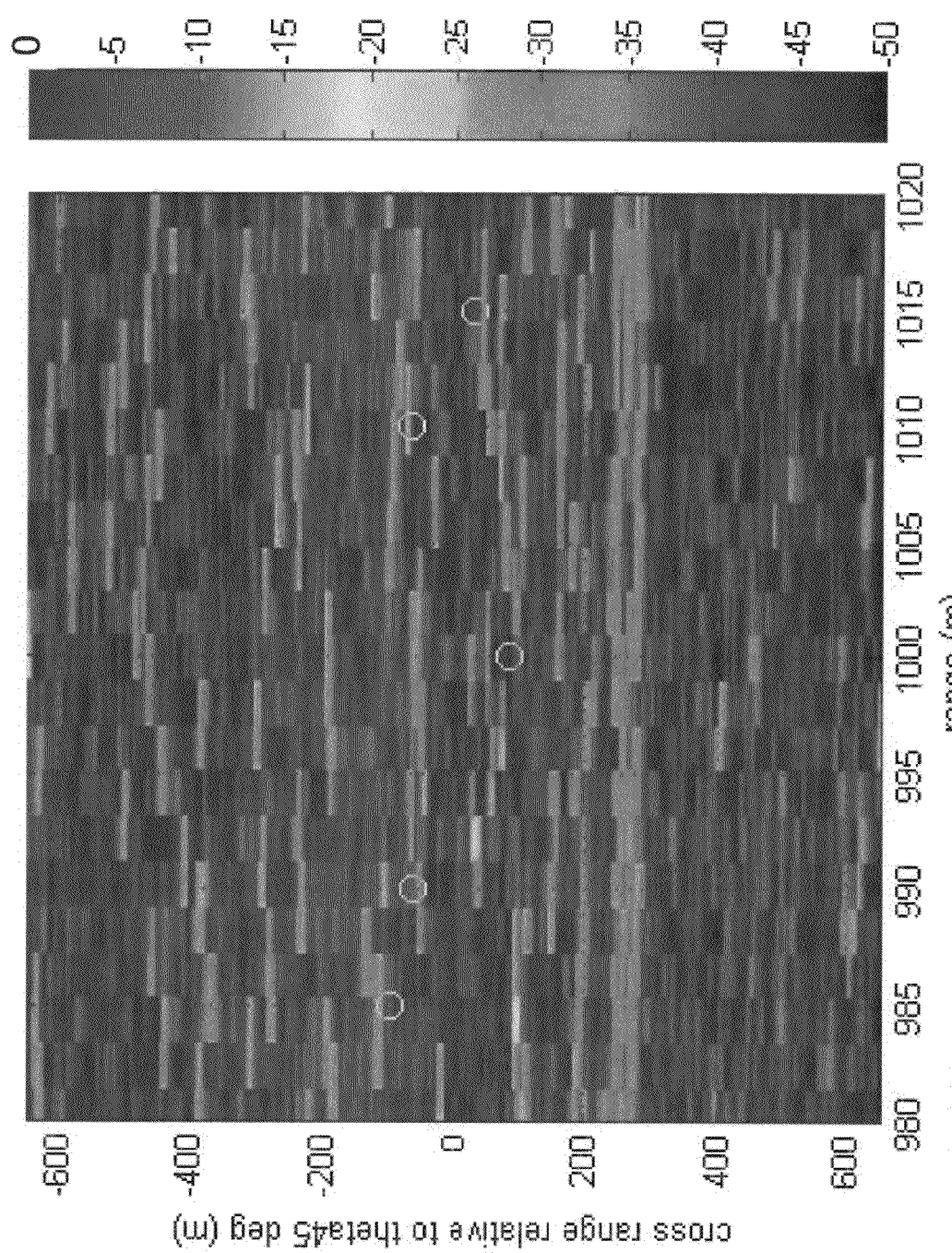
FIG. 17 shows a SAR image difference calculated with efficient processing and 1-element FIR calibration.

FIG. 17 shows SAR image difference calculated with efficient processing and 1-element FIR calibration.

Figure 18:
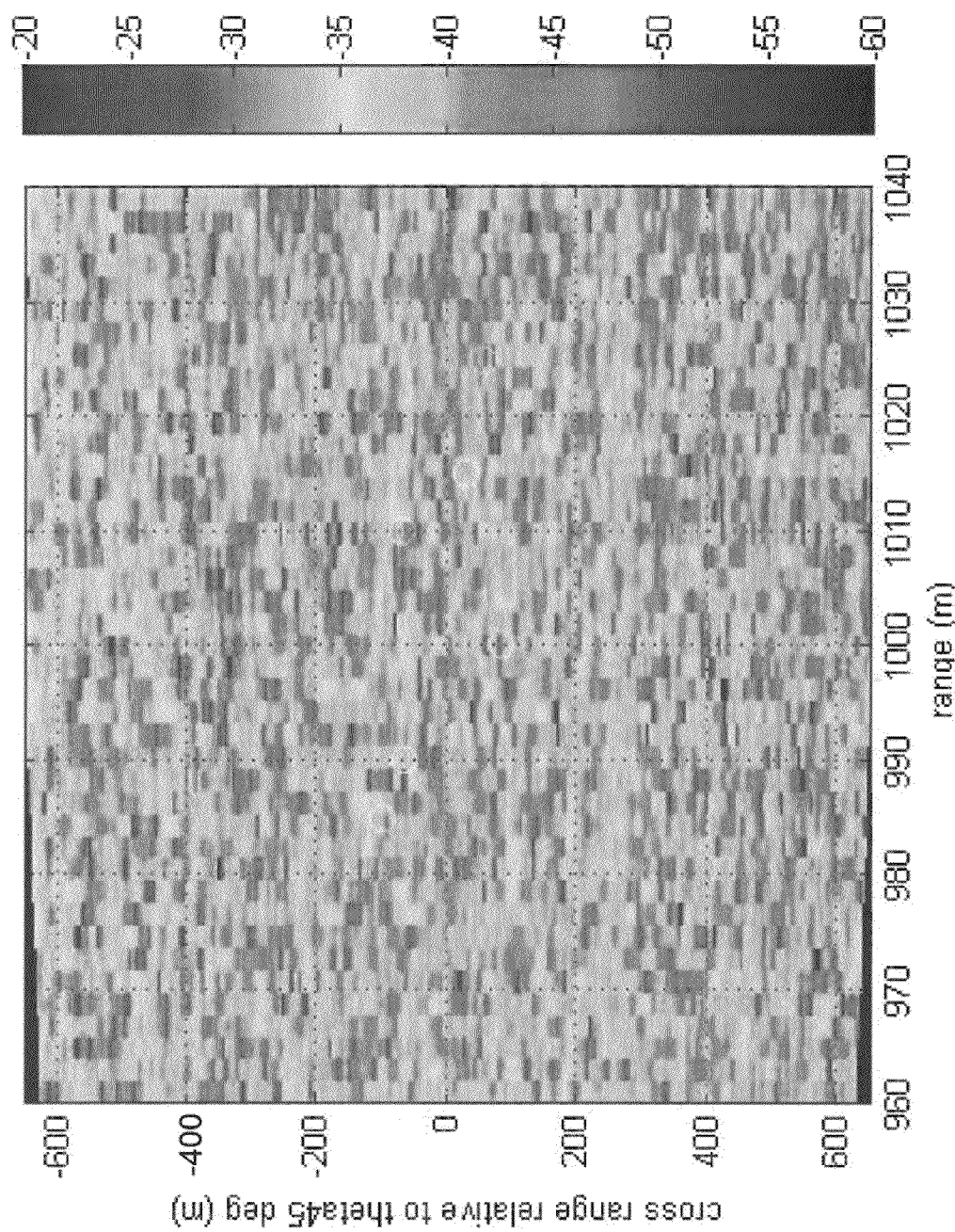
FIG. 18 shows a normalized SAR image difference calculated with efficient processing and 1element FIR calibration.

FIG. 18. Normalized SAR image difference calculated with efficient processing and 1-element FIR calibration.

Figure 19:
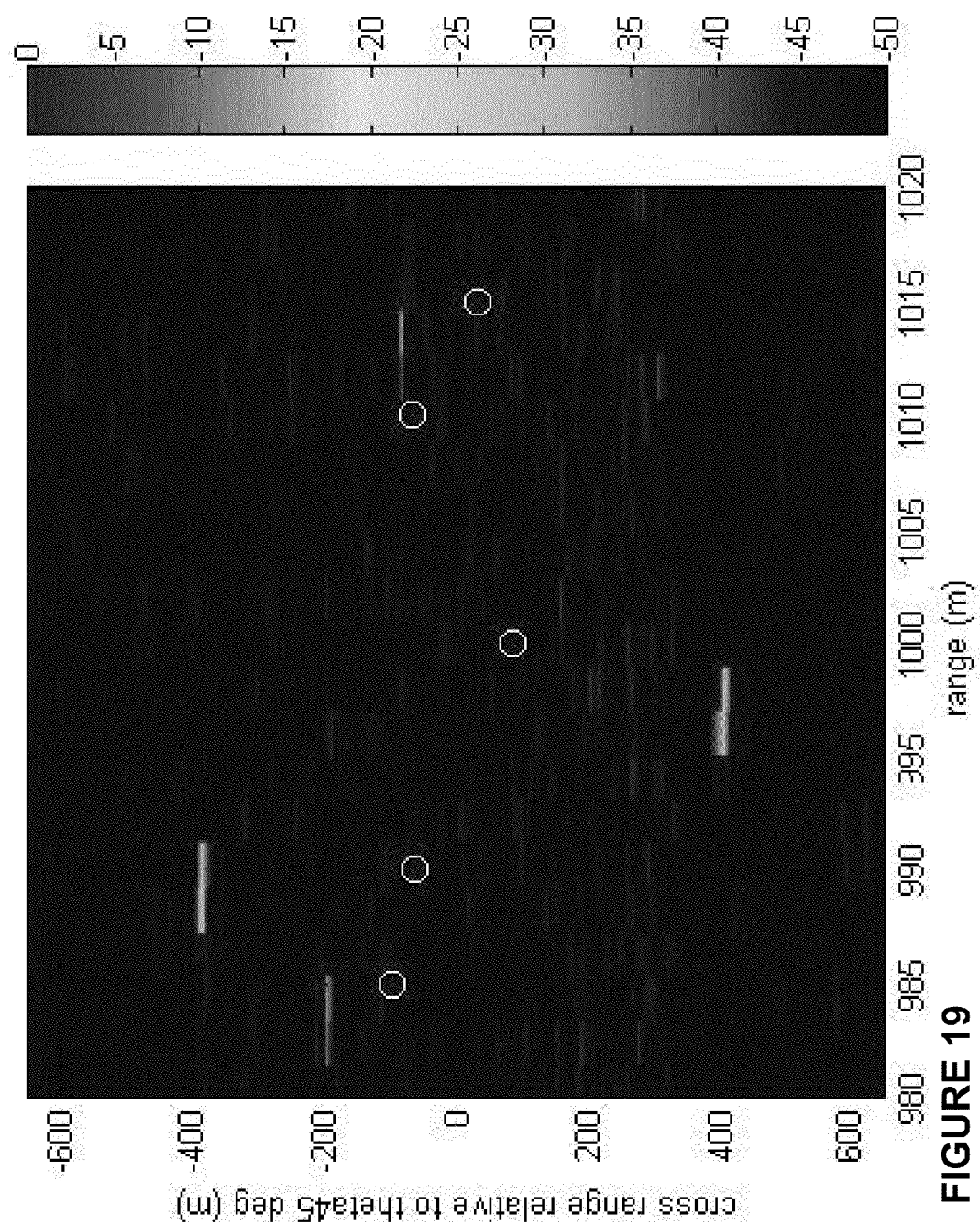
FIG. 19 shows a SAR image difference calculated with efficient processing and 3×3-element FIR calibration.

FIG. 19. SAR image difference calculated with efficient processing and 3×3-element FIR calibration.

Figure 20:
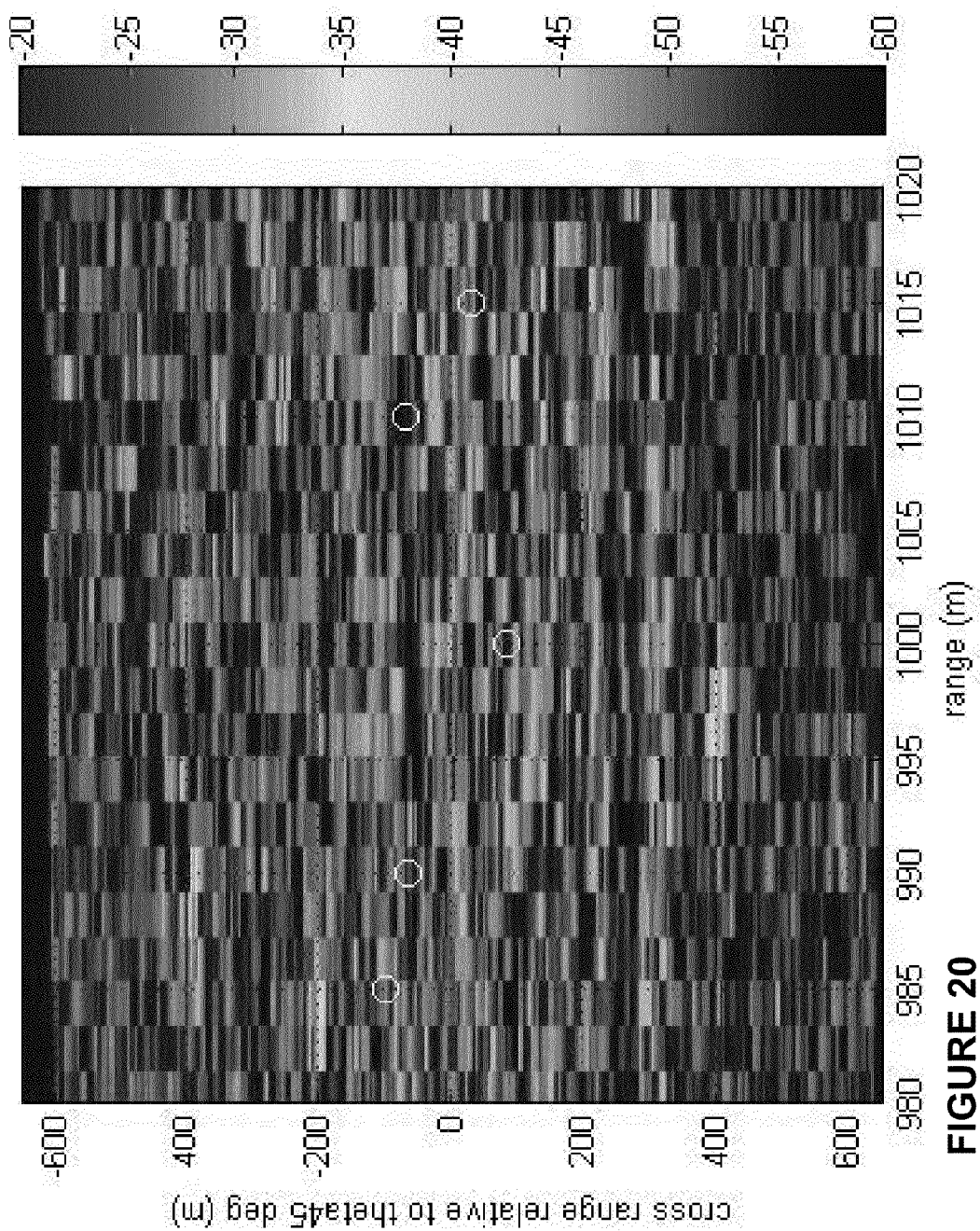
FIG. 20 shows a Normalized SAR image difference calculated with efficient processing and 3×3-element FIR calibration.

FIG. 20. Normalized SAR image difference calculated with efficient processing and 3×3-element FIR calibration.

Figure 21:
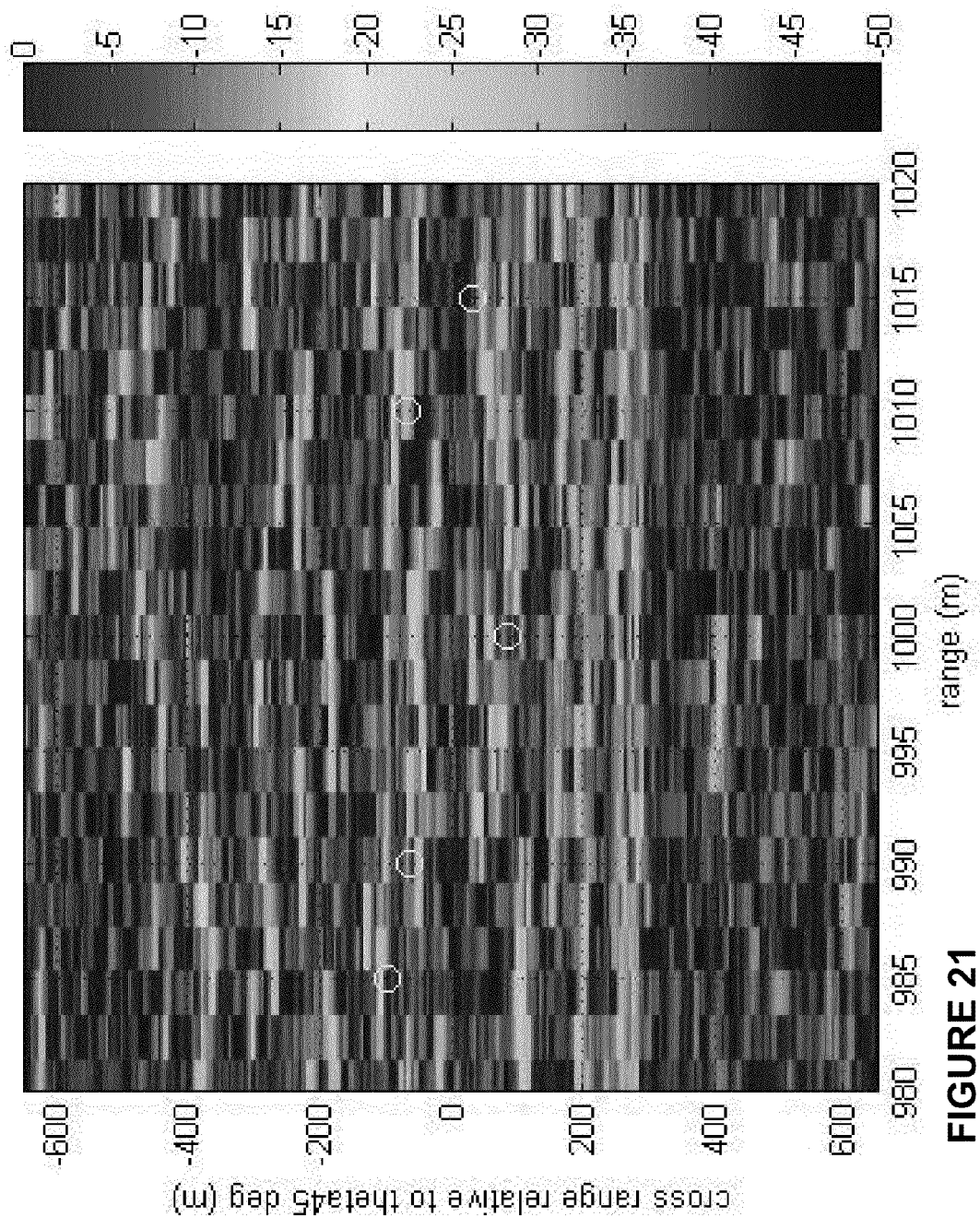
FIG. 21 shows a SAR image difference calculated with very efficient processing and 1-element FIR calibration.

FIG. 21. SAR image difference calculated with very efficient processing and 1-element FIR calibration.

Figure 22:
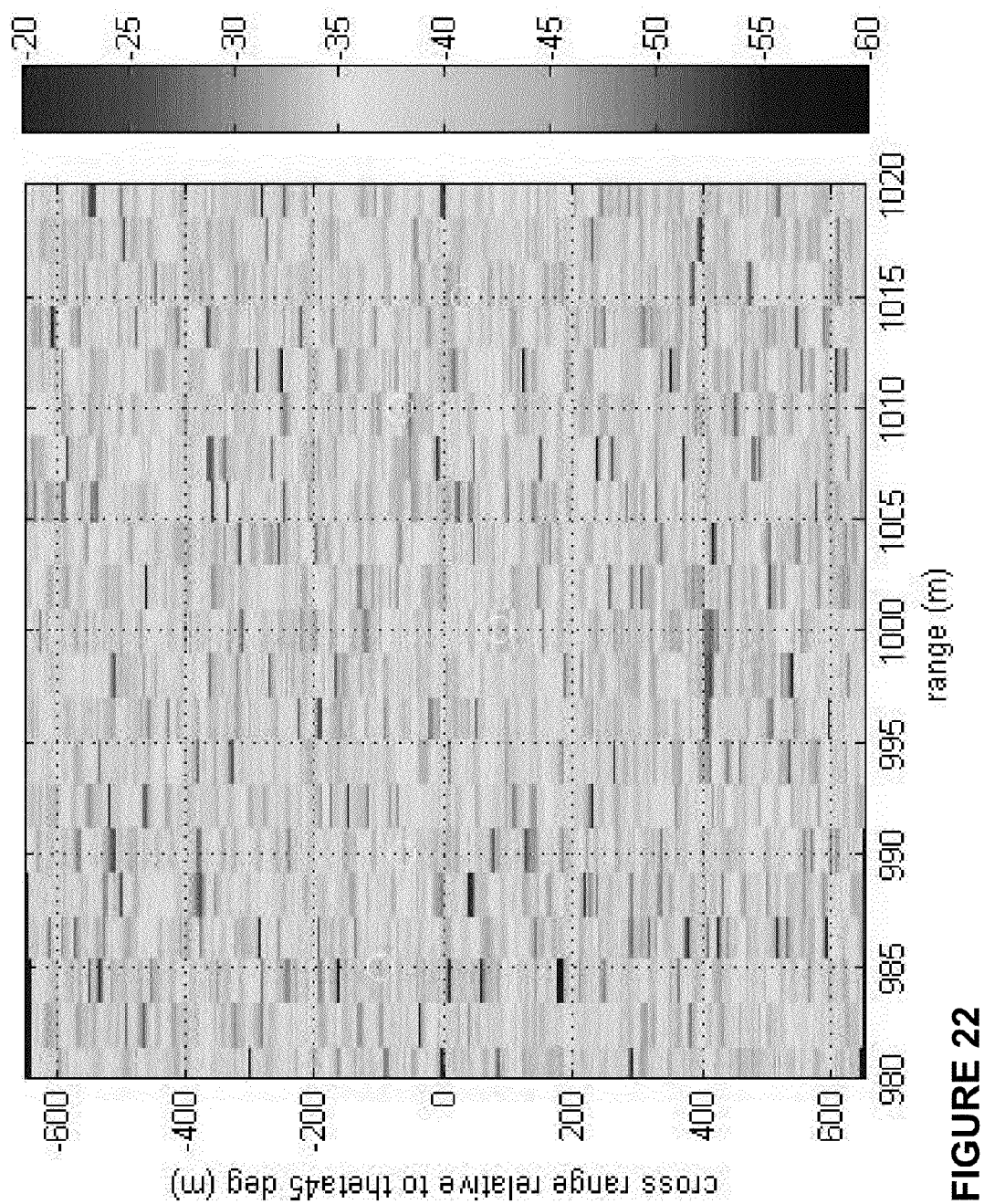
FIG. 22 shows a Normalized SAR image difference calculated with very efficient processing and 1-element FIR calibration.

FIG. 22. Normalized SAR image difference calculated with very efficient processing and 1-element FIR calibration.

Figure 23:
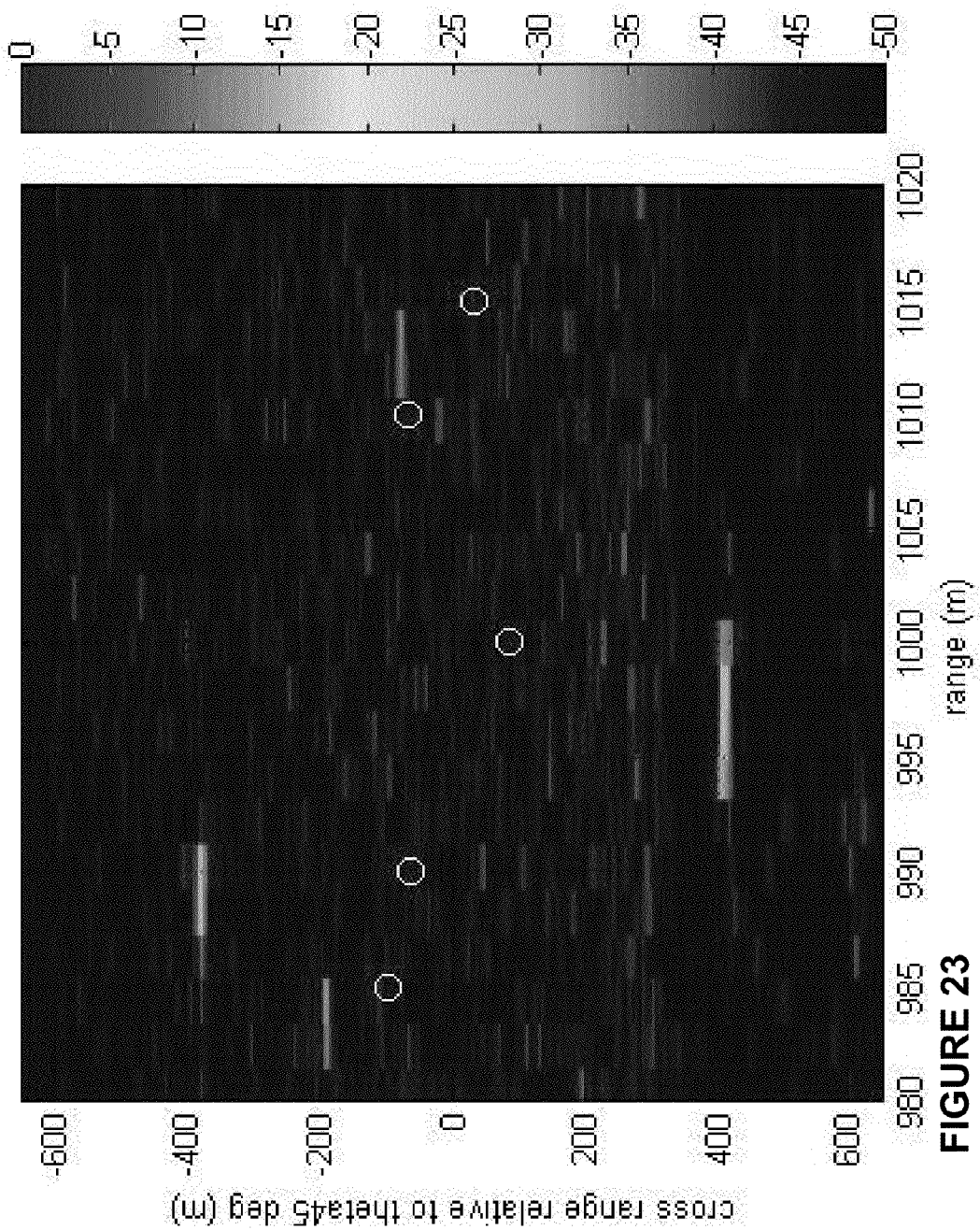
FIG. 23 shows a SAR image difference calculated with very efficient processing and 3×3-element FIR calibration.

FIG. 23. SAR image difference calculated with very efficient processing and 3×3-element FIR calibration.

Figure 24:
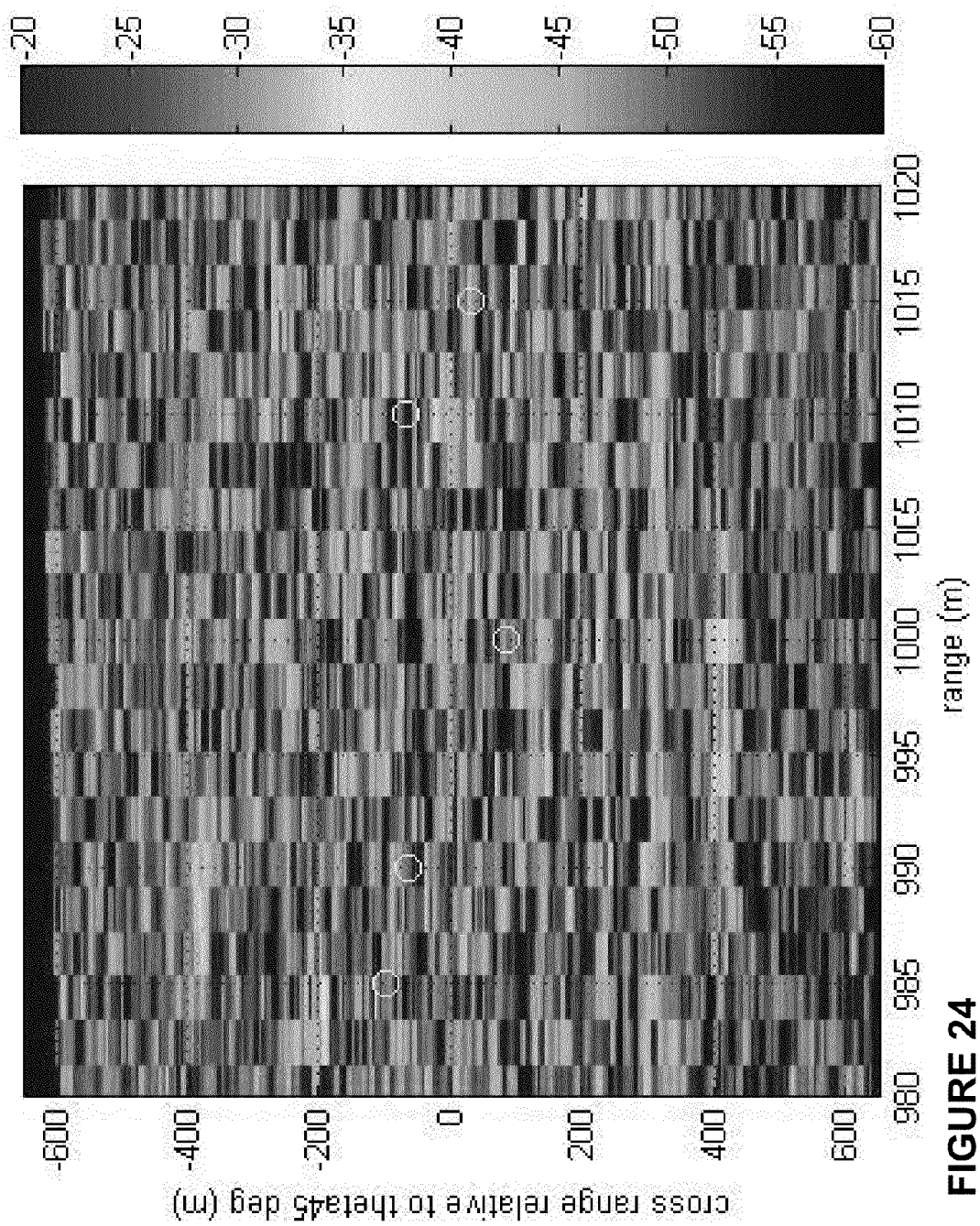
FIG. 24 shows a Normalized SAR image difference calculated with very efficient processing and 3×3-element FIR calibration.

FIG. 24. Normalized SAR image difference calculated with very efficient processing and 3×3-element FIR calibration.

FIGS. 13 and 14 show the SAR images of the six moving targets described in table 5 with no clutter. The fast moving target does not image, while the slower moving targets are more focused. As expected, the targets in FIG. 13 are more focused than the targets in FIG. 14. Next, clutter was added to the SAR image of the moving targets. FIGS. 15 and 16 show the SAR images generated using the right and left antennas using "efficient processing". FIG. 17 shows the difference between the two images after calibration using a 1-element FIR filter and FIG. 18 shows the normalized difference. FIG. 19 shows the difference between the two images after calibration using a 3×3 element FIR filter and FIG. 20 shows the normalized difference. Next, results are shown for "very efficient processing". FIG. 21 shows the difference between the two images after calibration using a 1-element FIR filter and FIG. 22 shows the normalized difference. FIG. 23 shows the difference between the two images after calibration using a 3×3 element FIR filter and FIG. 24 shows the normalized difference.

These simulated results were in good agreement with the predicted results shown in FIG. 12. As expected, targets 1 and 3 were not observable. Targets 2 and 4 were easily observed, and targets 5 and 6 could be seen, but would be detected with a high false alarm rate. These results indicate that target imagery difference for GMTI is slightly better for the more computation complex SAR algorithm described in FIG. 3. The calibration based upon the 3×3-element FIR filter produced much better results than the calibration based upon the 1-element FIR filter. However, the normalization procedure improved the results for the 1-element FIR calibration much more than the results for the 3×3-element FIR calibration.

Figure 25:
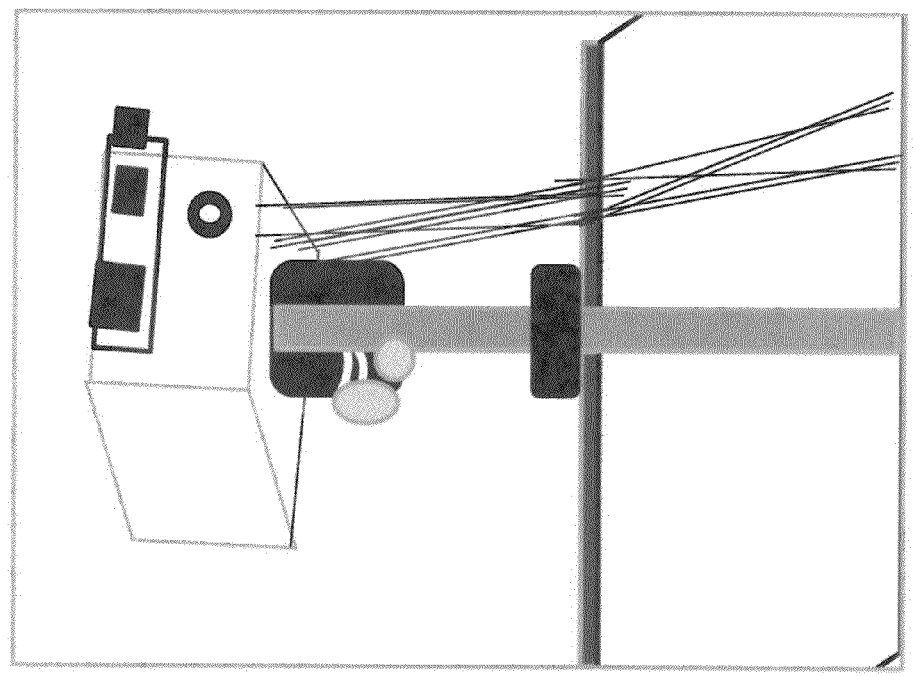
FIG. 25 shows a ARL FMCW radar mounted on a pick-up truck.

The SAR based GMTI algorithms developed for the proposed radar for the UAV were tested using measured radar collected. Data was collected using a low power CW radar with linear frequency modulation (LFM) that was mounted on a pick-up truck as shown in FIG. 25. The horn on the right is for transmit, and the two horns on the left are for receive. The phase centers of the two receive horns are separated by 5½ inches. The parameters for the radar are given in table 6.

FIG. 25. ARL FMCW radar mounted on a pick-up truck. Table 6×. ARL FMCW radar parameters.

Figure 26:
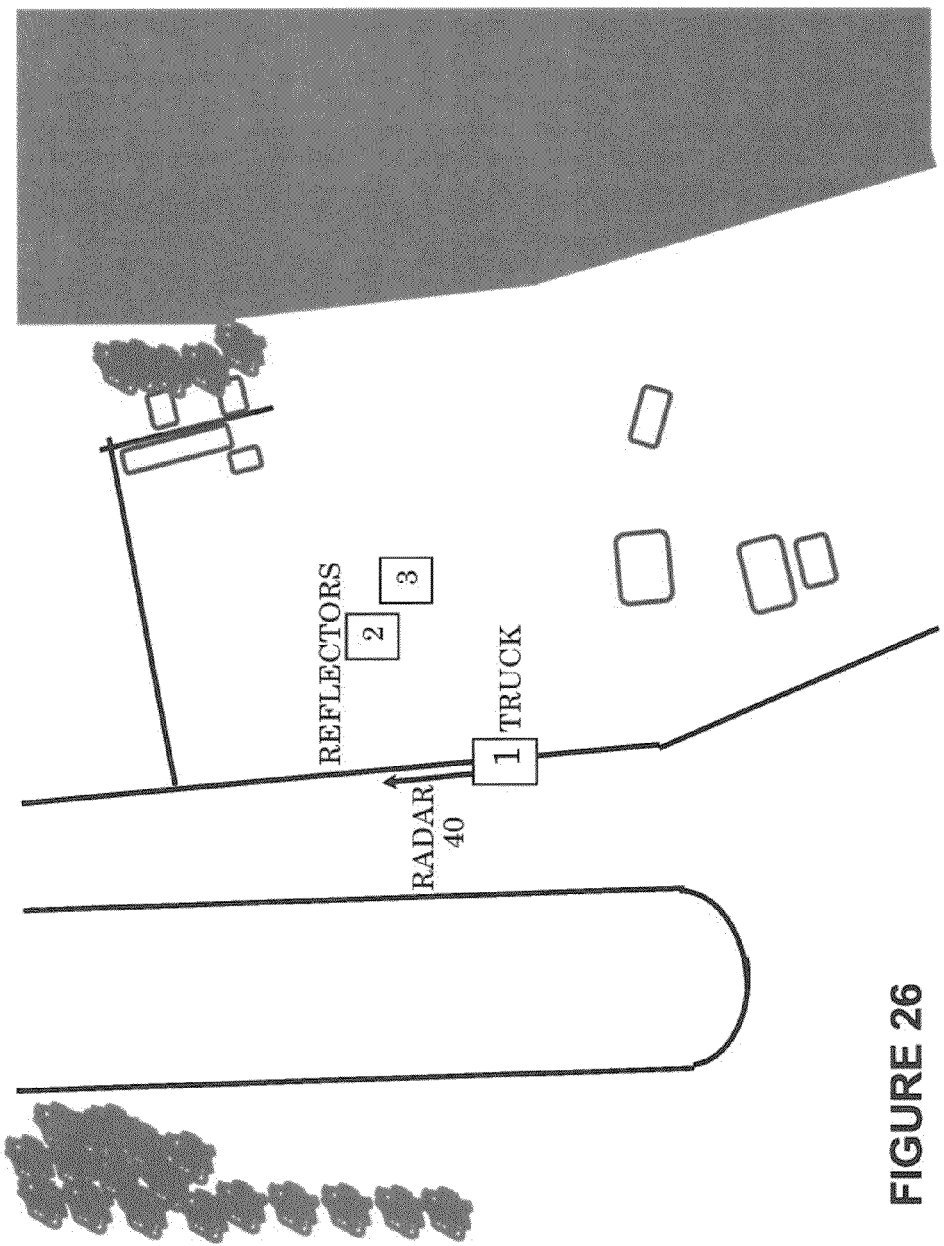
FIG. 26 shows a satellite picture of field test site.
Figure 27:
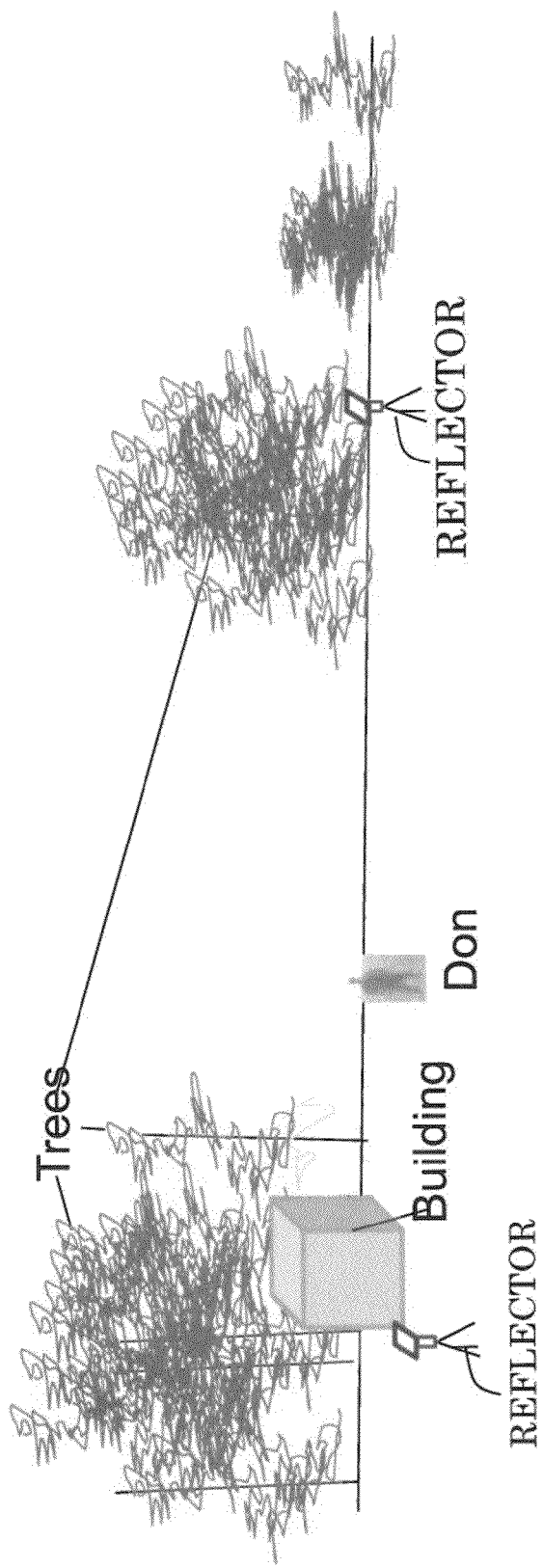
FIG. 27 shows a picture of the field test site.

The radar was used to collect data that was used to test the SAR and GMTI algorithms developed for the UAV. FIG. 26 shows a satellite picture of the field test site. In-phase and quadrature phase (I/Q) data were collected as the radar was driven down the road at approximately 7 to 10 mph. There were two reflectors in the scene at ranges of approximately 100 and 125 m that were separated in cross range by approximately 30 meters. There is a building and some trees at ranges of approximately 250-300 meters. FIG. 27 shows a picture of the two reflectors with a person standing between them. The RCS of the reflectors is approximately 10 dBsm at 7.2 GHz. Data were taken as the person walked between the reflectors and towards the road. No GPS or INS data were available.

SAR images were generated from the I/Q radar data and the GMTI algorithms were tested. Since no vehicle motion data was collected, the images were focused using the returns from the reflector at a range of 125 meters. The phase of the returns from the reflector in the HRR profiles was used to focus the entire scene. This corresponds approximately to the processing scheme shown in FIG. 4. Next, SAR images were generated by performing FFTs across the range bins of interest. The data was processed with and without averaging and using two techniques to calibrate the SAR images measured with the left and right receive antennas.

Figure 28:
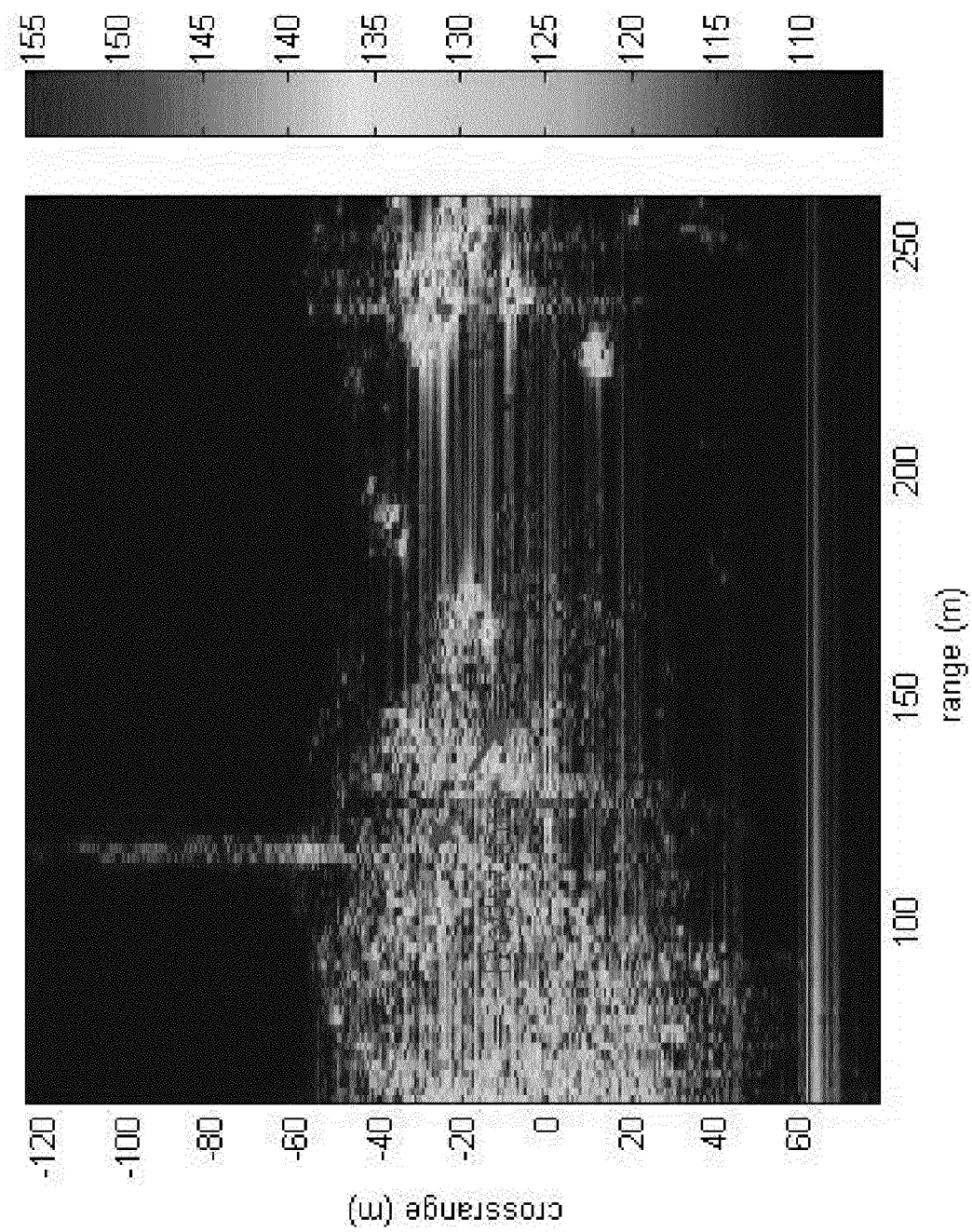
FIG. 28 shows a SAR image of the scene measured.
Figure 29:
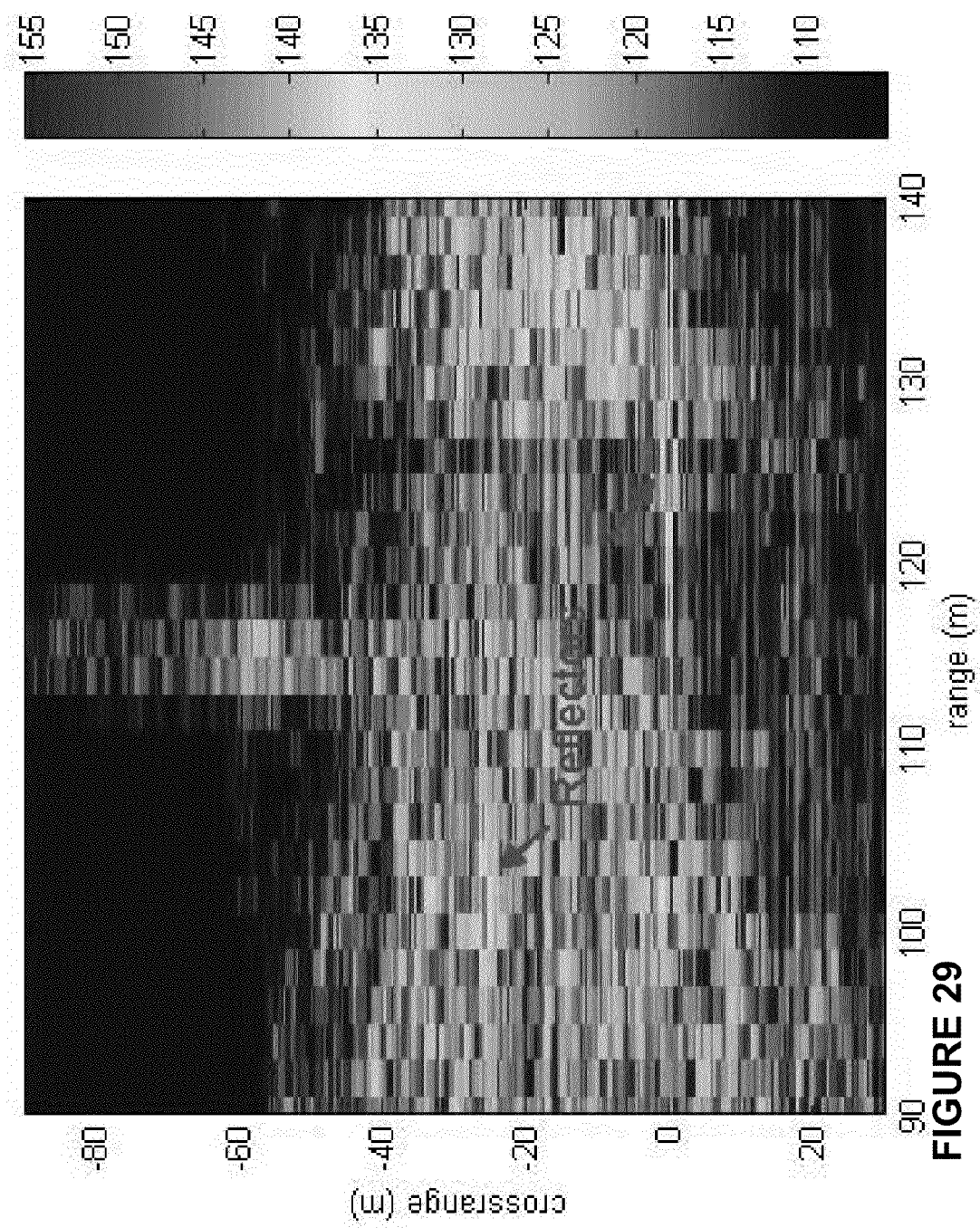
FIG. 29 shows a zoomed in region of the SAR image of the scene measured with the right receive antenna.
Figure 30:
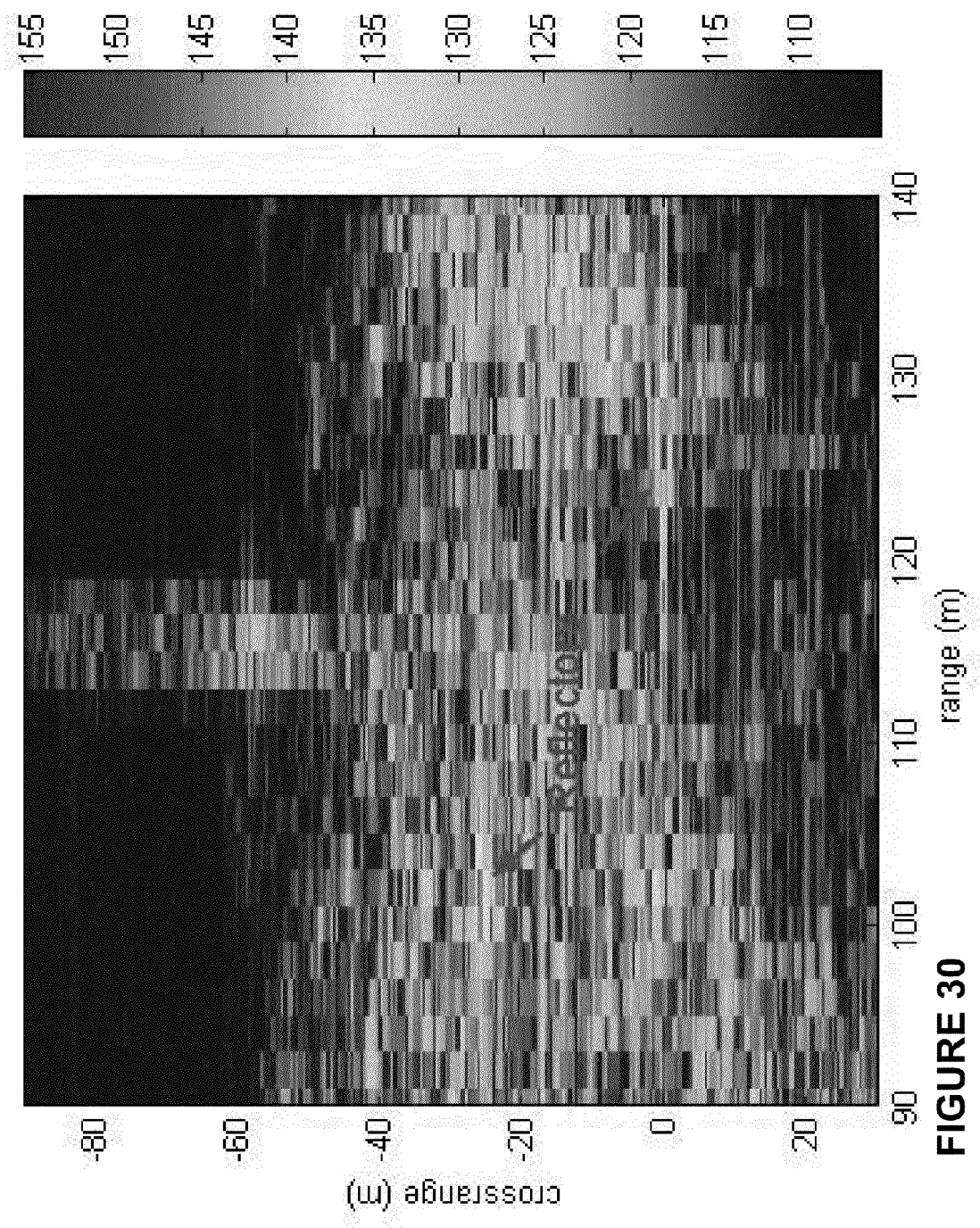
FIG. 30 shows a zoomed in region of the SAR image of the scene measured with the left receive antenna.

FIG. 28 shows a SAR image of the scene generated with no averaging of the radar pulses. The images were generated using 4096 chirps of data. The crossrange scale is based upon a range of 115 meters and a vehicle speed of 7.25 mph. The SAR image roughly corresponds to the satellite image shown in FIG. 26. FIG. 29 shows a zoomed in region of FIG. 28. FIG. 30 shows the same zoomed in region as shown in FIG. 29. However, the data was collected with the antenna on the right and 54 chirps of data were skipped at the beginning of the data and an additional 54 chirps of data were processed at the end. These SAR images show that the reflectors are imaged at their correct downrange location. However, the predicted crossrange separation of the reflectors is 30 meters and the SAR imagery indicates a separation of approximately 25 meters. This difference may be caused by an error in the estimate speed of the pick-up truck.

Figure 31:
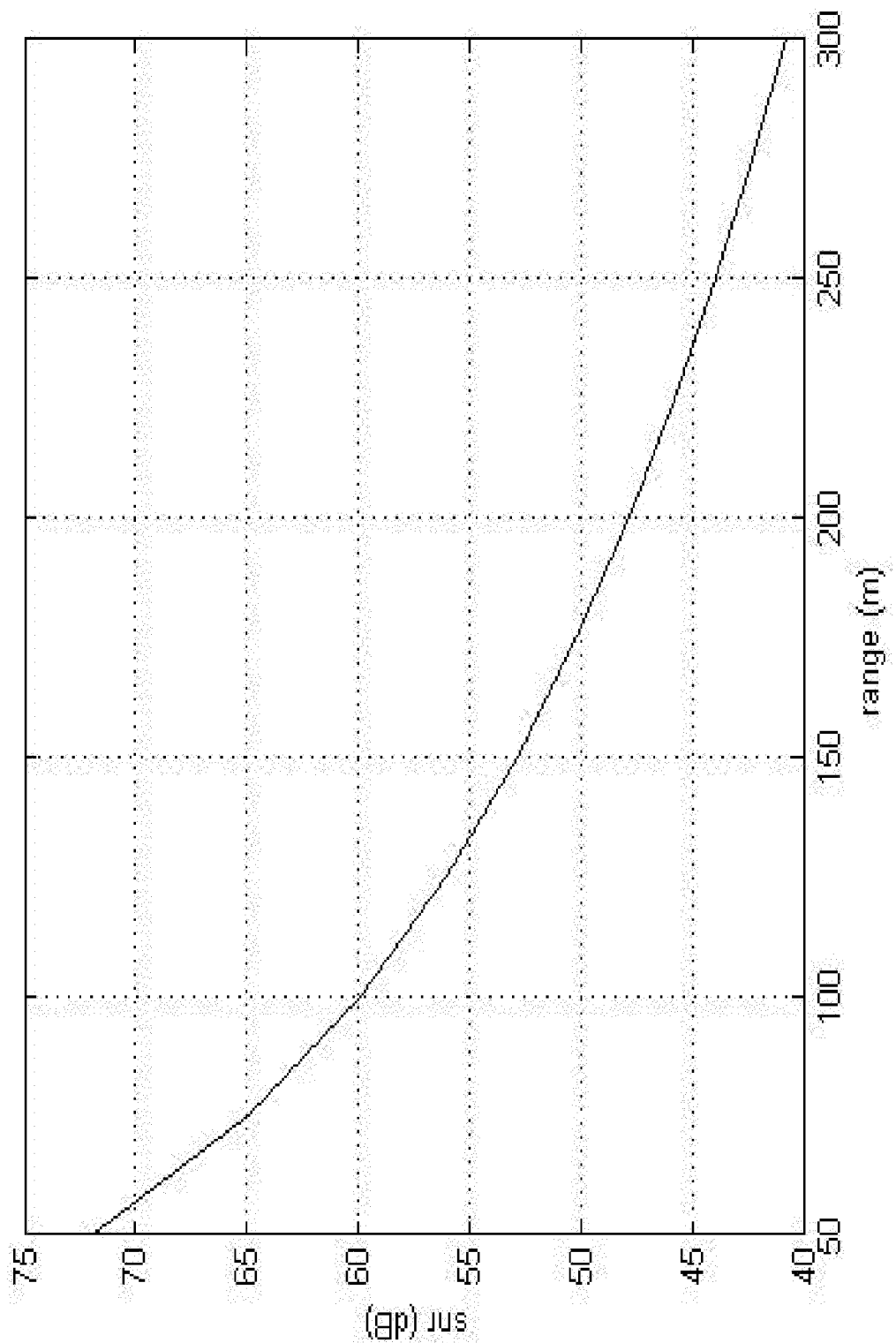
FIG. 31. Predicted performance of the GMTI algorithm with ARL's FMCW radar.

The results for the average predicted performance of the GTMI algorithm is shown in FIG. 31 for targets moving at 1 m/s. For this scenario, multipath can have a significant impact on the performance. At the ranges of interest, the affect of multipath is highly dependent upon the geometry, which was not accurately characterized. Therefore, the affect of multipath is ignored in the predicted performance. These results assume that the radar performance is thermal noise limited, and full processing gain is achieved in the signal processing algorithm, and the clutter is completely cancelled. These results indicate that a target moving at 1 m/s at a range of 125 meters should have a SNR of approximately 55. These estimates assume no losses, and are not expected to be achieved using the measured data. However, the radar signature of the person should be clean and easily distinguishable.

Figure 32:
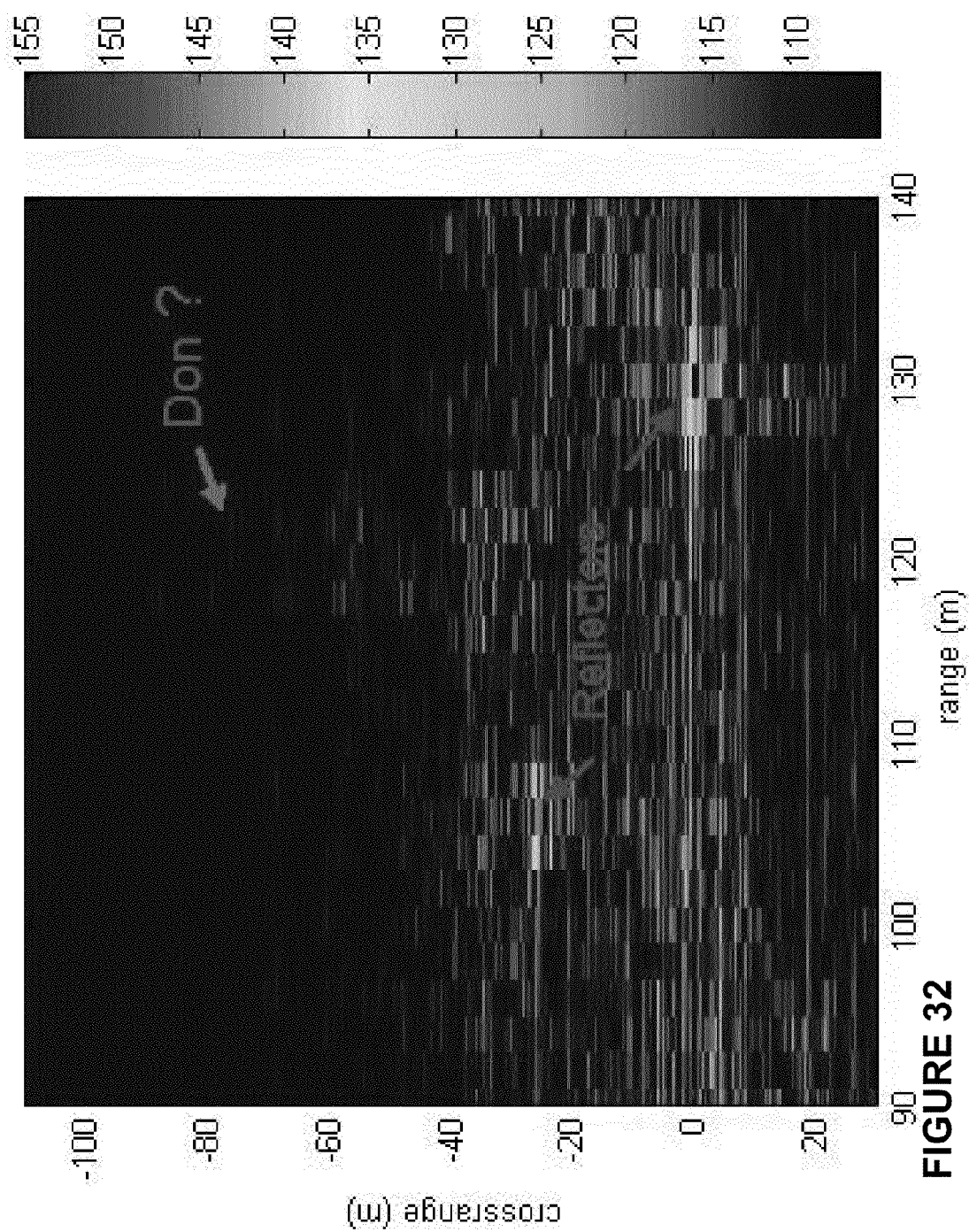
FIG. 32. Noncoherent difference between SAR images measured with the right and left receive antennas and calibrated with 1-element FIR filter.
Figure 33:
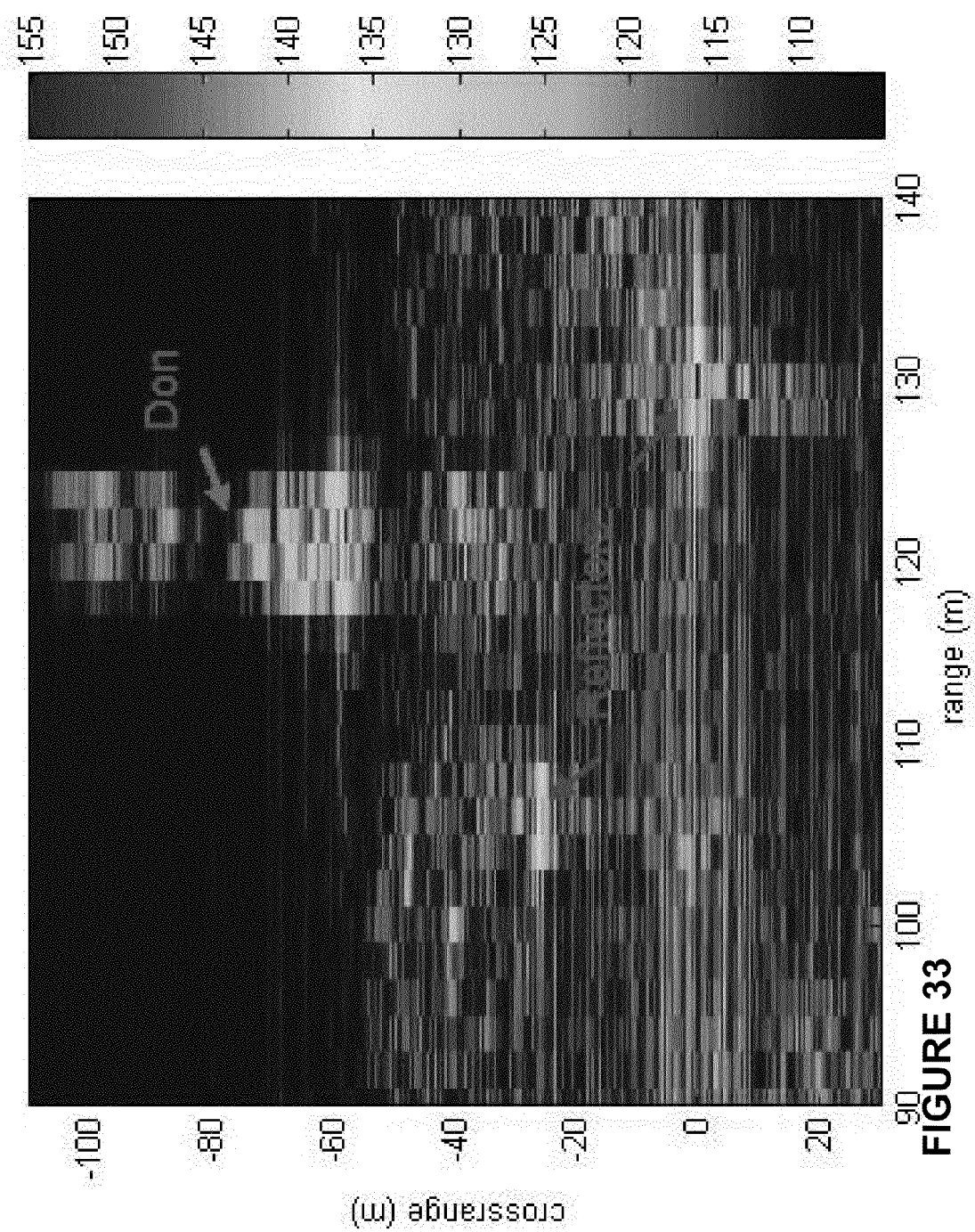
FIG. 33. Coherent difference between SAR images measured with the right and left receive antennas and calibrated with 1-element FIR filter.
Figure 34:
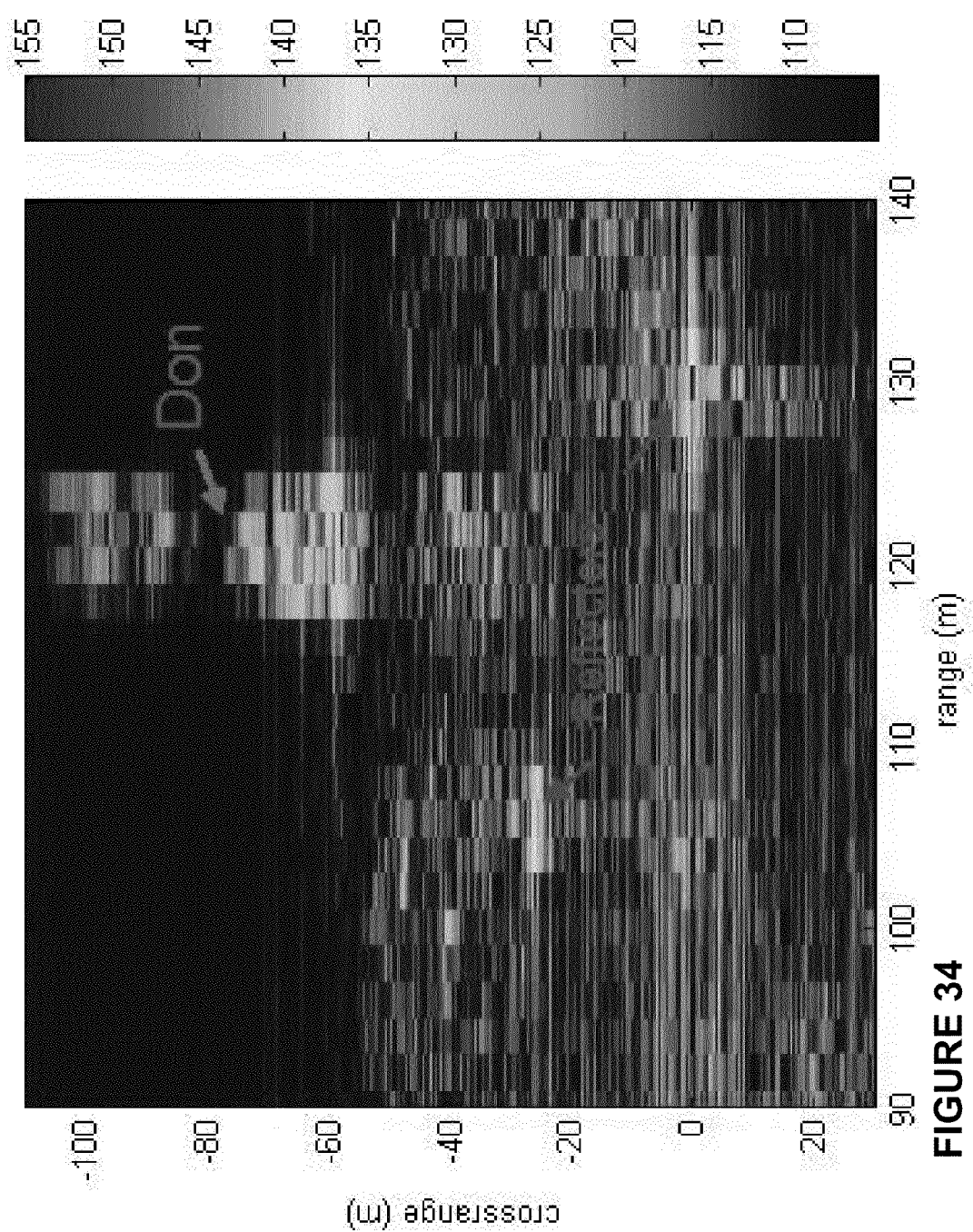
FIG. 34. Normalized coherent difference between SAR images measured with the right and left receive antennas and calibrated with 1-element FIR filter.
Figure 35:
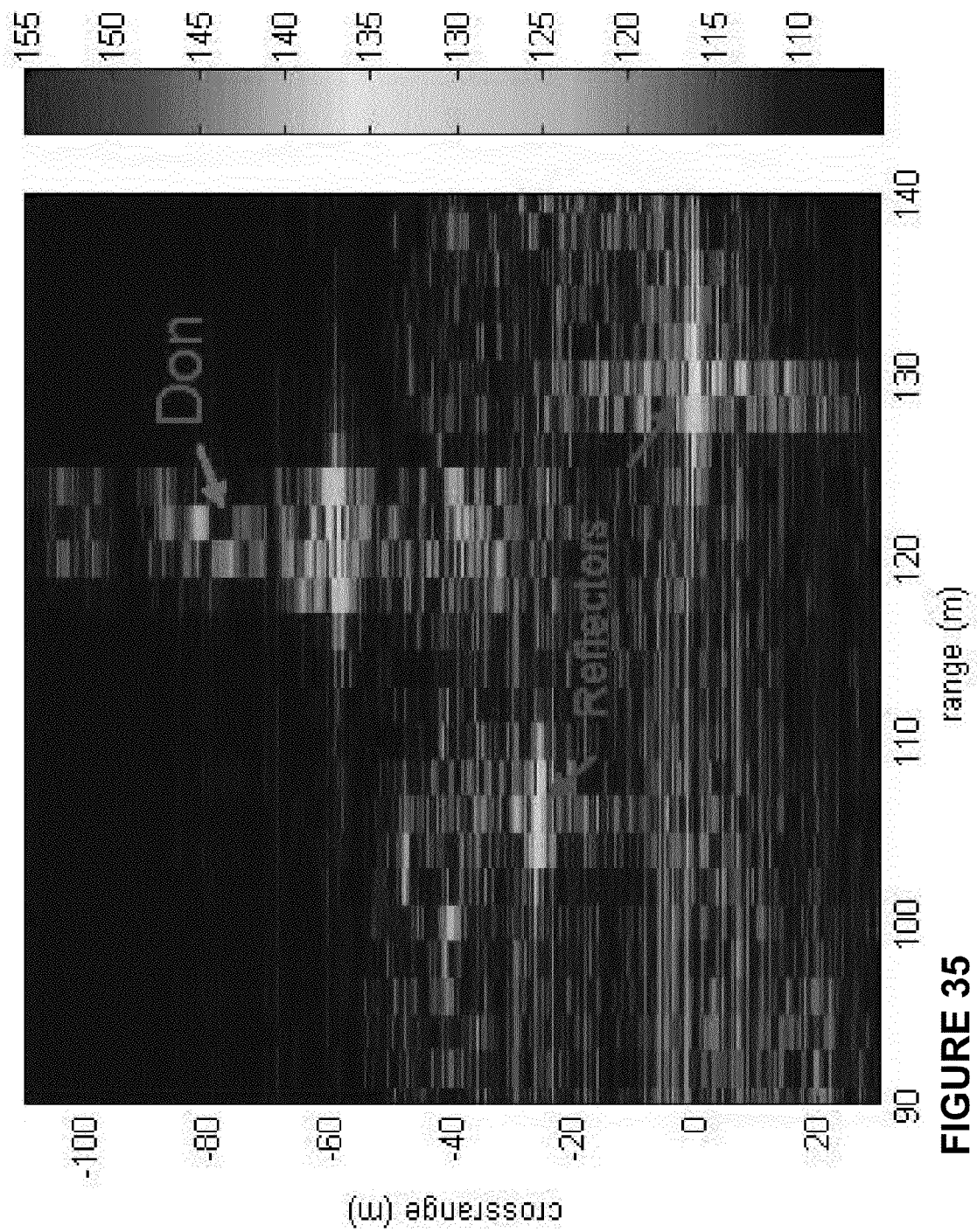
FIG. 35. Coherent difference between SAR images measured with the right and left receive antennas and calibrated with 3-element FIR filter.
Figure 36:
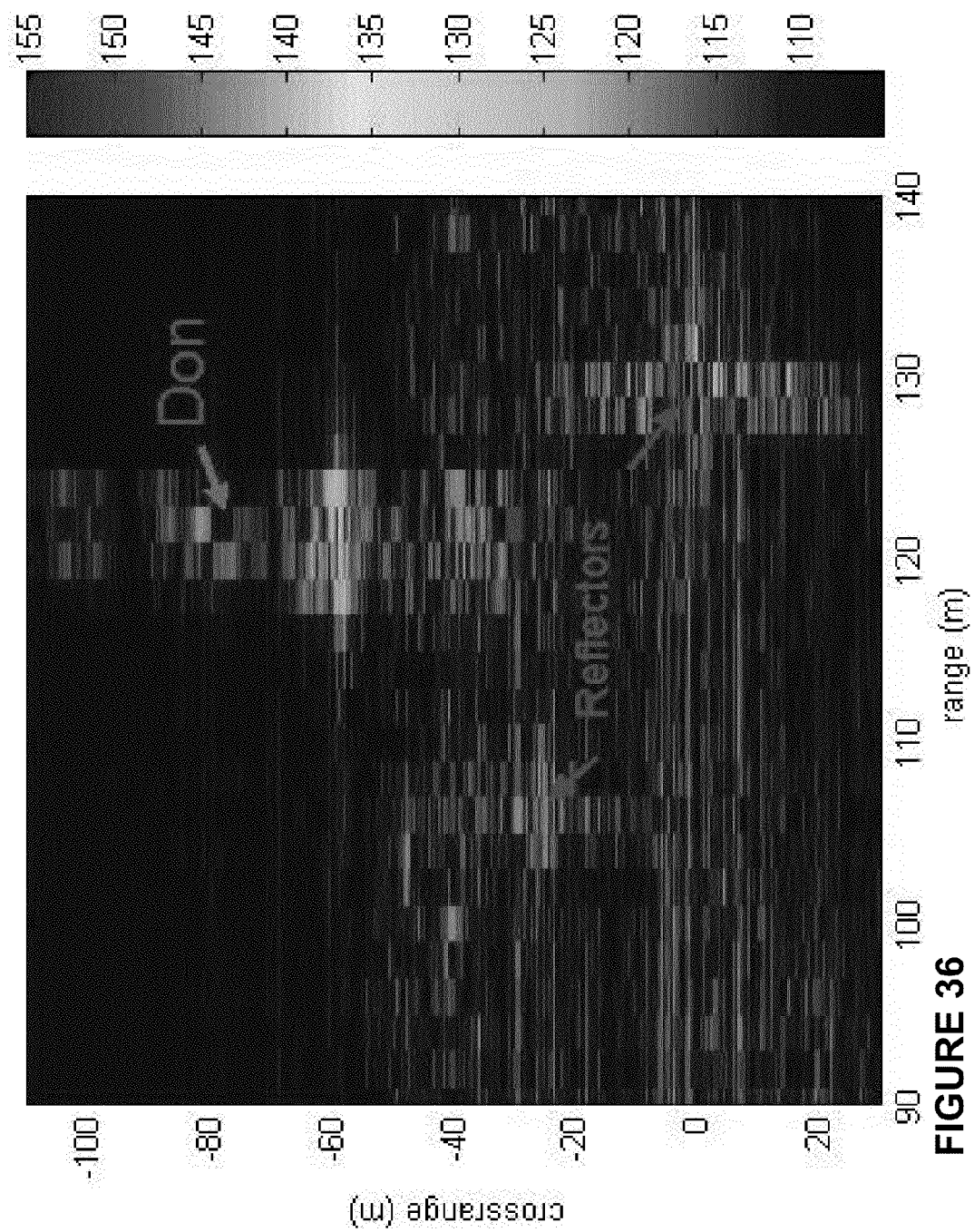
FIG. 36. Normalized coherent difference between SAR images measured with the right and left receive antennas and calibrated with 3-element FIR filter.

FIG. 31 shows the predicted performance of the GMTI algorithm with ARL's FMCW radar. The difference between the two SAR images in FIGS. 29 and 30 was performed to locate the moving person. The image in FIG. 30 was calibrated using the signal subspace decomposition technique with both a 1-element FIR filter and a 1×3-element FIR filter. Next, to illustrate the advantage of coherent subtraction over noncoherent subtraction, the noncoherent difference between FIGS. 30 and 31, calibrated using a 1-element FIR filter, was calculated and is shown in FIG. 32. Next, the coherent difference between FIGS. 29 and 30 was calculated and is shown in FIG. 33. As expected, the noncoherent image difference cancels the returns from the person and the coherent image difference does not. FIG. 34 shows the normalized SAR image difference calculated using (1). Next, the SAR images are calibrated using a 1×3-element FIR filter where the three coefficients are associated with the crossrange data. FIGS. 35 and 36 show the image difference and normalized image difference. These results indicate that the larger FIR filter cancels the clutter better with minimal impact on the signature of Donnie.

Figure 37:
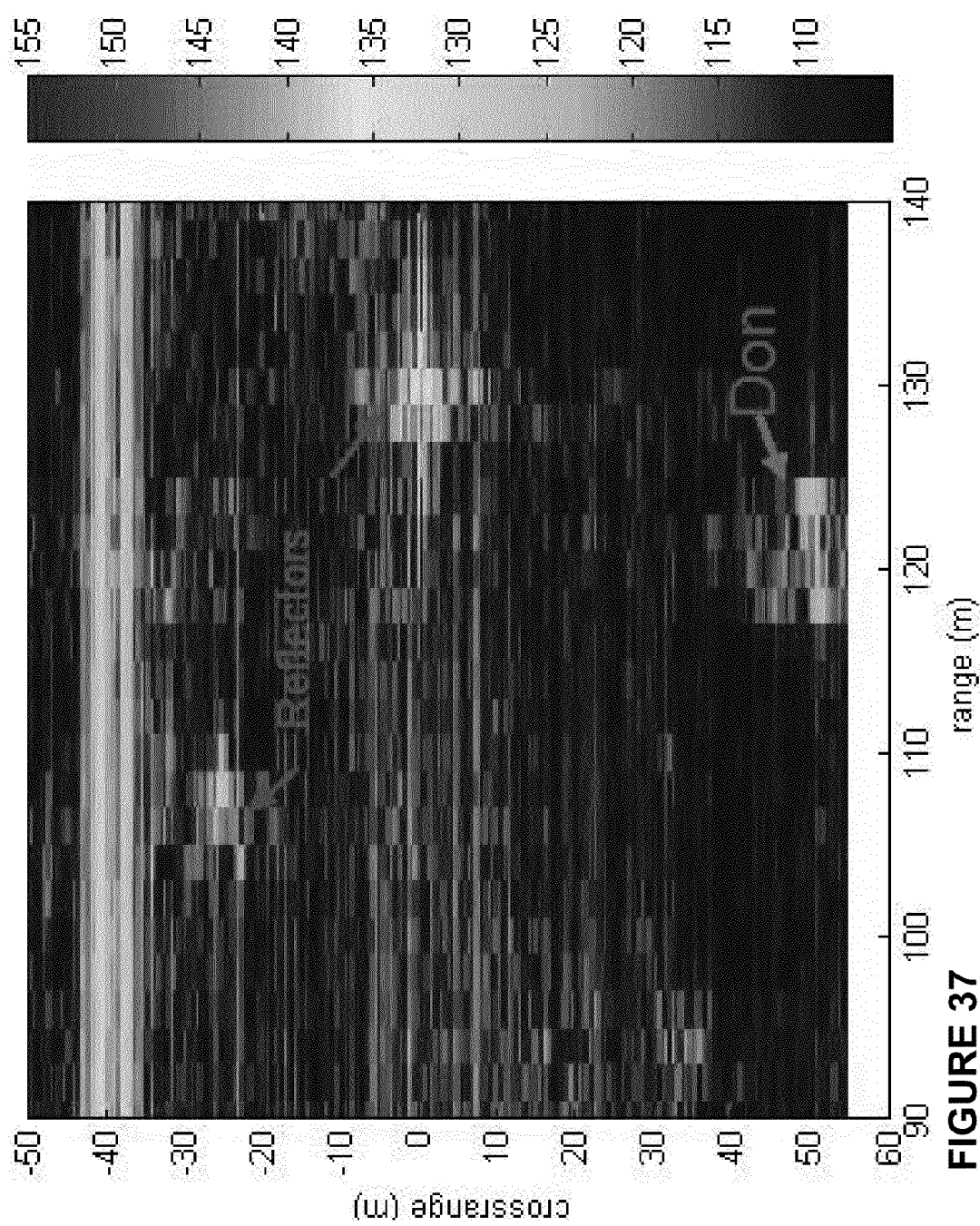
FIG. 37. Coherent difference with averaging between SAR images measured with the right and left receive antennas and calibrated with 1-element FIR filter.
Figure 38:
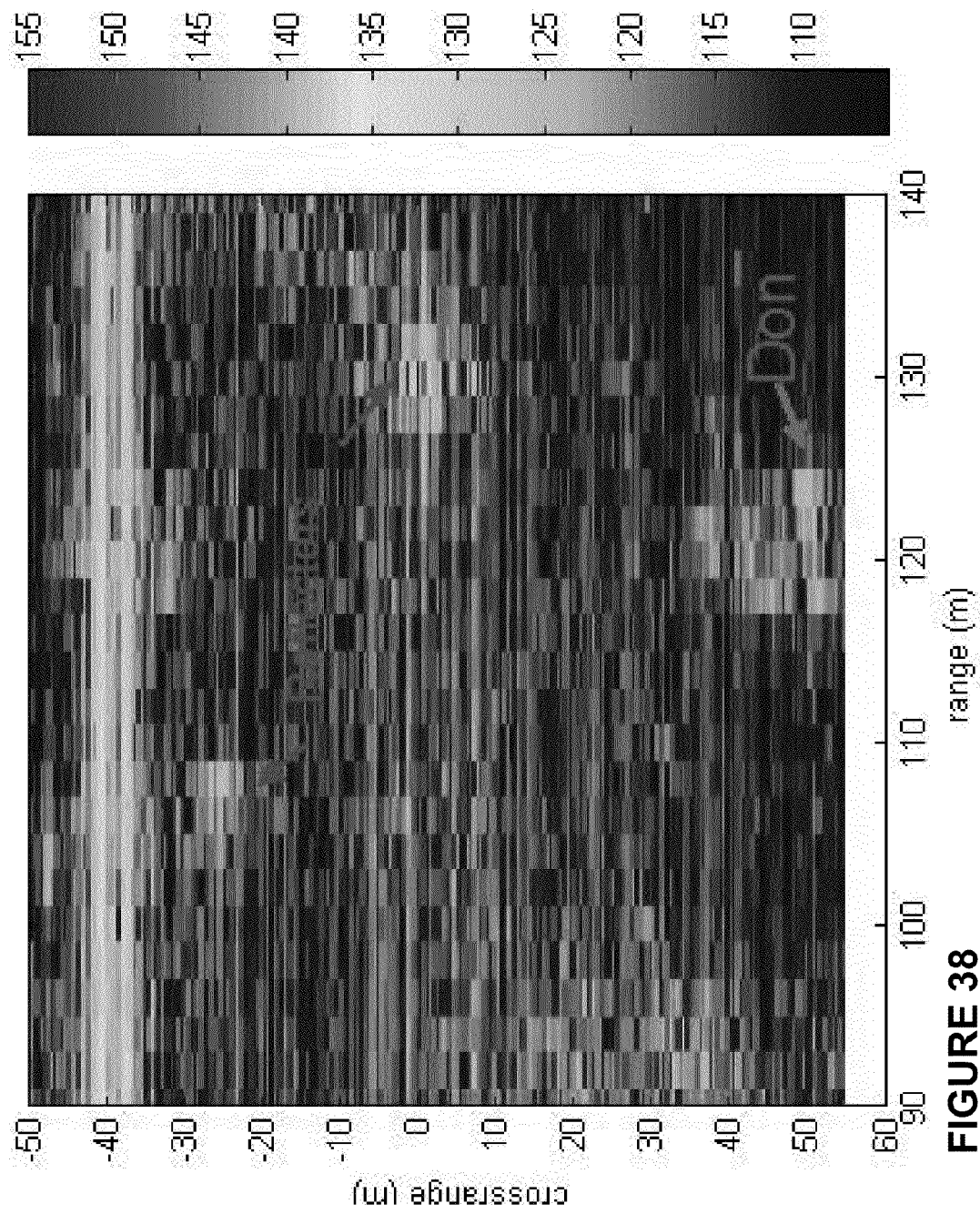
FIG. 38. Normalized coherent difference with averaging between SAR images measured with the right and left receive antennas and calibrated with 1-element FIR filter.
Figure 39:
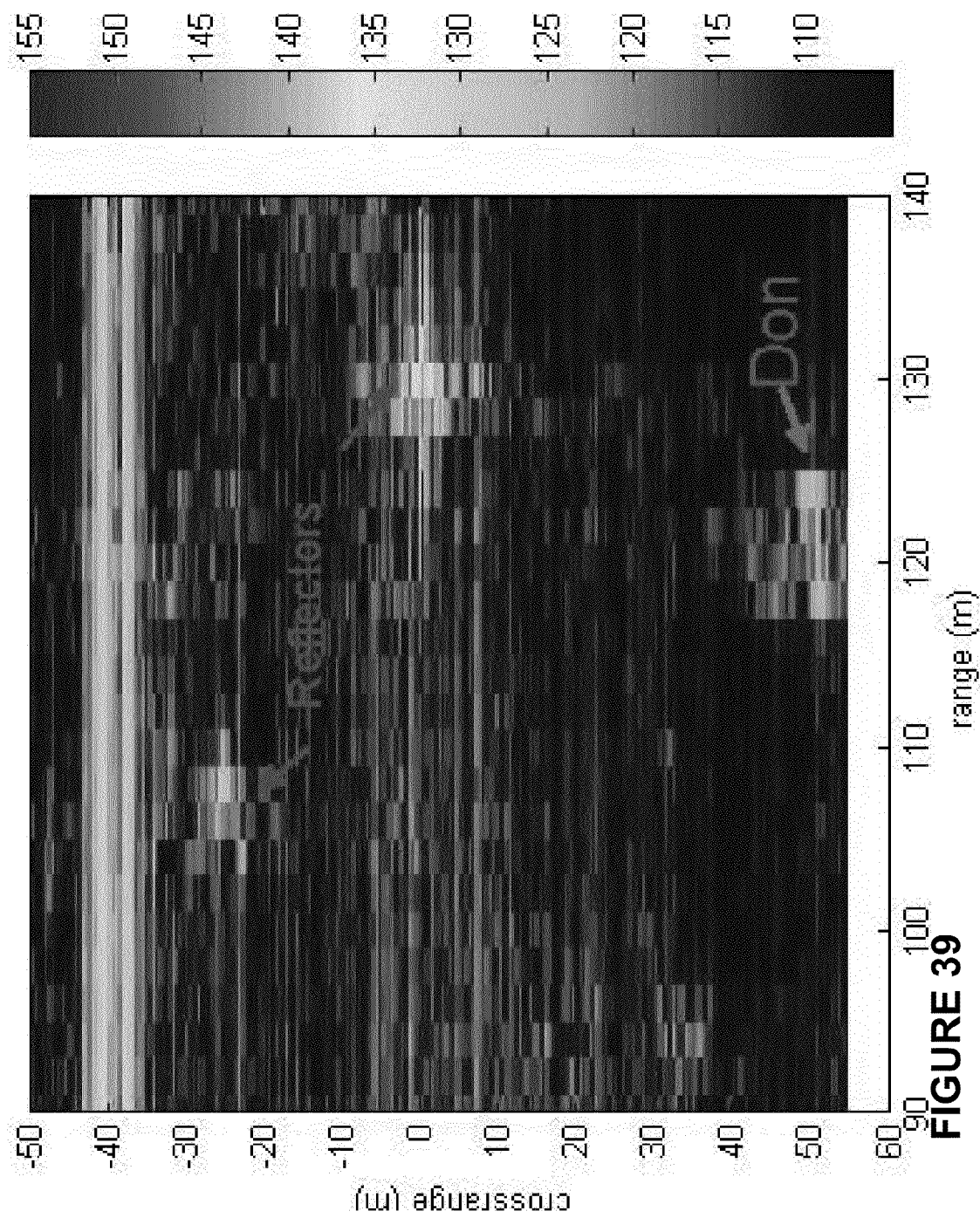
FIG. 39. Coherent difference with averaging between SAR images measured with the right and left receive antennas and calibrated with 1×3-element FIR filter.
Figure 40:
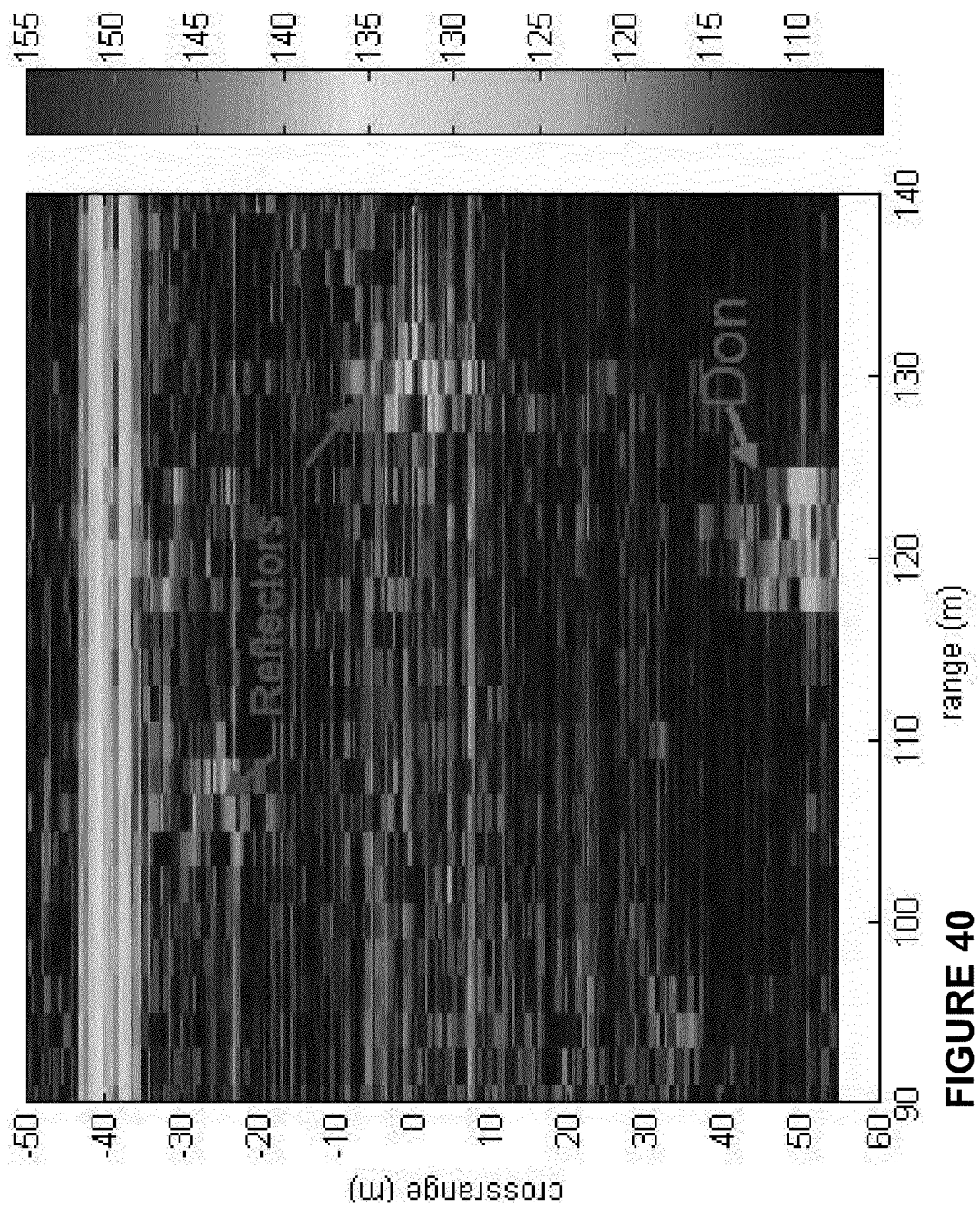
FIG. 40. Normalized coherent difference with averaging between SAR images measured with the right and left receive antennas and calibrated with 1×3-element FIR filter.

To more closely simulate the performance of the GMTI algorithms developed for proposed UAV radar, the measured data were averaged, and then processed to form SAR images. First, two chirps of data were averaged together without any motion compensation, then eight of these processed pulses were range compressed, motion compensated, then averaged. This resulted in the data being decimated by a factor of 16. SAR images were generated by performing an FFT across the range bins of interest. FIGS. 37 and 38 show the image difference and the normalized image difference calculated with averaging and calibrated using a 1-element FIR filter. FIGS. 39 and 40 show the image difference and the normalized image difference calculated with averaging and calibrated using a 1×1-element FIR filter. Donnie's radar signature is observed in FIGS. 37 to 40, however, the location of the signature has changed from the previous results due to aliasing. The radar returns from Donnie exhibits the classic micro-Doppler effects. The main signal is the return from the trunk. On either side of this signal, are the returns from the arms and legs, which have a small Doppler offset relative to the return from the trunk. All the figures contain a large streak caused by an unknown artifact in the radar. This streak is also present in the non-averaged data shown in FIG. 27, but without any aliasing. This artifact is of no consequence and should be ignored.

As expected, the SNR of Donnie's signature is visually improved by using more coefficients in the FIR filter and by normalizing the results. These results visually demonstrate that the algorithm described in FIG. 4 can be used to detect dismounts. The SNR of the radar signature of Donnie is high, but it is less than the predicted range of 55 to 60 dB. This result is not surprising, since there were a large number of assumptions made that are not strictly valid.

Computational efficient SAR and SAR-based GMTI algorithms were developed and tested for a proposed radar. The results from the SAR simulation indicated that focused imagery with 2×2.6 meter resolution at a range of 500 meters could be obtained. The algorithms support higher resolution SAR imagery, but the proposed radar did not support the increased bandwidth requirements.

SAR-based GMTI algorithms for detecting dismounts were developed and tested using simulated and measured data. The simulation indicated that for the UAV traveling at 3 m/s, dismounts moving at 1 m/s could be observed at a range of 1 kilometer. This was in agreement with the theoretical predictions. The performance of the algorithm improved as more computational intensive SAR processing and calibration techniques were evaluated. The SAR-based GMTI algorithms were tested with radar data collected. Data were collected on a dismount as an ARL instrumentation radar was driven down the road. The radar signature with classic micro-Doppler effects was observed.

Radar System Specifications. A linear frequency modulated continuous wave (FMCW) radar with homodyne demodulation and an interferometric capability in azimuth is proposed to meet the above requirements. Table 1 shows the major design specifications for the radar. The frequency response of signals output by the radar is between 125 KHz and 2.5 MHz. These signals are sampled at 10 MSPS with a 12-bit analog-to-digital converter (ADC).

The simulation software modeled all the major factors that affect the performance the proposed UAV radar. The return signal from targets was modeled using the standard radar equation. The radar model included the effects of range, component noise, transmit power, antenna, and various noise sources. The antenna was modeled as either a Gaussian or isotropic radiator. The noise in the simulation included the leakage signal, phase noise, thermal noise, and crystal vibration effects. The electromagnetic scattering from targets and clutter were modeled as isotropic point scatterers. Multipath was not modeled, but for the geometries of interest, it is not anticipated to have a significant effect on the radar performance. The point scatter model included 3-d location, 3-d velocity vector, and a fixed amplitude and phase. The clutter was modeled statistically with point scatter models. The amplitude of the scatterers were derived from $\sigma^0$ values were specified as a function of angle. The platform was modeled using 3-velocity vector, 3-d acceleration vector, and 3-d vibration vector. The simulation parameters were input by editing a Matlab m file. Appendix A shows an example of the parameters in an mfile for a SAR simulation. The details of these factors are described below.

There were several sources of noise included in the simulation. The thermal noise was assumed to be white and Gaussian. Its power was determined by the IF bandwidth, radar noise figure, and receiver loss. This model assumed that the data was sampled at Nyquist frequency. The effect of vibration noise on the crystal oscillator was modeled as an additive term to the phase of the oscillator with an arbitrary number of harmonics. In the simulation, the fundamental frequency was approximately 133 Hz (8000 rpm/60 with 4 additional harmonics included in the model. The power level of each frequency was −26, −44, −48, −51, −65 dB below the power of the fundamental frequency of the oscillator. The signal associated with each frequency was added to the phase of the transmitted signal. The vibration of the outer structure of the UAV and the antennas attached to it were also simulated using a harmonic model. The same frequencies used to model the crystal oscillator were used to model the vibration of the UAV and the antennas attached to it. The value of the g's used in the simulation for each frequency were 10, 3, 1, 0.5, and 0 m/s2.

The phase noise model allowed arbitrary power levels for arbitrary frequency ranges. For SAR data collected on a UAV, this can require several seconds of data. This requirement is difficult to simulate using conventional techniques with a single filter.

Figure 43:
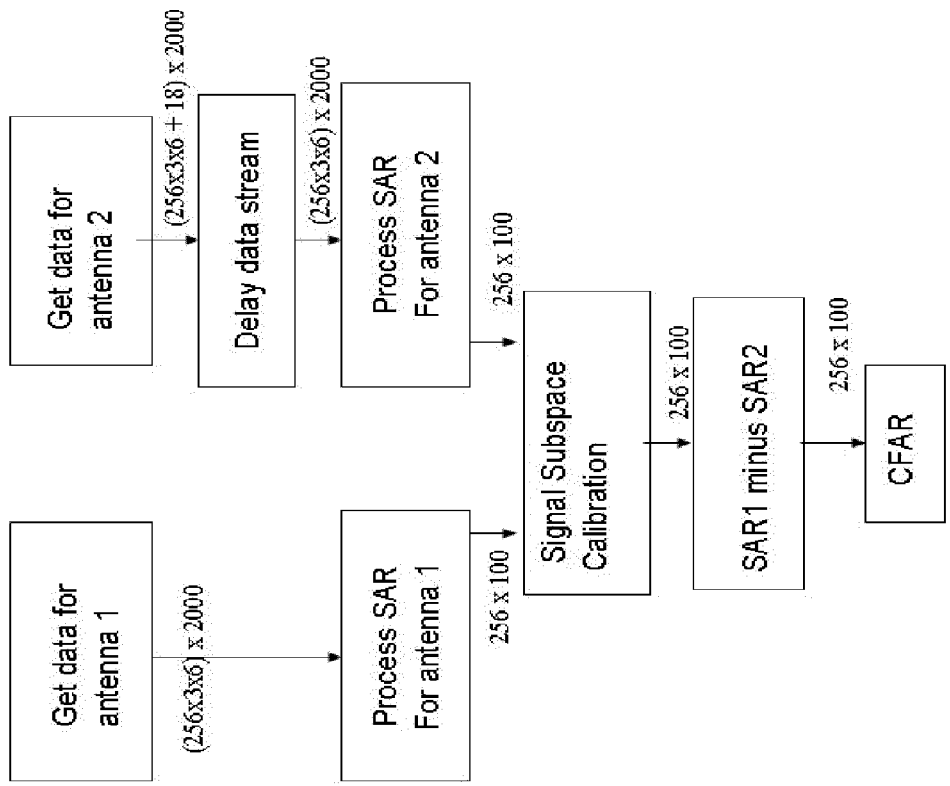
FIG. 43 shows a block diagram for GMTI based upon subtracting two SAR images.

For this simulation, the phase noise was generated by filtering white noise with two infinite impulse response (IIR) filters, interpolating, then combining the results. This process simplified the filter design problem by breaking it up into two pieces. Both filters were generated by solving Yule Walker equations for a $10^{th}$ order system. FIG. 43 shows an example of the desired and actual response for these filters. The output of the filter shown in FIG. 43a was computed once, and then interpolated over a CPI of data. The output of the filter shown in FIG. 43b was recomputed for every PRI. The results for the two data streams were added together to simulate the phase noise. This software can accept arbitrary inputs, but the user must check that the designed filters are good approximations to the specifications.

Figure 44:
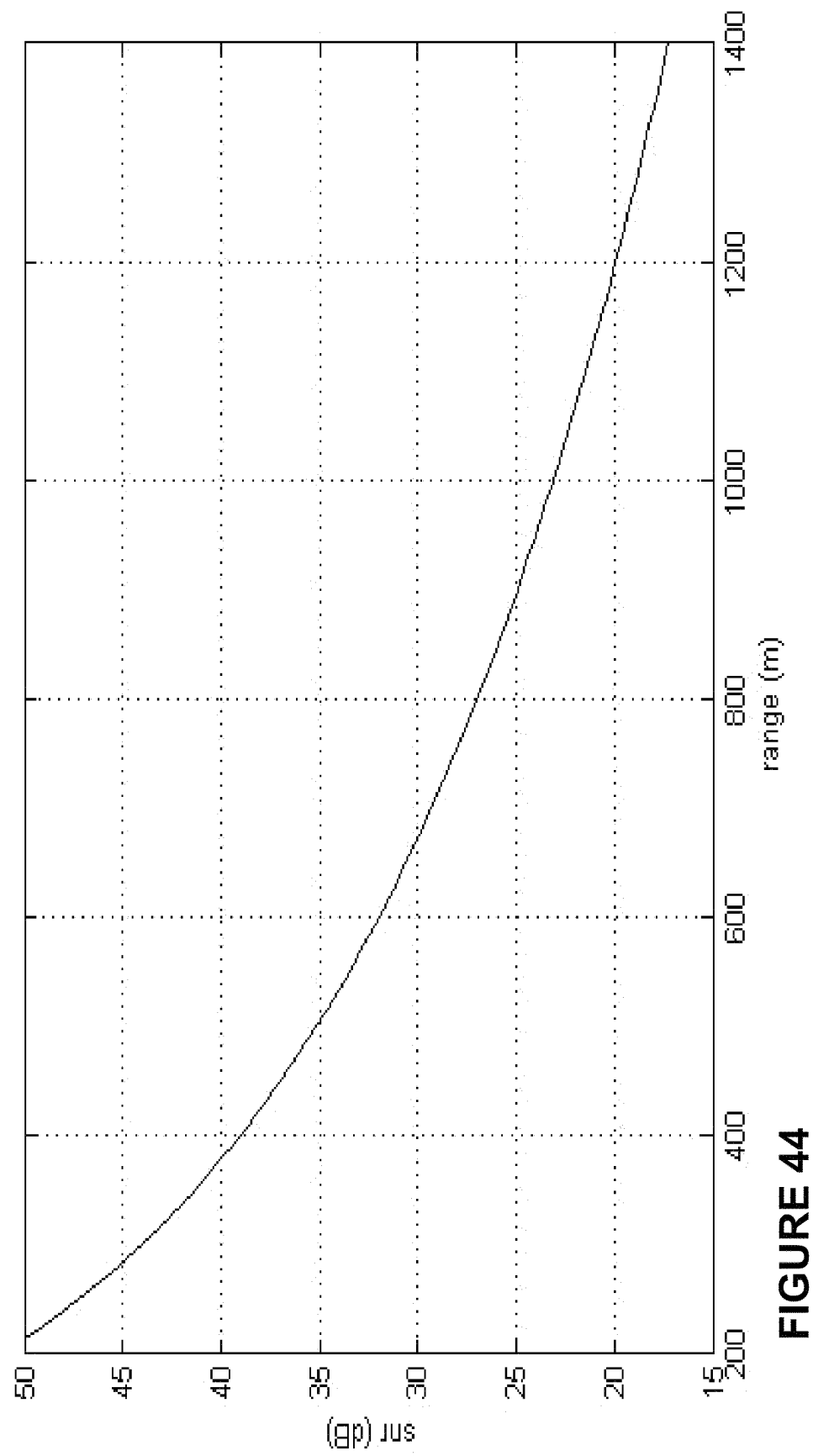
FIG. 44 shows an optimal SNR level for a dismount with a velocity of 0.5 m/s.
Figure 45:
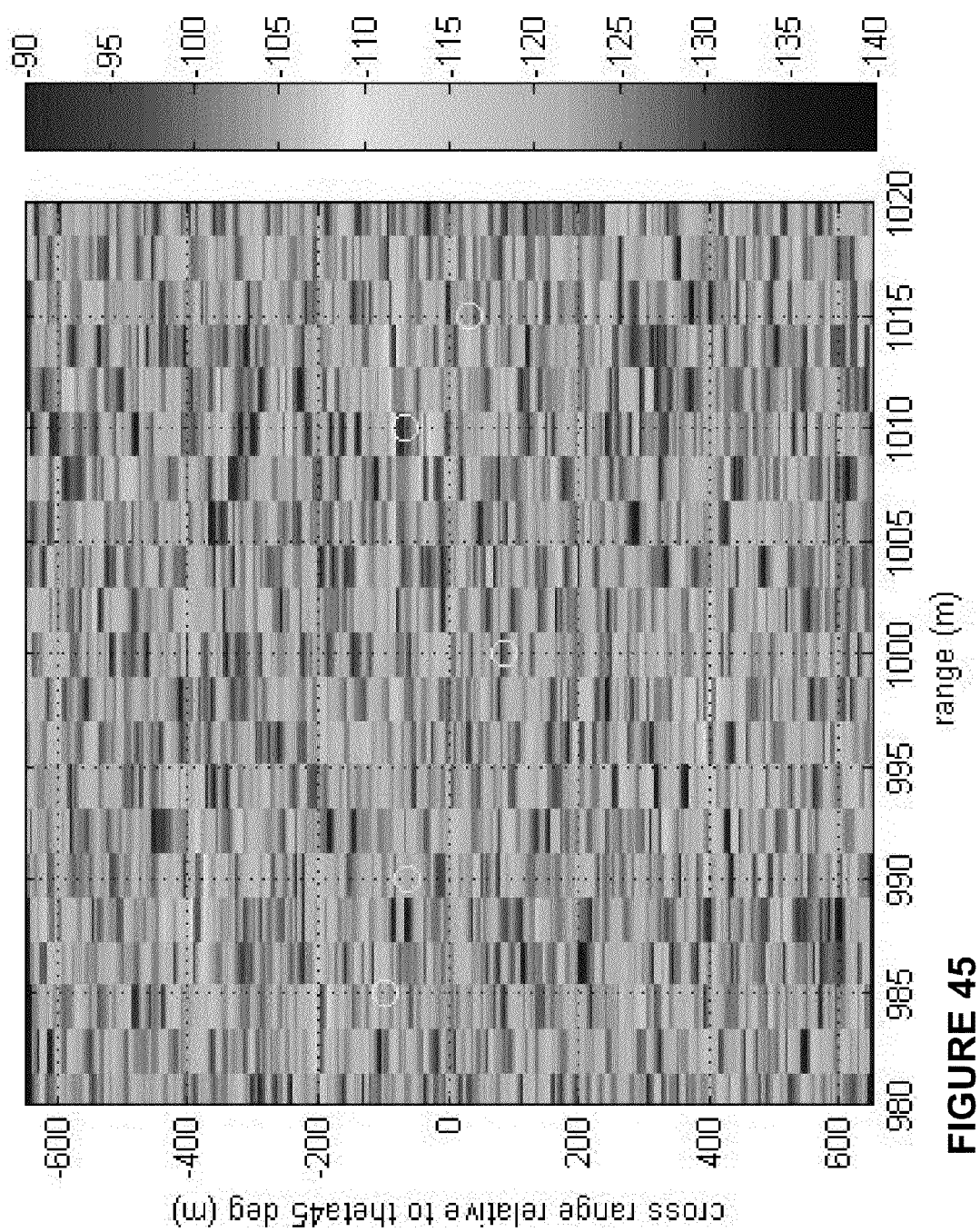
FIG. 45 shows a SAR image of five moving targets generated with no clutter.
Figure 46:
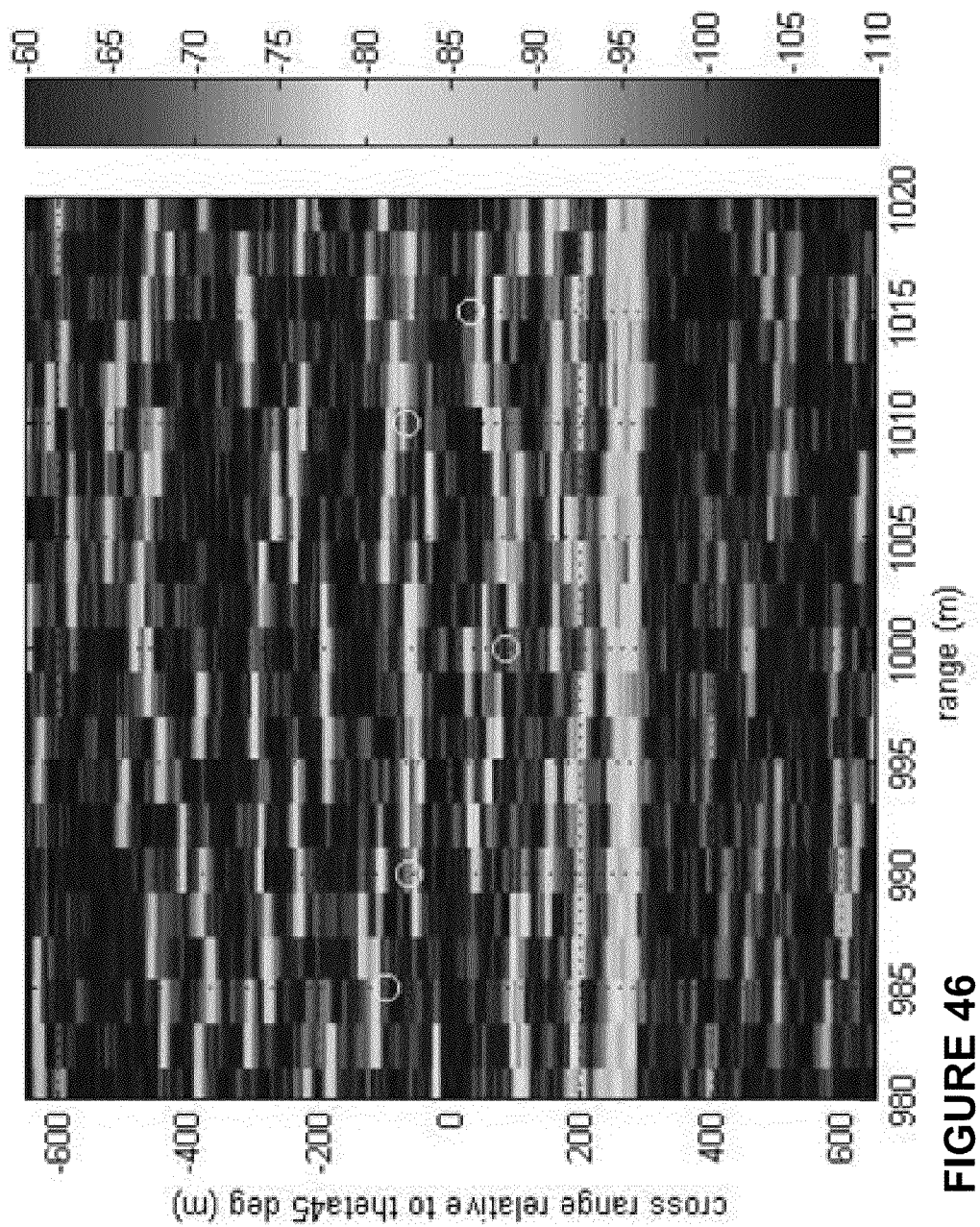
FIG. 46 shows a SAR image from the right antenna.

The clutter was modeled using point scatterers with a statistical distribution. The value of $\sigma^0$ varied as a function of depression angle as shown in FIG. 44. Due to memory and processing time limitations, the number of scatterers was limited. This is not ideal, but for most applications, the impact should be minimal. The amplitude and position of the scattering centers were calculated at each range bin associated with a chirped linear frequency modulated (LFM) waveform. To limit processing time, the number of scatterers per range bin was set one value if the range bins were of high interest and to another value if the range bins were of low interest. For all the simulations shown, three scatterers were generated per range bin for clutter between 900-1100 m, and one scatterer was generated for range bins between 100-900 m and 1100-1300 m. FIG. 45 shows an example of a histogram of the amplitude of the scattering centers and FIG. 46 shows an example of the spatial distribution of the scattering centers. The amplitude of the scattering centers were randomly selected with the constraint that the expected value of the power of the scattering centers corresponded to average power returned for $\sigma^0$ multiplied by the area of range swath for the angle of angle of interest. The scattering centers were spread even in angle over the beam width of the antenna, and then randomly perturbed in angle and range.

The beam pattern of the antenna was modeled as either omnidirectional or Gaussian. The shape of the Gaussian antenna was controlled by a pointing angle which corresponds to the mean and the beamwidth which corresponds to the standard deviation of a Gaussian distribution. The effect of pitch, yaw, and roll were not modeled. Small variations in these parameters probably do not have a significant impact on the radar performance since a typical value for the antenna beams widths are 70×100 degrees.

The motion of the UAV was modeled as a constant acceleration in x, y and z directions. The amplitude of the acceleration was 0.1 m/s$^2$ for range/Doppler processing and 0.05 m/s$^2$ for SAR processing. The position of the targets could be input in either Cartesian or spherical coordinate systems. In both coordinate systems, they were described relative to scene center. The motion of the targets was modeled as 3-d vectors with a constant velocity.

The path lengths in the radar were assumed to be configured so that the leakage signal and the demodulation signal used for down conversion had approximately equal time delays. For all the simulation runs, the path length difference between these signals was set at 1 centimeter and the amplitude of the leakage signal was attenuated by 30 dB.

Figure 47:
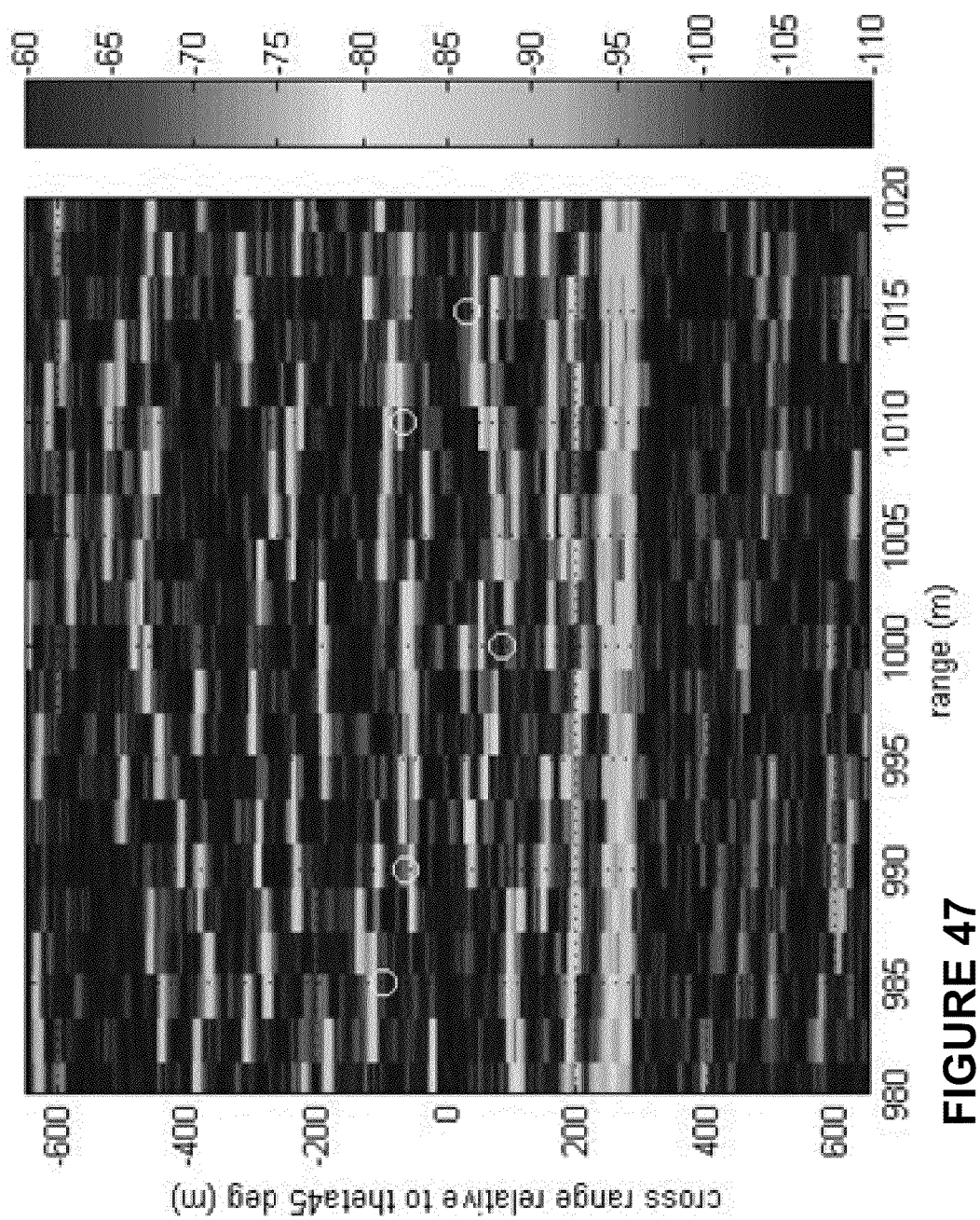
FIG. 47 shows a SAR image from the left antenna.

Range/Doppler simulation. The simulation software was developed to evaluate the radar performance for the UAV operating in a range/Doppler mode. For range/Doppler processing, range and radial velocity can be determined from the peaks in the range/Doppler matrix. Angle can be determined by comparing the phase of the peak pixels in range/Doppler matrices processed in the right and left receive antennas. FIG. 47 shows a block diagram of the proposed signal processing to generate a range/Doppler matrix.

Figure 48:
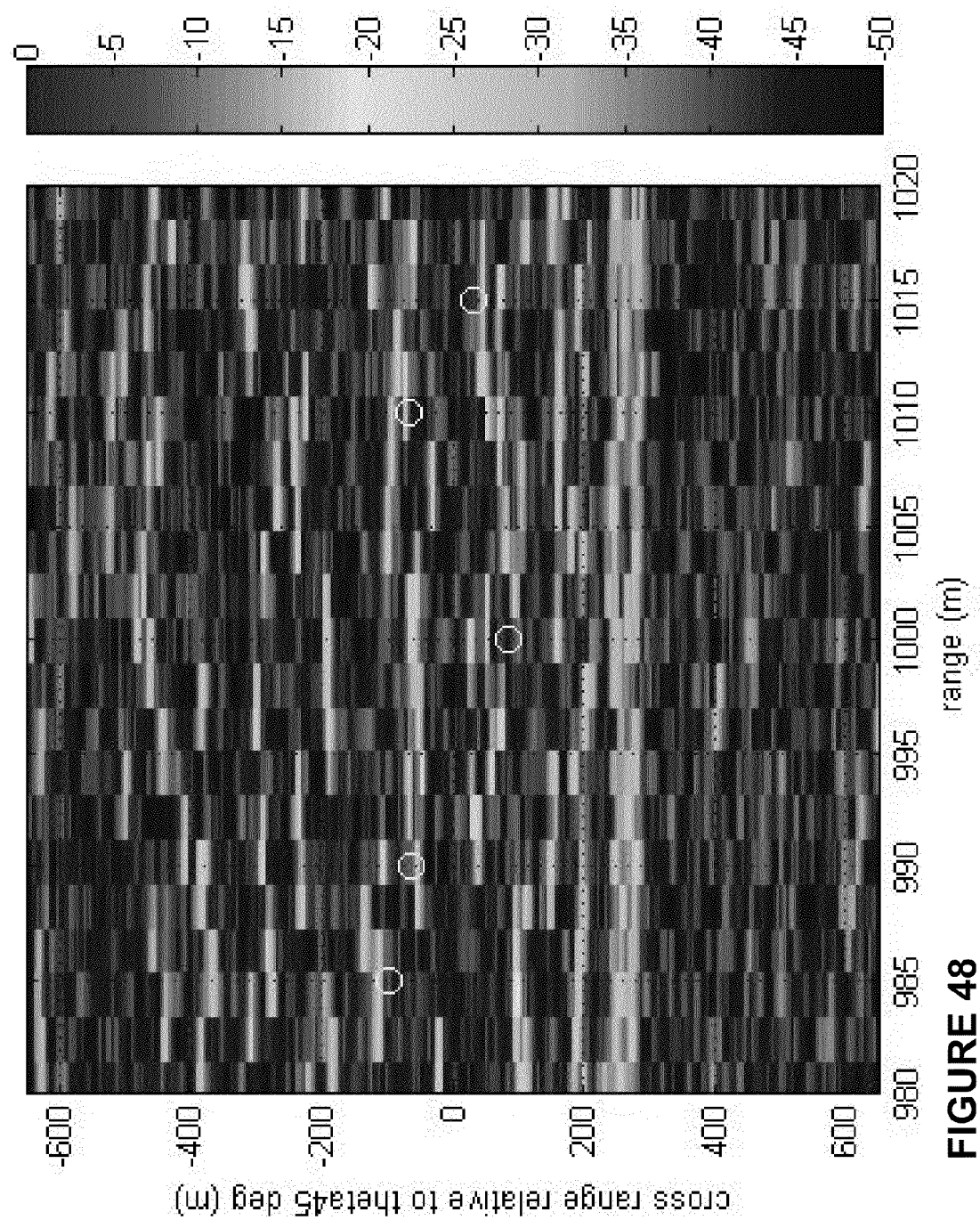
FIG. 48 shows a SAR image difference calculated with 1-element FIR filter calibration.

The simulation software was used to evaluate the radar performance for the UAV operating in a hovering mode. Table 4 shows the values of the major parameters used in the simulation. The targets consisted of two stationary reflectors with a RCS of 20 dBsm and four moving reflectors with a RCS of −6 dBsm and radial velocities of 1, 2, 10, and −10 m/s. The clutter was simulated using a $\sigma^0$ varying from −5 to −15 dBsm/sm. The simulation included the phase noise modeled using the curves shown in FIG. 43. The effects of vibration on the crystal oscillator were also included as previously described. The output of the simulation is shown in FIG. 48. No clutter subtract is performed in the processing. The SNR for the slow moving targets is approximately 15 dB. These results show that the proposed radar should be capable of detecting dismounts moving at a radial rate of 1 m/s at a range of 500 meters.

TABLE 2

Radar simulation parameters of the UAV in hover mode.

| Parameter | Value |
|---|---|
| Start Freq | 5.2 GHz |
| BW | 75 MHz |
| Center range | 500 m |
| ADC rate | 5 MHz |
| PRF | 2.5 KHz |
| Height | 100 m |
| Antenna pattern | Gaussian |
| Squint angle | 45 deg |
| Antenna Gain | 6 dB |
| Antenna (θ) | 45 deg |
| Antenna (φ) | 15 deg |
| UAV Height | 100 m |
| UAV Ax | 0.1 m/s2 |
| UAV Ay | 0.1 m/s2 |
| UAV Az | 0.1 m/s2 |
| IF bandwidth | 2.5 MHz |
| Leakage signal | −30 dB |
| Leakage delay path | 2.5 cm |
| FFT size in Doppler | 256 |
| FFT size in downrange | 2048 |

Figure 49:
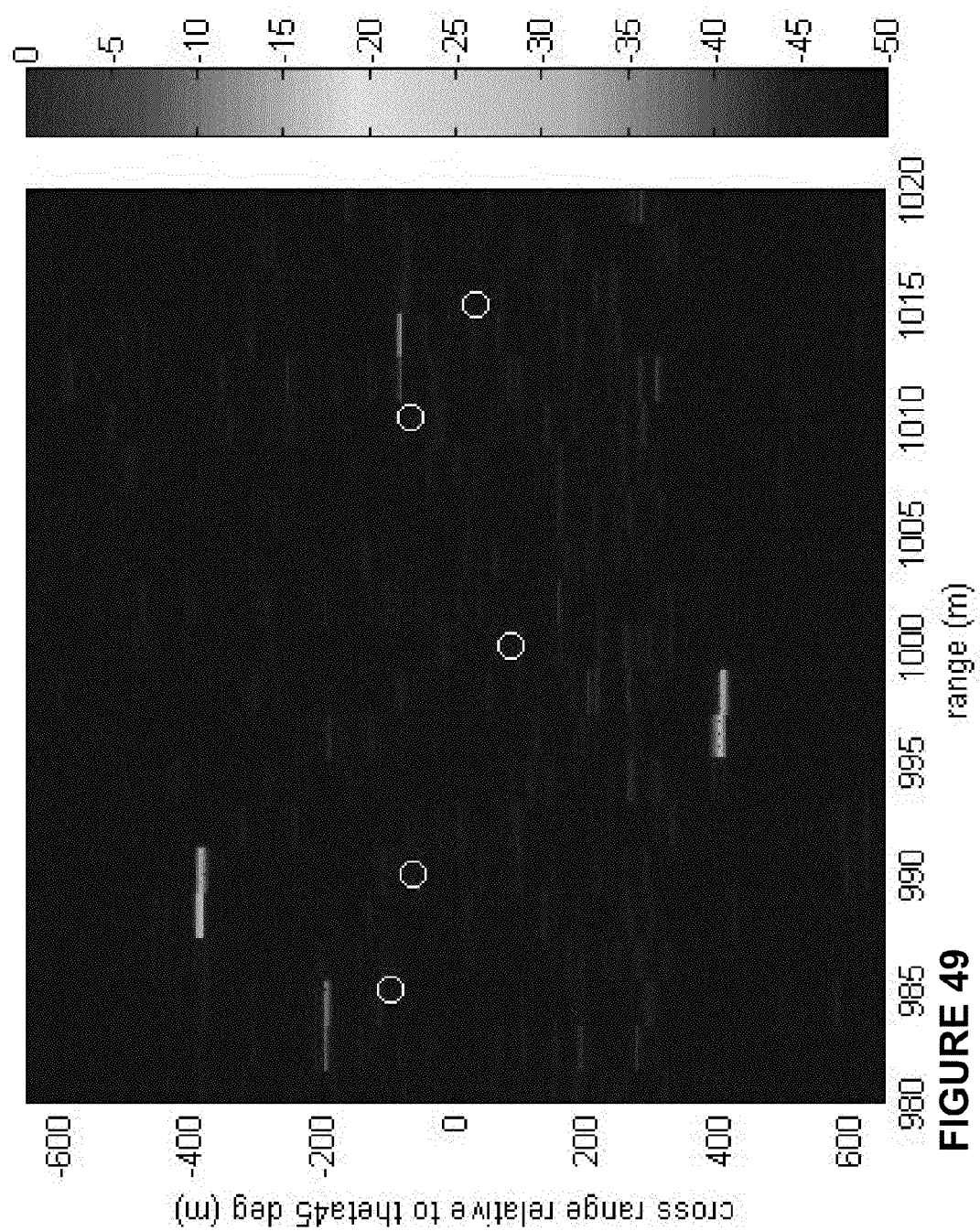
FIG. 49 shows a SAR image difference calculated with 3×3-element FIR filter calibration.
Figure 50:
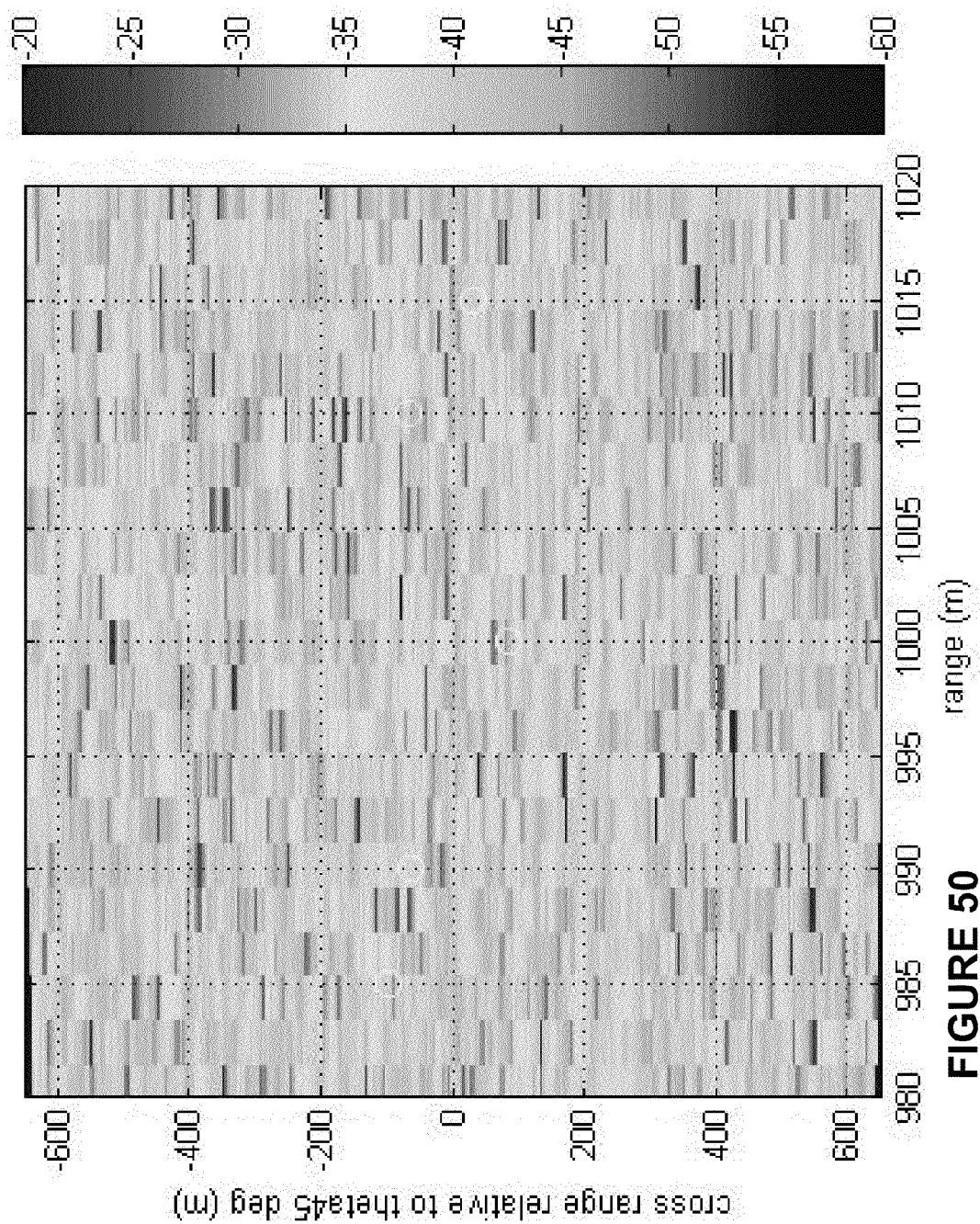
FIG. 50 shows a normalized SAR image difference calculated with 1-element FIR filter calibration.

SAR simulation—The simulation software was developed to evaluate the radar performance for the operating in a SAR mode. Stripmap SAR imagery can be generated by flying the UAV along a straight line and transmitting and same waveform used to generate range/Doppler matrices (LFM). Two variations of stripmap SAR imaging algorithms were developed and incorporated into the simulation. FIGS. 49 and 50 show block diagrams of the proposed signal processing for SAR.

FIG. 50 illustrates a block diagram of a very efficient SAR processing algorithm.

Tables 2 and 3 show the parameters values used in the SAR simulation. Repeated parameters in table 3 were used in place of the parameters in table 2. The SAR simulation used a factor of 18 times more data than the range/Doppler algorithm without clutter cancellation filter, but after filtering and decimation, the FFT sizes were identical.

TABLE 3

Additional parameters values used in the SAR simulation

| Parameter | Value |
|---|---|
| SAR algorithm | 1 |
| #range bins | 100 |
| Center range | 1000 m |
| UAV Vx | 0 m/s |
| UAV Vy | 3 m/s |
| UAV Vz | 0 m/s |
| UAV Ax | 0.05 m/s2 |
| UAV Ay | 0.05 m/s2 |
| UAV Az | 0.05 m/s2 |
| Pulse averaging factor | 6 |
| Pulse decimation factor | 18 |
| FFT size in crossrange | 256 |
| FFT size in down range | 2048 |

Simulated SAR images were generated using the algorithm described in FIGS. 3-4 and the radar parameters described in tables 2 and 3. The data were also filtered with a 2-dimension Kaiser window with a Beta of 2. Simulated data consisting of the returns for 4608 chirps that were collected over a 5.5 meter interval then processed. This results in a SAR images with a resolution of approximately 2×2.6 meters in down range and cross range. The color scales are in dB. The FIGS. 46 and 47 were processed using the algorithm shown in FIG.

4. FIG. 49 shows the result. Targets near the center of antenna beam imaged in their correct location as shown by the 'x' in the figures, however, targets not near the center of the beam can be offset or even aliased to other locations. These images show that the image quality slightly decreases as the position of the targets move away from the center of the antenna beam. The image quality and registration looks good within 50 meters of the center of the image for the GMTI simulation. The simulation software was developed to evaluate the radar performance for the UAV on the move operating in a GMTI mode. The GMTI algorithms were based upon generating SAR images in each of the two receive antennas, and then coherently subtracting them. The stationary targets should cancel, and the slow moving targets should not cancel. FIG. 43 shows a block diagram of the signal processing. The SAR images were generated using the parameters in tables 3-5.

FIG. 43 shows a block diagram for GMTI based upon subtracting two SAR images.

The SAR images were calibrated using a technique based upon signal subspace decomposition (SSD) [i]. The technique assumes that the SAR images are related to each other through a linear transfer function. The simplest realization of this technique is a one-element finite impulse response (FIR) filter. To implement this filter, a gain and a phase correction factor between the two images was calculated using the ratio of the average powers and the amplitude weighted phase difference between the two images. A more complicated realization of this technique is to assume that the subimages from each antenna are related by a 2-dimensional FIR filter. This technique was implemented by minimizing the least squares error using the left matrix divide operation in matlab.

Calibration based upon signal sub-space decomposition effectively cancels most of the clutter; however, some residue will still be present. To reduce the residue of large clutter discretes, a normalization procedure was developed. To normalize the image, the SAR image difference was divided by the square root of the minimum amplitude value for each pixel location in the two images plus a constant value representing the noise as shown below.

The difference in the SAR images from each antenna was assumed to be only a function of the antennas, not the receiver. Table 4 shows the values of the simulated parameters for the two receive antennas. The horizontal separation between the phase centers of the two antennas in the simulations is 4 centimeters.

TABLE 4

Difference in simulated antenna parameters for the GMTI simulation.

|  | Right antenna | Left Antenna |
| --- | --- | --- |
| Elevation Boresight angle | 15 degrees | 17 degrees |
| Azimuth Boresight angle | 45 degrees | 42 degrees |
| Gain | 8 dB | 7 dB |
| Azimuth Beamwidth | 100 | 97 |
| Elevation Beamwidth | 70 | 75 |

Figure 41:
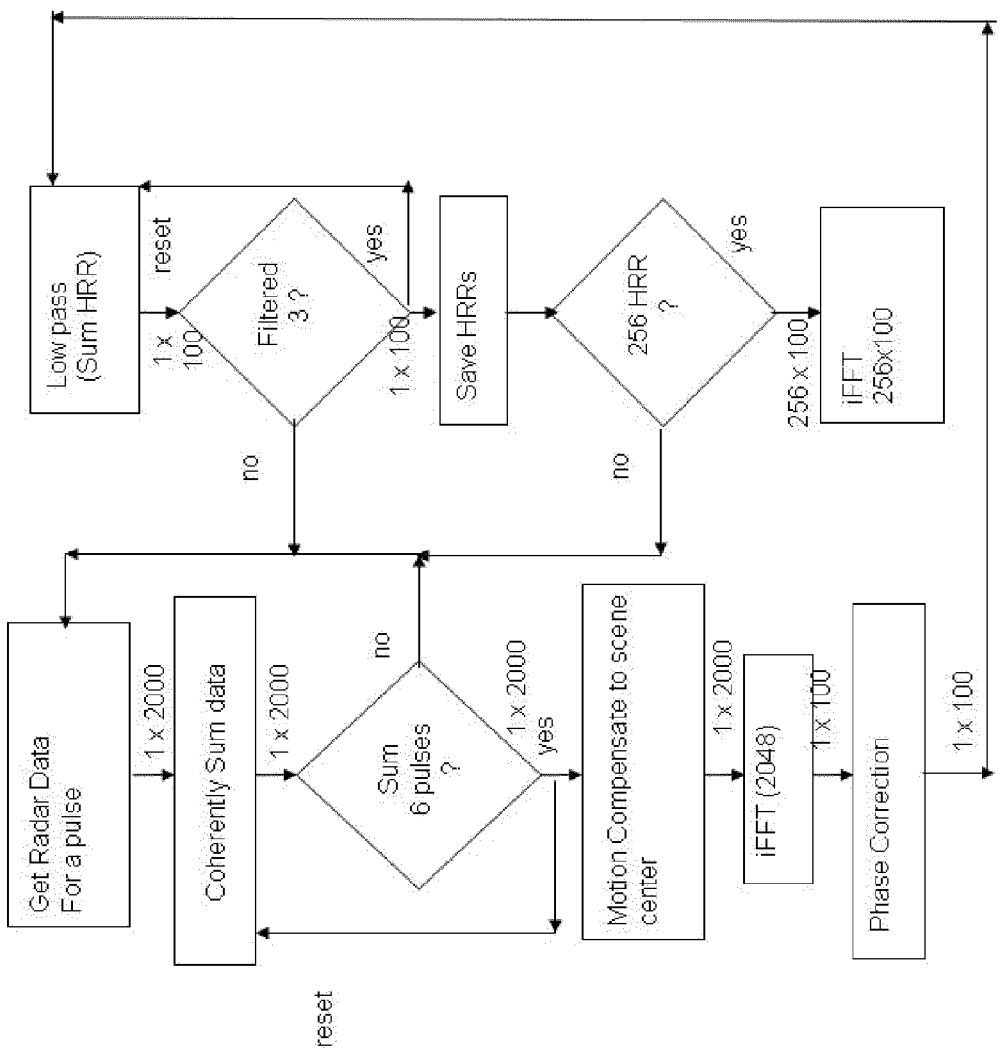
FIG. 41 is a block diagram of an efficient SAR processing algorithm.
Figure 42:
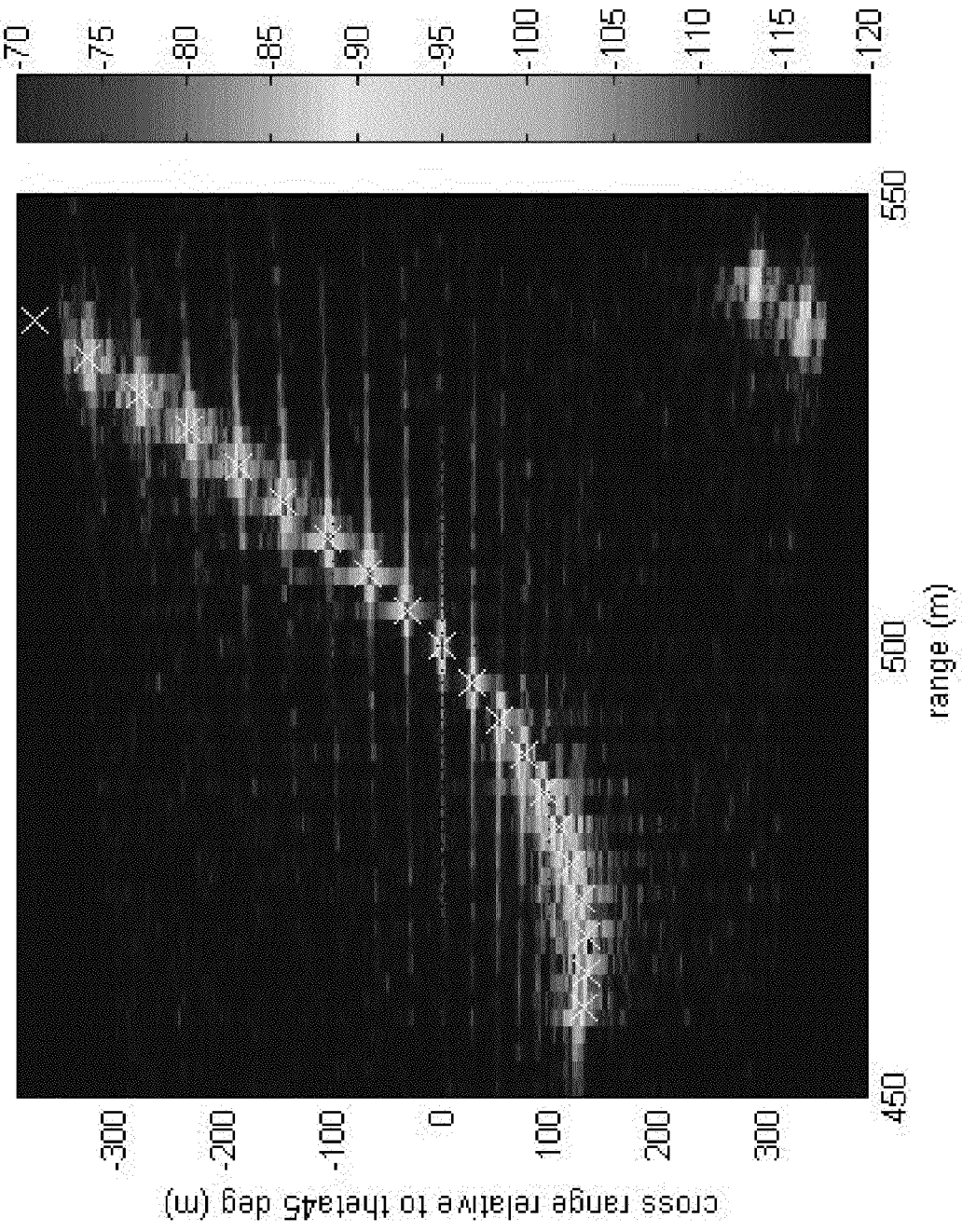
FIG. 42 shows a SAR image of stationary reflectors with 2×2.6 meter resolution.

The simulation was run to test whether dismounts could be detected at a range of a kilometer using the proposed radar for the UAV and the described signal processing algorithms. Results are presented for the SAR processing described in FIG. 41 and signal subspace calibration using 3×3-element FIR filter. The algorithm was tested using six moving targets described in table 5. One target was moving at 10 m/s, three targets were moving at 1 m/s, and two targets were moving at 0.5 m/s. All the moving targets had an RCS of −6 dBsm and were located at a range of approximately 1 km. The angular location of the targets was specified relative to the azimuth boresight angle of the right antenna, which was 45 degrees. The height of all these targets was fixed at zero meters. Table 5 shows the velocity and location of each target.

TABLE 5

Moving targets for GMTI simulation with RCS = −6 dBsm.

| Target number | |V| (m/s) | Vx (m/s) | Vy (m/s) | Δrange (m) | Δθ (deg) |
| --- | --- | --- | --- | --- | --- |
| 1 | 10 | 7.0 | 7.0 | 25 | 5.0 |
| 2 | 1.0 | 0.7 | 0.7 | −10 | −5.0 |
| 3 | 1.0 | −0.7 | 0.7 | 0.0 | 7.5 |
| 4 | 1.0 | −0.7 | −0.7 | 10 | 2.5 |
| 5 | 0.5 | 0.5 | 0.0 | 15 | 2.5 |
| 6 | 0.5 | 0 | 0.5 | −15 | −7.5 |

Figure 51:
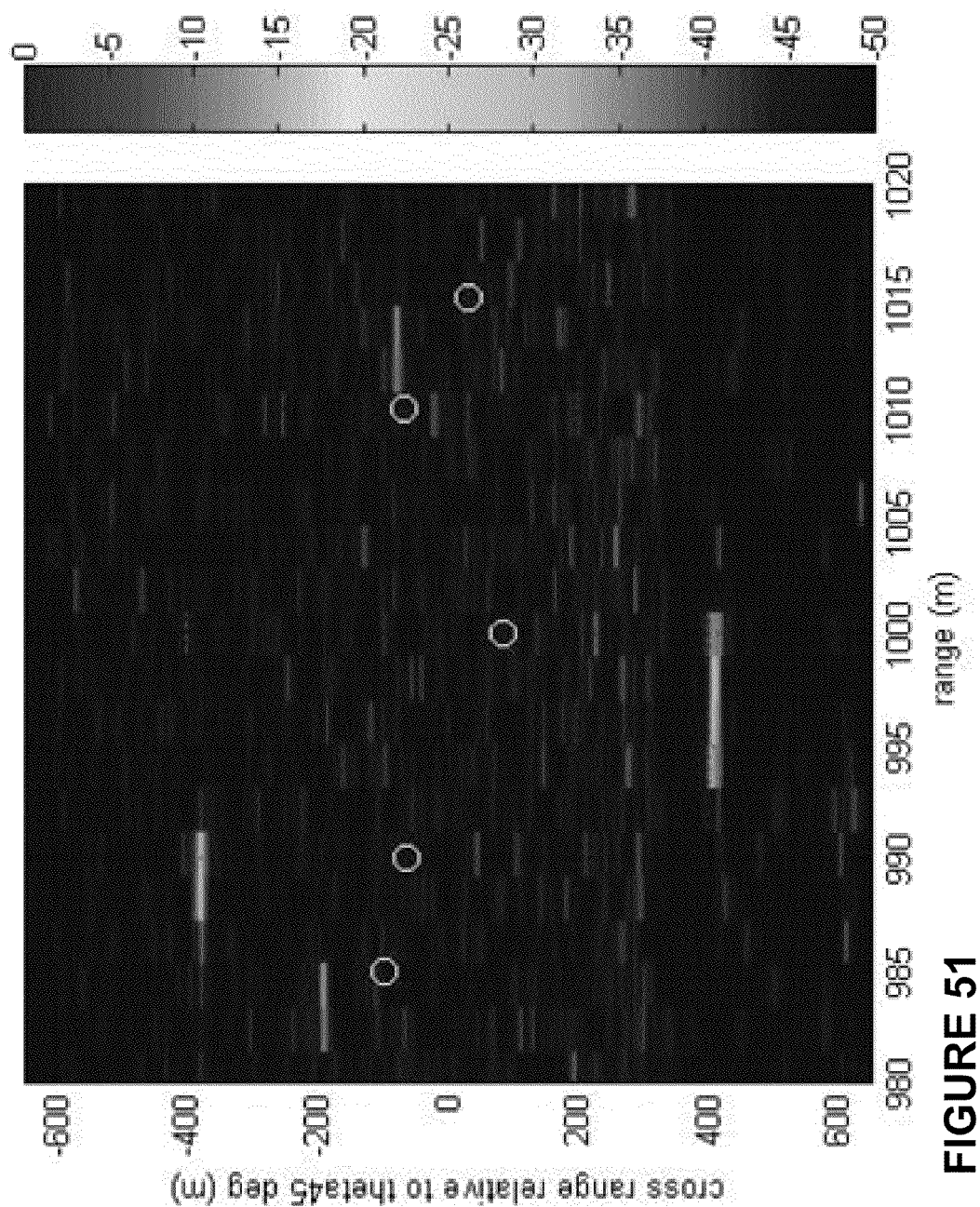
FIG. 51 shows a normalized SAR image difference calculated with 3×3-element FIR filter calibration.
Figure 52:
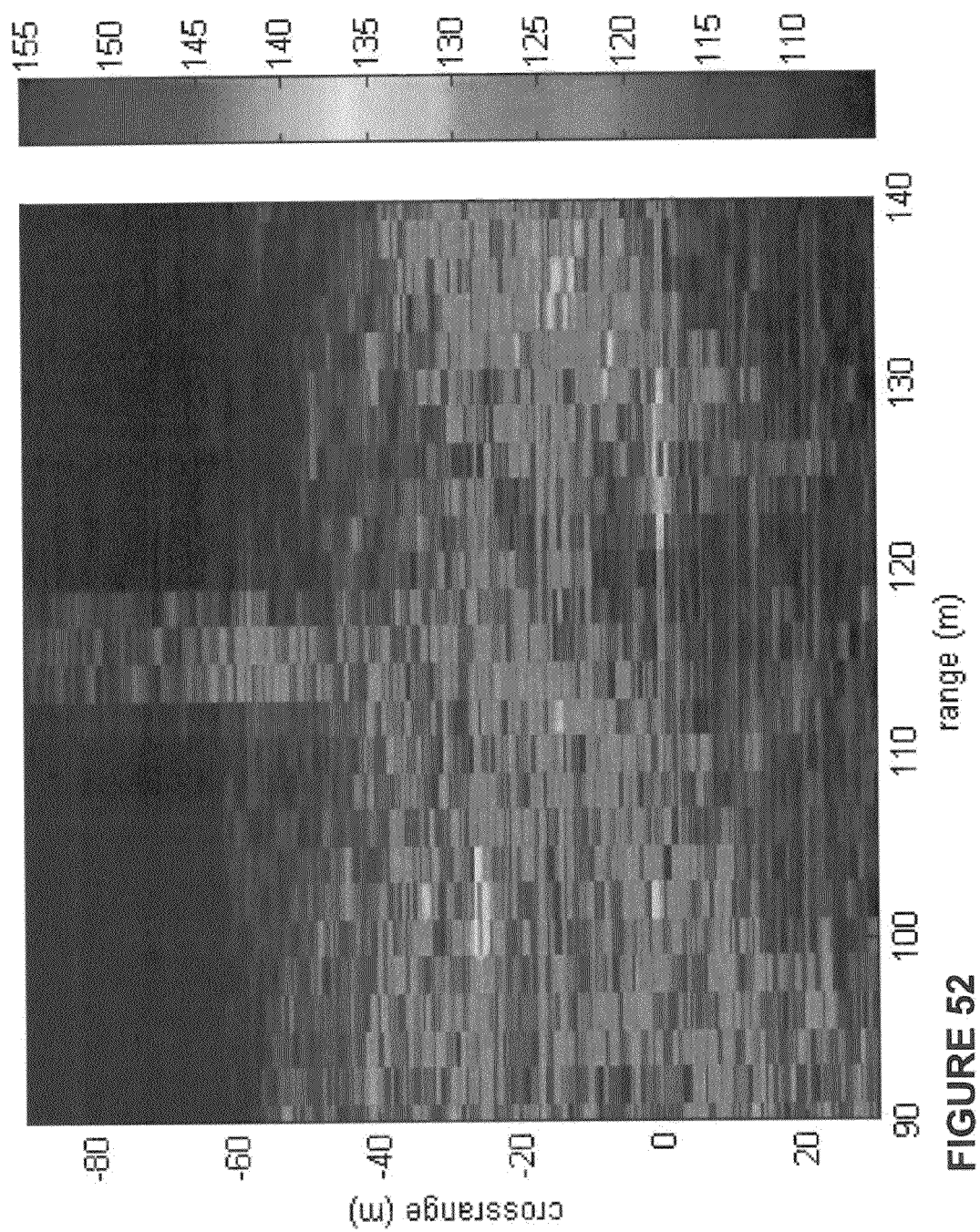
FIG. 52 shows a zoomed in region of the SAR image of the scene measured with the right receive antenna.
Figure 53:
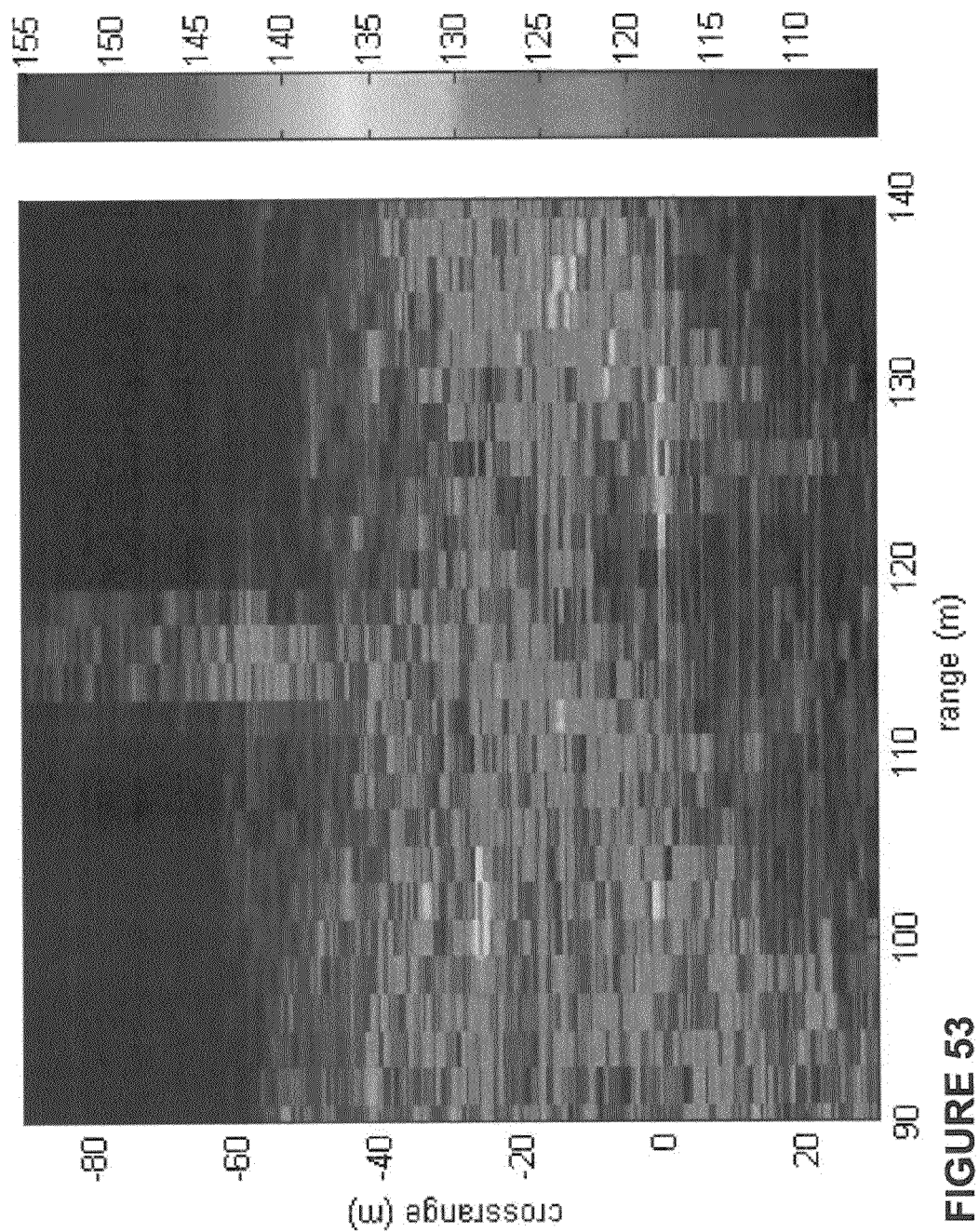
FIG. 53 shows a zoomed in region of the SAR image of the scene measured with the left receive antenna.
Figure 54:
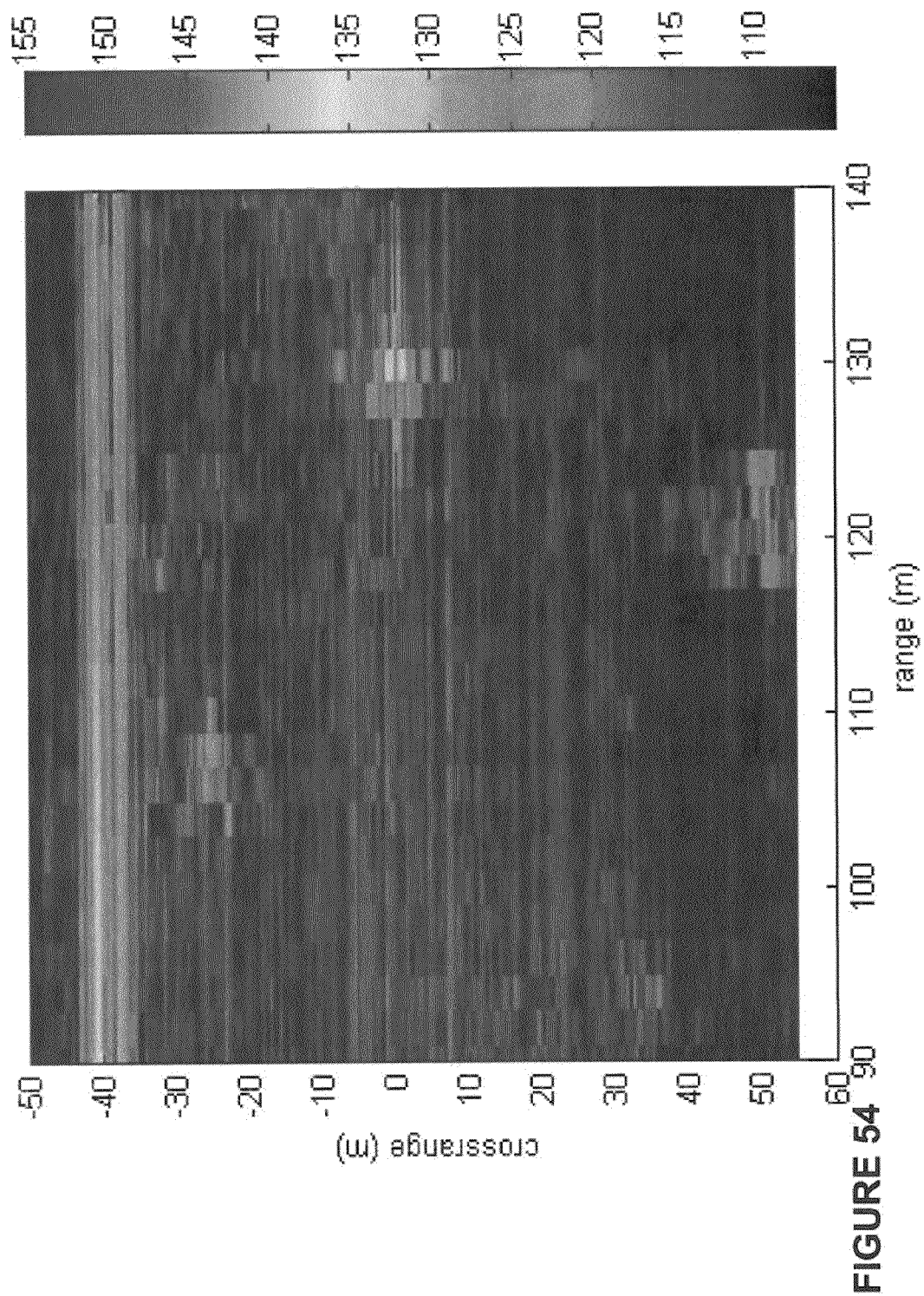
FIG. 54 shows a coherent difference with averaging between SAR images measured calibrated with 1×3-element FIR filter.
Figure 55:
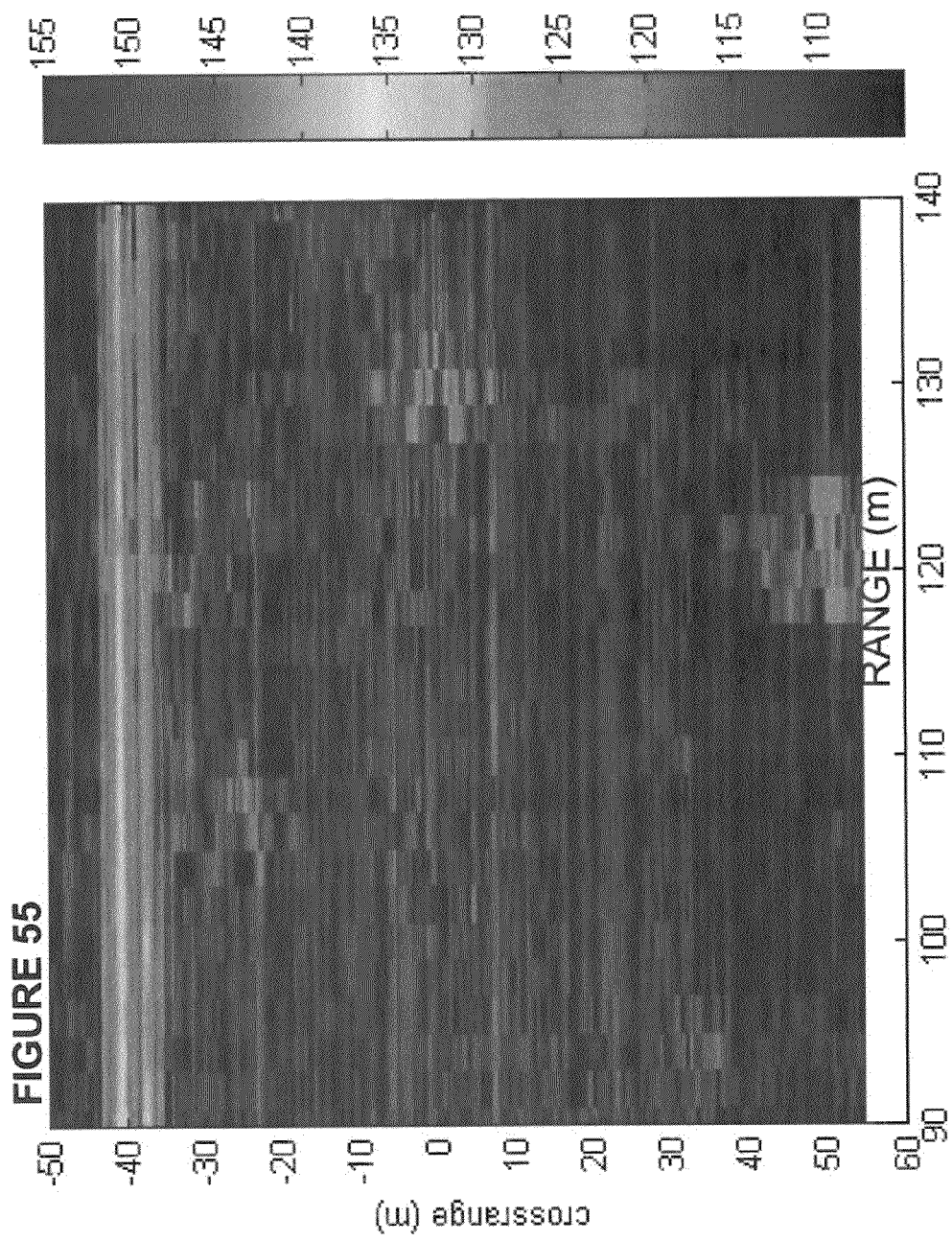
FIG. 55 shows a normalized coherent difference between SAR images calibrated with 1×3-element FIR filter.

FIG. 45 shows the SAR image of the six moving targets described in table 5 with no clutter. The fast moving target does not image, while the slower moving targets are more focused. Next, clutter was added to the SAR image of the moving targets. FIGS. 46 and 47 show the SAR images generated using the right and left antennas using "efficient processing" described in FIG. 49. FIG. 49 shows the difference between the two images after calibration using a 3×3-element FIR filter and FIG. 51 shows the normalized difference.

As expected, targets 1 and 3 were not observable. Targets 2 and 4 were easily observed, and targets 5 and 6 could be seen, but would be detected with a high false alarm rate. These results indicate that dismount-like targets could be detected at a range on 1 km using the proposed radar and signal processing.

Simulation software was developed for testing the performance for a UAV platform. The simulation software modeled all the major factors that affect the performance the proposed UAV radar. The radar model included the effects of range, component noise, transmit power, antenna, and various noise sources. The antenna was modeled as either a Gaussian or isotropic radiator. The noise in the simulation included the leakage signal, phase noise, thermal noise, and crystal vibration effects. The electromagnetic scattering from targets and clutter were modeled as isotropic point scatterers. Point scatterers model included 3-d location, 3-d velocity vector, and a fixed amplitude and phase. The clutter was modeled statistically with point scatter models. The amplitude of the scatterers were derived from $\sigma^0$ values were specified as a function of angle. The UAV platform was modeled using 3-d velocity vector, 3-d acceleration vector, and 3-d vibration vector.

The performance of Range/Doppler processing, SAR, and SAR-based GMTI algorithms developed for the proposed radar were simulated and examples of the results were presented. The GMTI algorithms were based upon generating SAR images in each of the two receive antennas, and then coherently subtracting them. With this type of processing, stationary targets cancel, while the slowly moving targets do not.

The performance of the algorithms, particular the SAR-based GMTI algorithms, need further evaluation. More realistic simulations and measured data with better ground truths are needed to estimate their performance.

SIGNAL PROCESSING—SAR imagery is generated by coherently processing the sampled radar data. After demodulation, the signal SAR data can be modeled as $$s(k, u) = P(w)\sum_{N} \sigma_n \exp\left(-j2k\sqrt{(X_n^2 + (Y_n - u)^2)}\right) \quad (1)$$

where $k=w/c$ is the wave number, $P(w)$ is the Fourier transform of the transmitted signal $p(t)$, $\sigma_n$ is the amplitude and $X_n$ and $Y_n$ are the position of the nth scattering center, and u is the along track position of the platform [$^{ii}$]. The first step for processing this signal is to multiple it by the complex conjugate of $P(w)$. For waveforms such as linear chirp, $P(w)$ is flat over the frequencies of interest, and can be removed from (1) by applying a matched filter. Next, the bandwidth of the processed signal is reduced by multiplying (1) by the complex conjugate of the reference signal $$S_0(k,u) = \exp(-j2k\sqrt{(X_c^2 + (Y_c - u)^2)}) \quad (2)$$

where $X_c, Y_c,$ and $Z_c$ are the coordinates of the center of the region of interest. This product can be approximated using the first-order Taylor series given by $$s(k, u)S_0^*(k, u) \approx \quad (3)$$
$$\sum_{N} \sigma_n \exp\left(-j2k\frac{((X_n - X_c)X_c + (Y_n - Y_c - u)Y_c + (Z_n - Z_c)Z_c)}{R_c}\right)$$

The Nyquist sample rate for (3) as a function of slow time is $$\Delta u \leq \frac{R_c \pi}{2k(Y_0)} \quad (4)$$

where $R_c$ is the range to the scene center and $Y_0$ is the maximum cross range extent of the target relative to the scene center.

The motion of the platform can be modeled using $$u(m) = L + Vm\tau + \frac{1}{2}A(m\tau)^2 \quad m=0 \ldots M-1 \quad (5)$$

where L, V and A are the position, velocity and acceleration of the platform on the y-axis. Since A is in general nonzero, the sample positions along the track are not uniformly spaced, which is undesirable.

For slow moving platforms, the radar data can be compressed along the track. For a compression of M raw data samples into N decimated samples, the desired location of phase center of the decimated samples are uniformly spaced and given by $$u'(n) = u(0) + (\Delta u' - \Delta \bar{u})/2 + \Delta u' n \quad n=0, \ldots, N-1 \quad (6)$$

Where $$\Delta u' = \left[(u(M-1) - u(0))/\left(N - \frac{N}{M}\right)\right] \quad (7)$$

and $$\Delta \bar{u} = (u(M-1) - u(0))/(M-1). \quad (8)$$

The boundaries between each phase center are given by $$u(0) + (\Delta u' - \Delta \bar{u})/2 + \Delta u'(n - \frac{1}{2}) \quad n=1, \ldots N-1. \quad (9)$$

Next, we would like to combine the data in each segment. For small changes in u, the average phase of the compressed radar signal equals the phase of the average of the compressed radar signal. This approximation is based upon the first-order Taylor series expansion $$\exp(j\phi) \approx 1 + j\phi \quad (10)$$

$$\text{when } \frac{\phi^2}{2} \ll 1 \quad (11)$$

However, this will not produce filtered data with effective uniform sampling in u due to non-uniform sample rates and quantization errors. Effective uniform sampling can be achieved by multiplying the data in each segment by a weighting function $$u_{desired} = \sum_{M} w(m)u(m) \quad (12)$$

$$\text{with the constraint that } \sum_{M} w(m) = 1 \quad (13)$$

The weighting function would more heavily weight the data that was more sparsely sampled and less heavily weight the data was more closely sampled. A simple window function for which analytical expression can be derived is given by $$w(m) = \frac{1}{M} + q\left(m - \frac{(M-1)}{2}\right) \quad (14)$$

where q is the slope of the line and m is the slow time sample number. Now, the slope of the window function can be adjusted so that the phase center of each data segment is uniformly spaced in u. This result is achieved by equating the desired signal for a scatterer located at an arbitrary crossrange location to the weighted average location of the radar data as shown below $$\exp\left(-j2k\left(\frac{Y_n u'}{\sqrt{(X_c^2 + (Y_c - u)^2 + Z_c^2)}}\right)\right) =$$
$$\sum_{M} \frac{w(m)}{M} \exp\left(-j2k\left(\frac{Y_n u(m)}{\sqrt{(X_c^2 + (Y_c - u)^2 + Z_c^2)}}\right)\right)$$

where $Y_n$ is the y-coordinate of an arbitrary scattering center, then applying the Taylor series approximation in (10). The slope of the window function can be solved analytically using the formulas for the finite sequences shown below:

$$\sum_{n=1}^{N} n = \frac{1}{2}N(N+1) \quad (16)$$

$$\sum_{n=1}^{N} n^2 = \frac{1}{6}N(N+1)(2N+1) \quad (17)$$

-continued $$\sum_{n=1}^{N} n^3 = \left(\frac{1}{2}N(N+1)\right)^2 \quad (18)$$

Using these formulas, the slope in the weighting function described in (14) is $$q(n) = \frac{(u'(n) - L - VT(M-1)/2 - AT^2(M-1)(2M-1)/12)}{\left\{\begin{array}{l}(VT(M(M-1)(2M-1)/6 - M(M-1)^2/4) + \\ AT^2(M^2(M-1)^2/8 - M(M-1)^2(2M-1)/24))\end{array}\right\}}; \quad (19)$$

Non-uniform sampled radar data can now be decimated with effective uniform sampling in slow time using the results from (12), (14), and (19).

The foregoing description is illustrative of particular embodiments of the invention, but is not meant to be a limitation upon the practice thereof. The following claims, including all equivalents thereof, are intended to define the scope of the invention. As used in the following claims, the term "processor" means one or more processing units, central processing units, processor cores, microprocessors, digital signal processors, multiprocessors, computers, and/or controllers, which may be connected together or to other circuitry in a manner known to those of ordinary skill in the art. As used in the foregoing claims, the term "target" includes object(s), area, person(s), setting, place, or scene.

APPENDIX A

```
SIMULATION PARAMETERS
function [UAV,Tar,Alg]=get_UAV_parameters_movers_sept27(run_number) % get all
parameters for the simulation for a given run number
% algorithm input parameters for simulating UAV radar performance
Alg.Nfft=2048;                  % fast-time FFT size
Alg.NU_DEC=256;                 % number of decimated pulses/HRR profiles
Alg.DEC=18;                     % decimation factor in slow-time
Alg.NU_NO_RG_COR=6;             % number of pulses/HRR averaged with no MComp
Alg.NU_MC=Alg.DEC/Alg.NU_NO_RG_COR; % number of averaged pulses to to motion
compensated
Alg.rg_comp_flag=1;             % 0=no phase compensation based on HRR, 1=phase compensate
averaged HRR profiles based upon their range
Alg.Betax=2;                    % kaiser Beta parameter for downrange window,
Alg.Betay=2;                    % kaiser Beta parameter for crossrange window
Alg.phase_cor_sq_flag=0;        % calculate and correct squaRc phase correction term
Alg.iq_data_flag=1;             % 0=use real data, 1=assume complex data available
Alg.find_movers_flag=0;         % fast movers - filter HRR data with iir high pass filter to find fast
movers
Alg.debug_flag=0;               % debug flag (0,1)
Alg.window_decimation=0;        % 0=just average values together, 1=use variable window function
Alg.eff_mc_flag=0;              % do efficient motion compensation - after range compression
Alg.fast_mc_flag=1;             % use only dominant term in range compressed profile
Alg.eff_ssp_flag=0;             % do efficent calibration
Alg.ssp_image_Nx=31;            % size of subimage in x
Alg.ssp_image_Ny=32;            % size of subimag in y
Alg.ssp_h_x=3;                  % size of ssp fir filter in x
Alg.ssp_h_y=3;                  % size of ssp fir filter in y
if (Alg.window_decimation) % filter data before decimation along the track
      Alg.cosine_wind_coeff=0.8; % window parameter for decimation
else
      Alg.cosine_wind_coeff=0; % rectangular window, all ones
end
Alg.H=100;    % height of UAV (m)
Alg.Zc=0;     % estimated z of targets
Alg.theta=45*pi/180; % estimated theta of target
Alg.Nrg=100;  % unmber of HHR bins to use to generate SAR imagery
Alg.Rc=1000;  % estimated center range of targets
% simple calculations
Alg.NU=Alg.NU_DEC*Alg.DEC; % total number of slow time measurements
phi=acos((Alg.H-Alg.Zc)/Alg.Rc);  % polar angle
Alg.Yc=Alg.Rc*sin(Alg.theta)*sin(phi);    % estimated x of targets
Alg.Xc=Alg.Rc*cos(Alg.theta)*sin(phi);    % estimated y of targets
% UAV parameters
UAV.B=75e6;    % bandwidth
UAV.f0=5.2e9;  % carrier frequency
UAV.PRF=2.5e3; % pulse repetition frequency
UAV.Vy=3;      % velocity of UAV along y-axis (m/s), none zero for sar
UAV.Vx=0;      % velocity of UAV along x-axis (m/s),
UAV.Vz=0;      % velocity of UAV along z-axis (m/s),
UAV.Ay=0.05;   % acceleration of UAV (m/s2)
UAV.Ax=0.05;
UAV.Az=0.05;
UAV.Min_rg=120; % meters, due to IF filters
UAV.Max_rg=1300; % meters, limit clutter calculations
UAV.H=Alg.H;    % Height of UAV (meters), ground = 0 m
UAV.y_offset1=0; % phase center of transmit antenna along y-axis, must be <= 0
UAV.y_offset2=0; % phase center of receive antenna along y-axis, must be <= 0
```

```
UAV.w_vib=2*pi*(8000/60)*[1 2 3 4];   % UAV vibration frequency (rad/sec), same for
all coordinates
UAV.g_vib=[10 3 1 0.5 ];
time_vib=(pi/2)*ones(1,length(UAV.g_vib))./UAV.w_vib; % time for vibration to reach peak
value
UAV.amp_x_vib=0.5*UAV.g_vib.*time_vib.^2; % meters
UAV.phase_x_vib=[0 pi/8 pi/3 pi/6];
UAV.amp_y_vib=0.5*UAV.g_vib.*time_vib.^2; % meters
UAV.phase_y_vib=[0 pi/8 pi/3 pi/6] + pi/3;
UAV.amp_z_vib=0.5*UAV.g_vib.*time_vib.^2; % meters
UAV.phase_z_vib=[0 pi/8 pi/3 pi/6] + pi/2;
UAV.motion_error_factor=0.0; % parameter describinmg accuracy of estimated vibration
(INS/GPS), 1='no error'
% ADC
UAV.sample_rate=5e6;     % ADC sample rate
UAV.dt=1/UAV.sample_rate; % measurement time interval
% antenna
UAV.antenna_type='gaussian' % 'gaussian','omni'
UAV.theta=Alg.theta;     % antenna beam center
UAV.phi=15*pi/180;       % antenna beam center
UAV.BW_phi=70*pi/180;    % 1-way 3 dB beam width
UAV.BW_theta=100*pi/180; % 1-way 3 db beam width
UAV.trans_power=2;    % actual transmitted power (watts)
UAV.IF_noise_bw=2.5e6;   % IF bandwidth (HZ)
UAV.nf_dB=5.6;   % noise figure, receiver only
UAV.loss_dB=1;   % additional loss in radar
UAV.Gain_ant_dB=6;    % 1-way Antenna gain
UAV.Gain_RF_dB=40;   % RF receiver gain
UAV.realistic_waveform_flag=1; % add crystal vibration, phase noise, and leakage
UAV.crystal_w0_offset_array=2*pi*(8000/60)*[1 2 3 4 5]; % vibration frequency of crystal
oscillator
UAV.crystal_phase_array=2*pi*[0 0.25 0.5 0.75 1]; % phase offset of harmonics in crystal
oscillator
UAV.vib_db=[-26 -44 -48 -51 -65];     % power level of vibrational frequency
UAV.amp_vib=(10*ones(1,length(UAV.crystal_w0_offset_array))).^(UAV.vib_db/20); %
convert to linear value
UAV.num_vib_harmonics=length(UAV.crystal_w0_offset_array);
UAV.delay_len=0.5;    % leakage delay in meters
UAV.leakage_db=-30;     % power level of vibrational frequency
UAV.amp_leakage=10^(UAV.leakage_db/20); % convert to linear value
UAV.phase_noise_low_dB=[-44 -44 -53.0 -67 -73 -84]; % low frequency phase noise for
Wenzel oscillator
UAV.phase_noise_low_freq=[0 10 30 100 300 1000];    % frequency, good
approximation
UAV.phase_noise_high_dB=[-85 -85 -106 -119 -138 -146 -150 -150];    % high frequency
phase noise
UAV.phase_noise_high_freq=[0 1e3 3e3 1e4 1e5 3e5 1e6 2.5e6];   % frequency, poor
approximation
UAV.phase_noise_yulewalk_order=10;   % filter for low_frequency phase noise
UAV.yulewalk_settle_time_factor=3;       % factor multiplier by
UAV.phase_noise_yulewalk_order
UAV.n_extra_high_freq=50; % add extra samples for high frequency phase noise for time
delay
% target parameters
Tar.clutter_flag=1;    % 0=no additional clutter, 1=add homogeneous clutter
Tar.sigma0_dBsmsm_array=[-10 -15 -20 -30]; % minumum range, Rc, maximum range
Tar.sigma0_m2_array=(ones(1,length(Tar.sigma0_dBsmsm_array))*10).^(Tar.sigma0_dBsms
m_array/10); % minumum range, Rc, maximum range
Tar.sigma0_phi=[70 45 30 20]*pi/180;
Tar.sigma0_scatterer_cross_range_per_rg_display=3; % number of scatterers per length in
meters
Tar.sigma0_scatterer_cross_range_per_rg_no_display=1; % number of scatterers per length in
meters
Tar.percent_BW=20;    % add fudge factor calculating clutter, increase beam width, 0 is no
increase
Tar.Rc=Alg.Rc;    % center range of targets
Tar.Zc=0;    % center z of targets
phi=acos((UAV.H-Tar.Zc)/Tar.Rc);       % polar angle
Tar.Yc=Tar.Rc*sin(UAV.theta)*sin(phi); % Y center location of targets
% stationary targets parameters
    Tar.Ri=0.4*[0 100 100 100 -160:50:240 -175:50:225] ; % ith target range relative to Rc
    Tar.delta_thetai=10*[0 0 2.3 -2.3 ones(1,9) -2*ones(1,9)]*pi/180; % angle offset from
center of beam
    Tar.Ri=0.4*[-50:10:50] ; % ith target range relative to Rc
    Tar.delta_thetai=1*[-5:5]*pi/180; % angle offset from center of beam
    Tar.Ri=[0 5 -5]; % ith target range relative to Rc
    Tar.delta_thetai=[0 1 -1]; % angle offset from center of beam
    Tar.Ntargets=length(Tar.Ri);
    Tar.Zi=zeros(1,Tar.Ntargets); % z position offset from Zc
    Tar.RCS_dB=0*ones(1,Tar.Ntargets); % amplitude of scattering centers
```

-continued

```
    Tar.ampi=(10*ones(1,Tar.Ntargets)).^(Tar.RCS_dB/20); % amplitude of scattering centers
% moving targets parameters
    Tar.Riv=[-10 10 15]; % target range + Rc
    Tar.delta_theta_iv=5*[1 -1 1.5]*pi/180; % offset from beam center
    Tar.Ntargetsv=length(Tar.Riv);
    Tar.Ziv=zeros(1,Tar.Ntargetsv);
    Tar.Vix=[0.7 0.7 -0.7]; % velocity of the ith target in x-axis
    Tar.Viy=[0.7 -0.7 -0.7]; % velocity of the ith in y-axis
    Tar.Viz=zeros(1,Tar.Ntargetsv); % velocity in z-axis
    Tar.RCS_dB=-6*ones(1,Tar.Ntargetsv); % amplitude of scattering centers
    Tar.ampiv=(10*ones(1,Tar.Ntargetsv)).^(Tar.RCS_dB/20); % amplitude of scattering centers
    Rci_array=Tar.Rc + Tar.Ri;
    phi_array=acos((UAV.H- (Tar.Zc + Tar.Zi))./Rci_array);
    Tar.Yi=Rci_array.*sin(phi_array).*(sin(UAV.theta + Tar.delta_thetai) -sin(UAV.theta)); % for display
    Tar.Yci=Rci_array.*sin(phi_array).*sin(UAV.theta + Tar.delta_thetai);
    Tar.Xci=Rci_array.*sin(phi_array).*cos(UAV.theta + Tar.delta_thetai);
    Tar.Zci=Tar.Zc + Tar.Zi;
    Rciv_array=Tar.Rc + Tar.Riv;
    phi_array=acos((UAV.H- (Tar.Zc + Tar.Ziv))./Rciv_array);
    Tar.Zciv=Tar.Zc + Tar.Ziv; % location of target in cartesian coordinates
    Tar.Yciv=Rciv_array.*sin(phi_array).*sin(UAV.theta + Tar.delta_theta_iv);
    Tar.Xciv=Rciv_array.*sin(phi_array).*cos(UAV.theta + Tar.delta_theta_iv);
    Tar.Yiv=Rciv_array.*sin(phi_array).*(sin(UAV.theta + Tar.delta_theta iv) -sin(UAV.theta)); % for display
```

APPENDIX B MATLAB WINDOW FUNCTION

```
% sar_aver_v4
% w=1.4;
dt=1e-4;
c=3e8;
lambda=c/5e9;
k=2*pi/lambda;
M=201;
t=(1:M)*dt;
V=10;
A=2;
X0=500;
Y0=15;
u=V*t + 0.5*A*t.^2;
uv=V*t;
u1=V*dt*M*(M+1)/2;
figure
plot(diff(u))
title('diff(u)')
grid on
s=exp(j*k*((X0^2 + (Y0 + u).^2).^0.5));
s0=exp(-j*k*((X0^2 + u.^2).^0.5));
s1=s.*s0;
sv=exp(j*k*((X0^2 + (Y0 + uv).^2).^0.5));
s0v=exp(-j*k*((X0^2 + uv.^2).^0.5));
s1v=sv.*s0v;
theory=exp(j*k*(0.5*Y0^2 + Y0*u)./((X0^2 + u.^2).^0.5)); % taylor series expansion
theory_num=(k*(0.5*Y0^2 + Y0*u)./((X0^2 + u.^2).^0.5)); % taylor series expansion
theory_t1=(k*(0.5*Y0^2)./((X0^2 + u((M-1)/2).^2).^0.5)); % taylor series expansion
theory_t2=(k*(Y0*u)./((X0^2 + u.^2).^0.5)); % taylor series expansion
mean_theory_t2=mean(theory_t2);
s1_est=k*Y0/((X0^2 + u((M-1)/2)^2).^0.5)*(V*dt*M*(M+1)/2 +1/12*A*dt^2*M*(M+1)*(2*M+1))/M + ...
    k*0.5*Y0^2/((X0^2 + u((M-1)/2)^2).^0.5) % t2 = correct
s1_est_mean_t1=k*Y0/((X0^2 + u((M-1)/2)^2).^0.5)*(V*dt*M*(M+1)/2 +1/12*A*dt^2*M*(M+1)*(2*M+1))/M + ...
    k*0.5*Y0^2/((X0^2 + u((M-1)/2)^2).^0.5) % t2 = correct
s1_est_mean_t2=k*Y0/((X0^2 + u((M-1)/2)^2).^0.5)*(V*dt*M*(M+1)/2 +1/12*A*dt^2*M*(M+1)*(2*M+1))/M;
calcul_result=mean(angle(s1))
calcul_result_sum_first=angle(sum(s1))
% sum_cal=((1/8)*A*dt^2*(M*(M+1))^2 + (1/6)*V*dt*M*(M+1)*(2*M+1))/M;
m0=(u1/(M*(M+1)) - V*dt/2 -1/12*A*dt^2*(2*M+1))/ ...
    ((1/8)*A*dt^2*M*(M+1) + (1/6)*V*dt*(2*M+1) + ...
    -V*dt*(M-1)/4 - (1/24)*A*dt^2*(M-1)*(2*M+1));
figure
plot(angle(s1))
hold on
plot(angle(theory),'r');
hold on
plot(ones(1,M)+(-(M-1)/2:(M-1)/2)*m0,'x')
grid on
legend('meas','theory','weight')
calcul_result2=mean(angle(s1).*(ones(1,M) + (-(M-1)/2:(M-1)/2)*m0))
calcul_result2a=angle(sum(s1.*(ones(1,M) + (-(M-1)/2:(M-1)/2)*m0))); % M=101
desireda=mean(angle(s1v))
desiredb=angle(sum(s1v))
desiredc=angle((s1v((M-1)/2)))
diff_angles_degs=(180/pi) *(desiredc - calcul_result2a)
diff_angles_degs_no_weigth=(180/pi) *(desiredc - calcul_result_sum_first)
```

The invention claimed is:

1. A method of processing radar data obtained from a platform which is subjected to non-uniform movement, the distance the platform travels during the formation of an image comprising an aperture; the method comprising:
   building up a predetermined number of average pulses; each representing a single point on the aperture; the building of each average pulse comprising:
   inputting radar data from a radar antenna;
   passing the radar signal through low noise amplifier to reduce impact of electronic noise from the radar system;
   down converting the signal with a mixer to obtain a lower frequency;
   filtering out harmonics from the higher frequency range;
   sampling the radar data using an analog to digital converter at at least the Nyquist down range frequency; based upon the IF of the radar;
   determining a scene center (center of SAR imagery) for the purpose of motion compensation;

performing a two stage averaging scheme of the received signals with a variable window function;

determining a window function based upon the velocity and acceleration of the platform and scene center; the window function comprising a first stage window;

coherently averaging N pulses together to create an average pulse;

compensating to the scene center by multiplying by a complex exponential based upon both the GPS and inertial navigational system;

performing an inverse Fourier transform;

phase correcting for quadratic errors depending on frequency;

summing the average pulses using low pass filter;

repeating the step of building up an average pulse for a first predetermined number of times for a time period that is less than the Nyquist sample time interval;

performing a two dimensional inverse Fourier transform using the predetermined number of average pulses to obtain at least one SAR image.

2. The method of claim 1 further comprising detecting moving targets;

the moving targets being detected by:
inputting a first SAR image from a first antenna;
inputting a second delayed SAR image from a second antenna;
calibrating the images using signal subspace decomposition processing;
determining the difference between the first SAR image and the second SAR image to form a differential SAR image;
perform normalization procedure on the differential SAR image;
detect moving targets using a constant false alarm rate detection algorithm; whereby moving targets may be detected.

3. The method of claim 1 wherein the motion of an object is detected by subtracting out the stationary components of the target scene leaving a distorted image of the moving object.

4. The method of claim 1 using a variable linear window function and a variable sample size which are determined by the estimated velocity and acceleration of the platform to average the radar samples in time.

5. The method of claim 1 wherein the window function is an amplitude weighting that is a function of sample number.

6. The method of claim 1 wherein for M raw data samples the window function is computed using the following equation:

$$q(n) = \frac{(u'(n) - L - VT(M-1)/2 - AT^2(M-1)(2M-1)/12)}{\left\{ \begin{array}{l} (VT(M-1)(2M-1)/6 - M(M-1)^2/4) + \\ AT^2(M^2(M-1)^2/8 - M(M-1)^2(2M-1)/24)) \end{array} \right\}};$$

where u'(n) is the desired phase center locations along the synthetic aperture, T is time, L, V and A are the position, velocity and acceleration of the platform on the y-axis.

7. The method of claim 1 wherein the platform is obtained from an unmanned aerial vehicle.

8. The method of claim 1 wherein the platform is a robotic mechanism.

9. The method of claim 1 wherein the platform is a manned vehicle.

10. The method of claim 1, wherein the step of building up an average pulse representing a single point on the aperture is performed by a processor using computer readable program code that is embodied on a computer usable medium.

11. A method of processing radar data obtained from a platform which is subjected to non-uniform movement, the distance the platform travels during the formation of an image comprising an aperture; the method comprising:

building up an average pulse representing a single point on the aperture comprising:
inputting radar data from a radar antenna;
passing the radar signal through low noise amplifier to reduce impact of electronic noise from the radar system;
down converting the signal with a mixer to obtain a lower frequency;
filtering out harmonics from the higher frequency range;
sampling the radar data using an analog to digital converter at at least the Nyquist down range frequency; based upon the IF of the radar;
determining a scene center (center of SAR imagery) for the purpose of motion compensation;
performing a two stage averaging scheme of the received signals with a variable window function;
determining a window function based upon the velocity and acceleration of the platform and scene center; the window function comprising a first stage window;
coherently averaging N pulses together to create an average pulse;
performing an inverse Fourier transform;
compensating to the scene center by multiplying by a complex exponential based upon both the GPS and inertial navigational system;
summing the average pulses using low pass filter;
continuing the step of building up an average pulse for a time period that is less than the Nyquist sample time interval;

repeating the step of building an average pulse a predetermined number of times to generate a predetermined number of average pulses;

performing a two dimensional inverse Fourier transform using the predetermined number of average pulses to obtain the SAR image.

12. A method of claim 11 further comprising detecting moving targets;

the moving targets being detected by:
inputting a first SAR image from a first antenna;
inputting a second delayed SAR image from a second antenna;
calibrating the images using signal subspace decomposition processing;
determining the difference between the first SAR image and the second SAR image to form a differential SAR image;
perform normalization procedure on the differential SAR image;
detect moving targets using a constant false alarm rate detection algorithm;
whereby moving targets may be detected.

13. The method of claim 12 wherein the motion of an object is detected by subtracting out the stationary components of the target scene leaving a distorted image of the moving object.

14. The method of claim 11 using a variable linear window function and a variable sample size which are determined by the estimated velocity and acceleration of the platform to average the radar samples in time.

15. The method of claim 11 wherein the window function is an amplitude weighting that is a function of sample number.

16. The method of claim 11 wherein for M raw data samples the window function is computed using the following equation:

$$q(n) = \frac{(u'(n) - L - VT(M-1)/2 - AT^2(M-1)(2M-1)/12)}{\left\{ \begin{array}{c} (VT(M(M-1)(2M-1)/6 - M(M-1)^2/4) + \\ AT^2(M^2(M-1)^2/8 - M(M-1)^2(2M-1)/24)) \end{array} \right\}};$$

where u'(n) is the desired phase center locations along the synthetic aperture, T is time, L, V and A are the position, velocity and acceleration of the platform on the y-axis.

17. A computer based system for processing radar data obtained from a platform which is subjected to non-uniform movement, the distance the platform travels during the formation of an image comprising an aperture; the system comprising:
programming for operation on a computer for building up an average pulse representing a single point on the aperture comprising the steps of:
inputting radar data from a radar antenna;
passing the radar signal through low noise amplifier to reduce impact of electronic noise from the radar system;
down converting the signal with a mixer to obtain a lower frequency;
filtering out harmonics from the higher frequency range;
sampling the radar data using an analog to digital converter at at least the Nyquist down range frequency; based upon the IF of the radar;
determining a scene center for the purpose of motion compensation;
performing a two stage averaging scheme of the received signals with a variable window function;
determining a window function based upon the velocity and acceleration of the platform and scene center; the window function comprising a first stage window;
coherently averaging N pulses together to create an average pulse;
performing an inverse Fourier transform;
compensating to the scene center by multiplying by a complex exponential based upon both the GPS and inertial navigational system;
summing the average pulses using low pass filter;
the programming operating to repeat the step of building up an average pulse a first predetermined number of times for a time period that is less than the Nyquist sample time interval;
the programming operating to repeat the step of building an average pulse for a second predetermined number of times to generate a second predetermined number of average pulses;
the programming operating to perform a two dimensional inverse Fourier transform to obtain at least one SAR image; and
a display for displaying the SAR image.

18. The system of claim 17 wherein the platform is mounted on a unmanned aerial vehicle having the capability to hover and move slowly in the air; and wherein the motion of the platform can be modeled using $$u(m) = L + Vm\tau + \frac{1}{2}A(m\tau)^2 \quad m = 0 \ldots M-1$$

where L, V, and A are the position, velocity and acceleration of the platform on the y-axis and m is the sample number.

19. The system of claim 17 wherein the sampling of the radar data is at at least the Nyquist sample rate as a function of slow time;

$$\Delta u \leq \frac{R_c \pi}{2k(Y_0)}$$

where $R_c$ is the range to the scene center and $Y_0$ is the maximum cross range extent of the target relative to the scene center, where k is the wave number.

20. The system of claim 17, wherein the programming is embodied on a computer usable medium including computer readable program code.

* * * * *